US011635827B2

(12) United States Patent
Kuribayashi

(10) Patent No.: US 11,635,827 B2
(45) Date of Patent: Apr. 25, 2023

(54) CONTROL DEVICE, DISPLAY DEVICE, PROGRAM, AND DETECTION METHOD

(71) Applicant: NIKON CORPORATION, Tokyo (JP)

(72) Inventor: Hidenori Kuribayashi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/314,010

(22) PCT Filed: Jun. 28, 2017

(86) PCT No.: PCT/JP2017/023762
§ 371 (c)(1),
(2) Date: Apr. 12, 2019

(87) PCT Pub. No.: WO2018/003862
PCT Pub. Date: Jan. 4, 2018

(65) Prior Publication Data
US 2019/0235643 A1 Aug. 1, 2019

(30) Foreign Application Priority Data
Jun. 28, 2016 (JP) .............................. JP2016-128156

(51) Int. Cl.
G06F 3/0346 (2013.01)
G06F 3/0488 (2022.01)
(Continued)

(52) U.S. Cl.
CPC .............. G06F 3/0346 (2013.01); G06F 3/01 (2013.01); G06F 3/041 (2013.01); G06F 3/0416 (2013.01);
(Continued)

(58) Field of Classification Search
CPC ........ G06F 3/017; G06F 3/0304; A63F 13/00; A63F 13/213; A63F 2300/1087; G06K 9/00335
See application file for complete search history.

(56) References Cited

U.S. PATENT DOCUMENTS

2012/0047465 A1* 2/2012 Noda ...................... G06F 3/011
715/848
2012/0056989 A1* 3/2012 Izumi .................. H04N 13/378
348/46
(Continued)

FOREIGN PATENT DOCUMENTS

CN 102375539 A 3/2012
CN 103124945 A 5/2013
(Continued)

OTHER PUBLICATIONS

Sep. 5, 2017 International Search Report issused in International Patent Application No. PCT/JP2017/023762.
(Continued)

Primary Examiner — Yuzhen Shen
(74) Attorney, Agent, or Firm — Oliff PLC

(57) ABSTRACT

A control device that sets a detection reference that serves as a reference according to which an electronic apparatus is operated based on a non-contact operation, includes: a detection unit that detects a position of an object that performs the non-contact operation; an acquisition unit that acquires information related to the object or information related to a user who performs the non-contact operation; and a control unit that performs control to operate the electronic apparatus and control to set the detection reference, based on the position of the object detected by the detection unit and the information acquired by the acquisition unit.

10 Claims, 19 Drawing Sheets

(51) Int. Cl.
    *G06F 3/041*     (2006.01)
    *G06F 3/0481*     (2022.01)
    *G06F 3/01*     (2006.01)
    *G06F 3/04817*     (2022.01)

(52) U.S. Cl.
    CPC .......... *G06F 3/0481* (2013.01); *G06F 3/0488* (2013.01); *G06F 3/04817* (2013.01)

(56) References Cited

U.S. PATENT DOCUMENTS

| | | |
|---|---|---|
| 2012/0105382 A1 | 5/2012 | Tokuda et al. |
| 2012/0119988 A1* | 5/2012 | Izumi .................... G06F 3/0304 |
| | | 382/103 |
| 2012/0280987 A1 | 11/2012 | Iwane |
| 2013/0093860 A1 | 4/2013 | Shimotani et al. |
| 2015/0035747 A1 | 2/2015 | Shimizu et al. |
| 2015/0293600 A1* | 10/2015 | Sears .................... H04N 13/271 |
| | | 345/156 |
| 2016/0004114 A1 | 1/2016 | Kuramoto |
| 2018/0210551 A1* | 7/2018 | Kitagawa ............ G06F 3/04847 |
| 2018/0260034 A1* | 9/2018 | Liu ......................... G06F 3/01 |

FOREIGN PATENT DOCUMENTS

| | | |
|---|---|---|
| CN | 105302298 A | 2/2016 |
| JP | 2011-128766 A | 6/2011 |
| JP | 2011-175617 A | 9/2011 |
| JP | 2012-098959 A | 5/2012 |
| JP | 2015-028734 A | 2/2015 |
| JP | 2016-14777 A | 1/2016 |
| WO | 2011/158911 A1 | 12/2011 |
| WO | 2012/053033 A1 | 4/2012 |

OTHER PUBLICATIONS

Mar. 3, 2020 Japanese Office Action issued in Japanese Patent Application No. 2018-525217.
Aug. 23, 2021 Office Action issued in Chinese Patent Application No. 201780052646.6.
Aug. 30, 2022 Office Action issued in Chinese Application No. 201780052646.6.

* cited by examiner

FIG.4
(a)
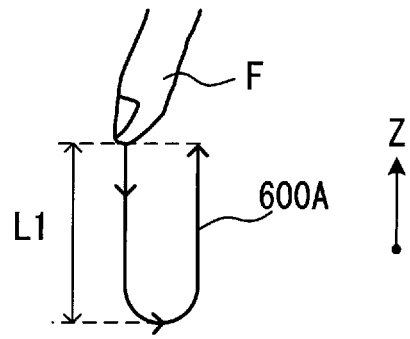
(b)
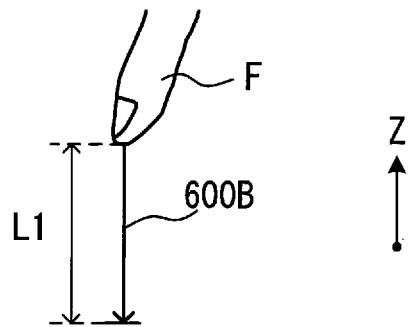
(c)
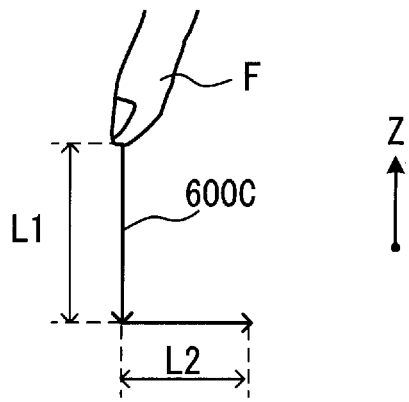

FIG.6
(a)
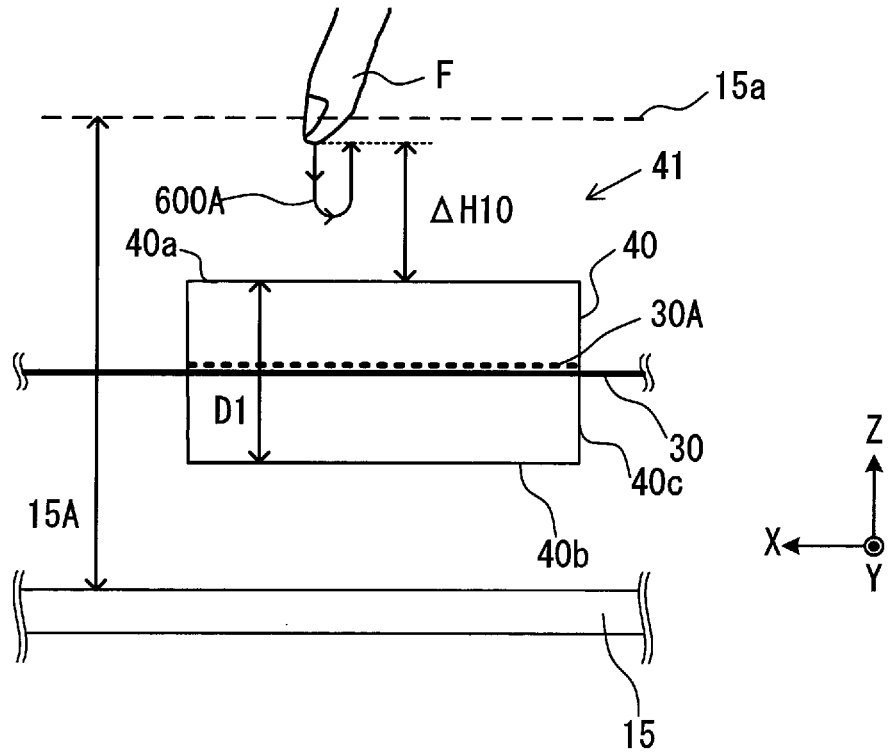
(b)
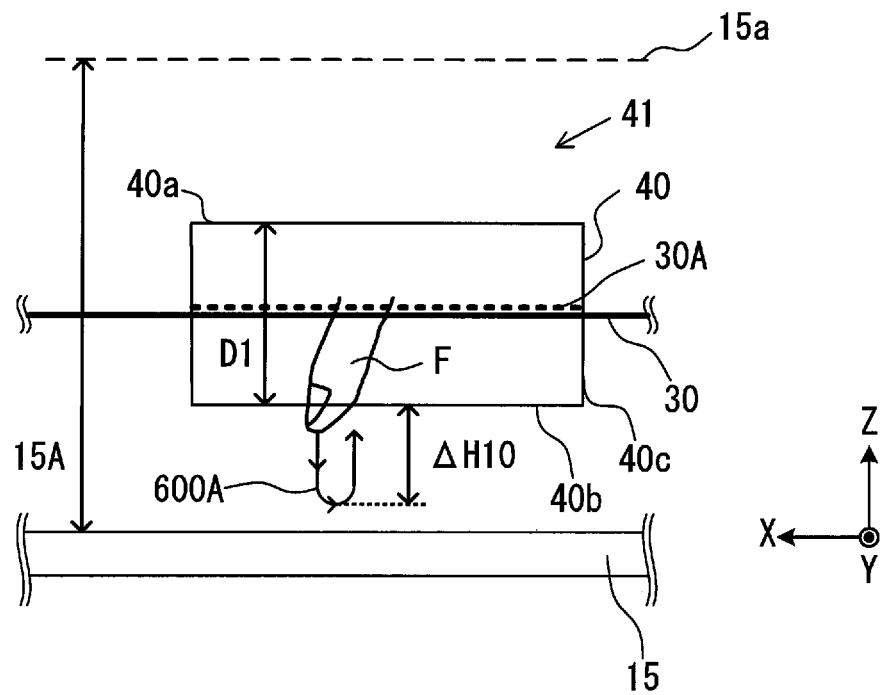

FIG.7
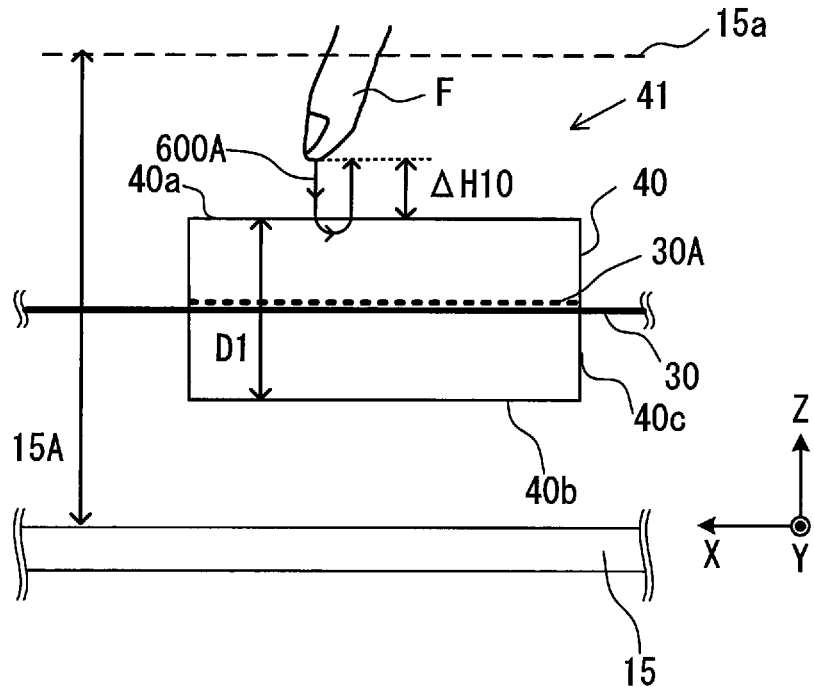
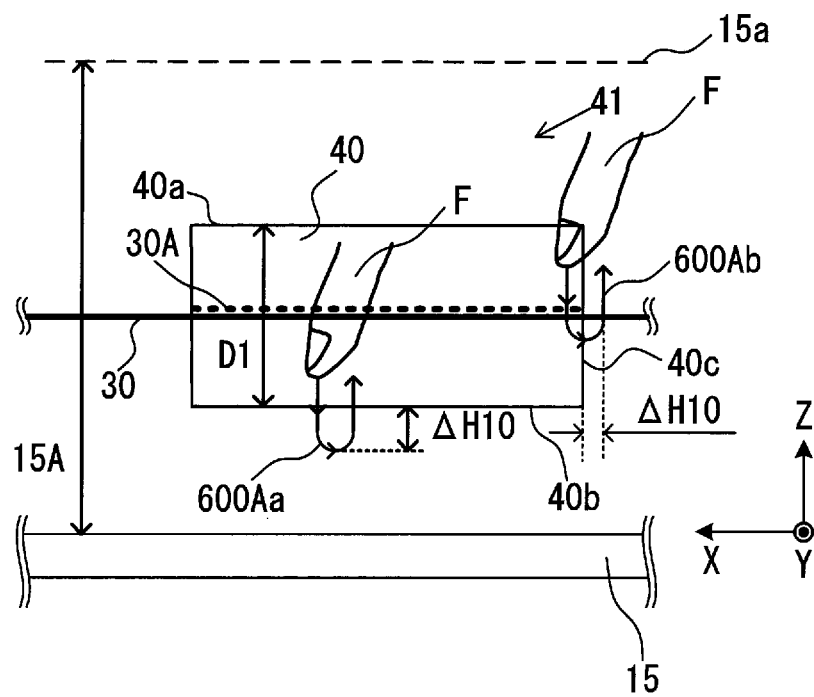

FIG.9
(a)
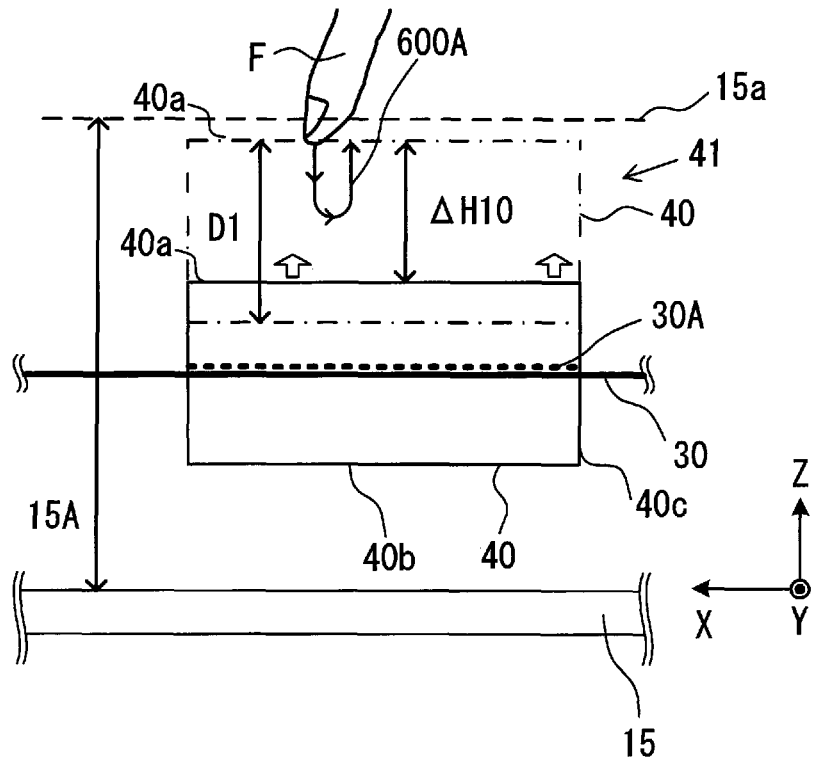
(b)
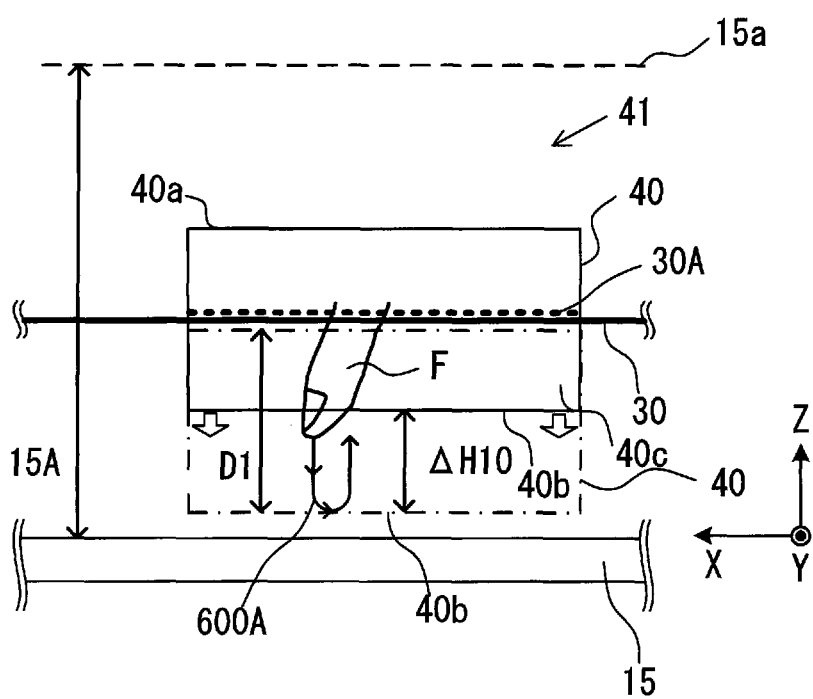

FIG.15
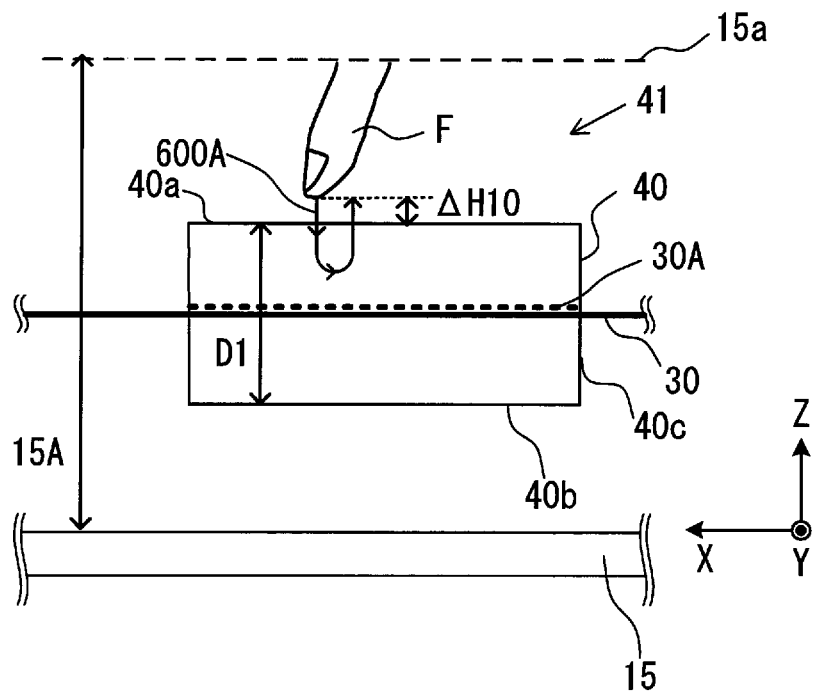
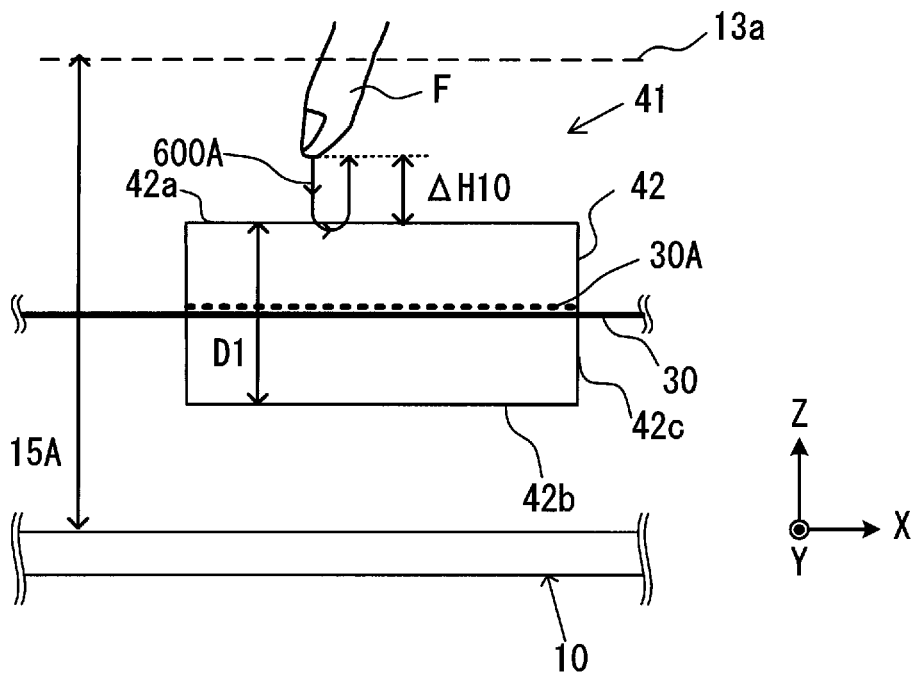

FIG.16
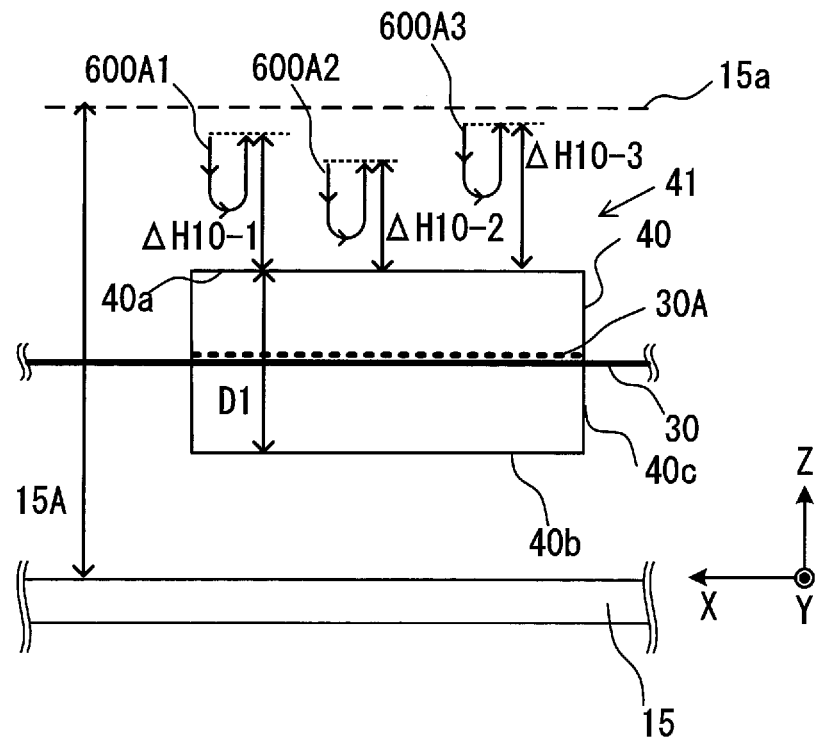
(a)
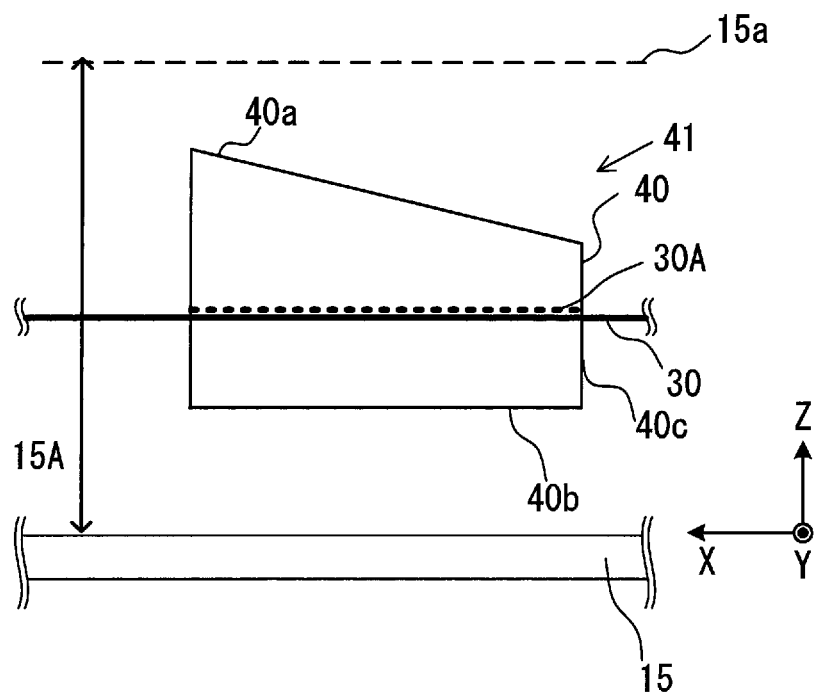
(b)

FIG.19
(a)
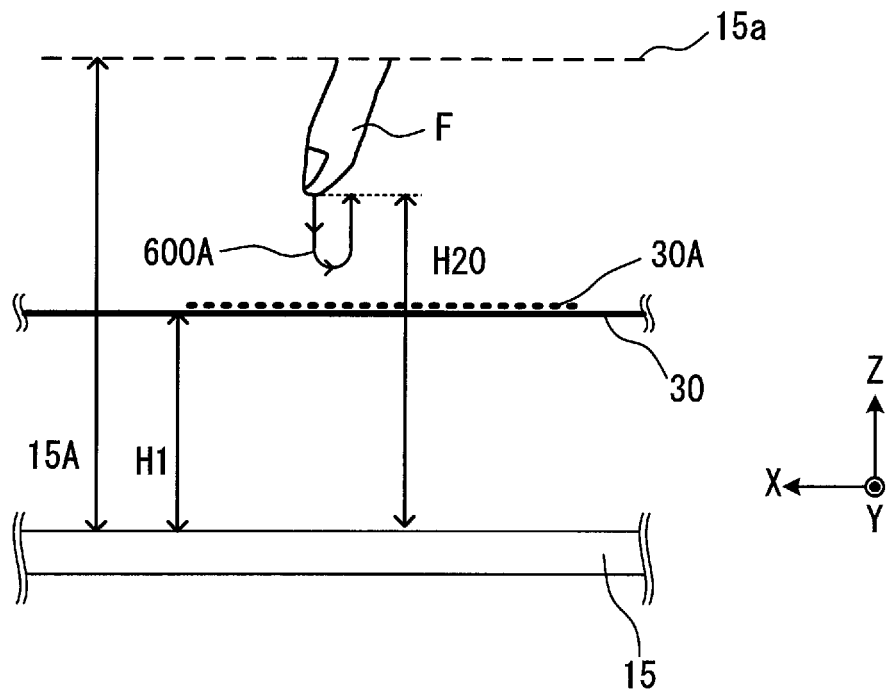
(b)
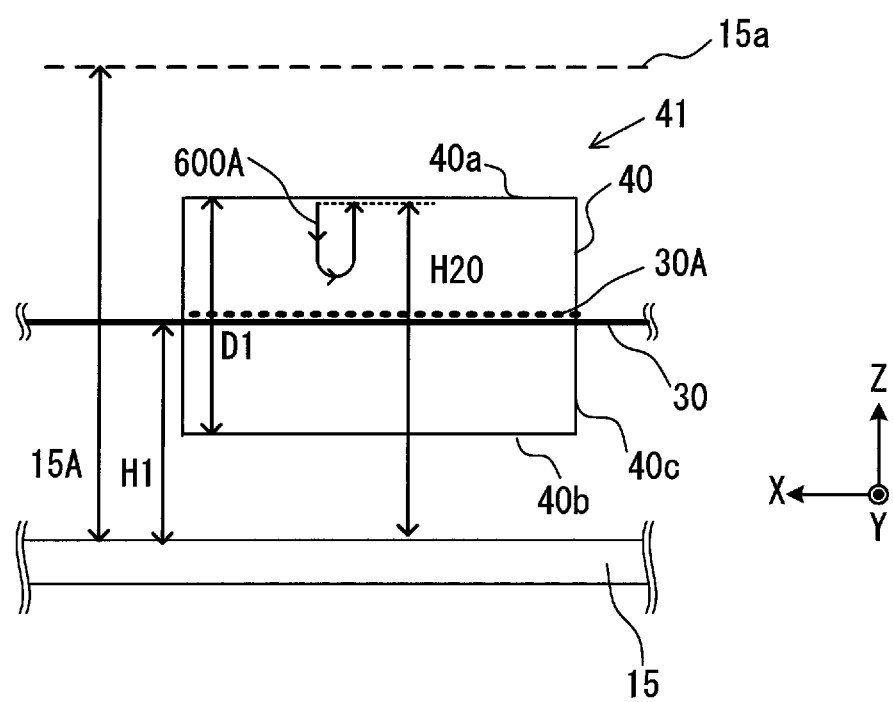

US 11,635,827 B2

CONTROL DEVICE, DISPLAY DEVICE, PROGRAM, AND DETECTION METHOD

TECHNICAL FIELD

The present invention relates to a control device, to a display device, to a program, and to a detection method.

BACKGROUND ART

A display device that is capable of correcting the detected three dimensional position of an operating object above a display screen is per se known (for example, refer to PTL1). However, it has not been possible simultaneously to perform normal operation and also three dimensional position correction operation.

CITATION LIST

Patent Literature

PTL1: Japanese Laid-Open Patent Publication No. 2012-98959

SUMMARY OF INVENTION

According to a first aspect, a control device that sets a detection reference that serves as a reference according to which an electronic apparatus is operated based on a non-contact operation, comprises: a detection unit that detects a position of an object that performs the non-contact operation; an acquisition unit that acquires information related to the object or information related to a user who performs the non-contact operation; and a control unit that performs control to operate the electronic apparatus and control to set the detection reference, based on the position of the object detected by the detection unit and the information acquired by the acquisition unit.

According to a second aspect, a program that sets a detection reference that serves as a reference according to which an electronic apparatus is operated based on a non-contact operation, causes a computer to execute: detection processing to detect a position of an object that performs the non-contact operation; acquisition processing to acquire information related to the object or information related to a user who performs the non-contact operation; and control processing to perform control to operate the electronic apparatus and control to set the detection reference, based on the position of the object detected by the detection processing and the information acquired by the acquisition processing.

According to a third aspect, a display device that is an electronic apparatus, comprises: a display unit that displays an image at a remote position; a detection unit that detects a movement of an object on the image or an operation by a user on the image; and a setting unit that sets a position to be a reference for the movement of the object or to be a reference for the operation by the user, according to which the electronic apparatus is operated, by using the movement of the object or the operation by the user detected by the detection unit.

According to a fourth aspect, a program that is executed by a computer of an electronic apparatus, causes the computer to execute: processing to display an image at a remote position; a detection unit that detects a movement of an object on the image or an operation by a user on the image; and processing to set a position to be a reference for the movement of the object or to be a reference for the operation by the user, according to which the electronic apparatus is operated, by using the movement of the object or the operation by the user detected by the detection unit.

According to a fifth aspect, a detection method for displaying an image at a remote position and detecting an operation upon the image, comprises: displaying an image at a remote position; detecting a movement of an object on the image or an operation by a user upon the image; and setting a positon to be a reference for the movement of the object or to be a reference for the operation by the user, according to which an electronic apparatus is operated, by using the movement of the object or the operation by the user that is detected.

BRIEF DESCRIPTION OF DRAWINGS

FIG. 4 shows figures schematically showing examples of predetermined non-contact operations in the first embodiment;

FIG. 6 shows figures schematically showing cases, for the first embodiment, in which predetermined non-contact operations are not detected within the detection reference: (a) is a figure showing a case in which the whole of a predetermined non-contact operation is detected outside the detection reference, toward the +Z direction than the detection reference, and (b) is a figure showing a case in which the whole of a predetermined non-contact operation is detected outside the detection reference, toward the −Z direction than the detection reference;

FIG. 7 shows figures schematically showing cases, for the first embodiment, in which predetermined non-contact operations are not detected within the detection reference: (a) is a figure showing a case in which a portion of a predetermined non-contact operation is detected outside the detection reference, toward the +Z direction than the detection reference, while the remainder thereof is detected to be within the detection reference, and (b) is a figure showing a case in which a portion of a predetermined non-contact operation is detected outside the detection reference, toward the −Z direction or toward the −X direction than the detection reference, while the remainder thereof is detected to be within the detection reference;

FIG. 9 shows figures showing changes of the position of the detection reference in calibration processing in the first embodiment: (a) is a figure showing a situation after change of the position of the detection reference in the +Z direction, and (b) is a figure showing a situation after change of its position in the −Z direction;

FIG. 15 shows figures for a seventh variant embodiment of the first embodiment, schematically showing the distance between a predetermined non-contact operation and the detection reference, when a portion of the predetermined non-contact operation has been detected outside the detection reference: (a) is a figure showing the case when the distance is less than or equal to a predetermined threshold value, and (b) is a figure showing the case when the distance is greater than that predetermined threshold value;

FIG. 16(a) is a figure for the seventh variant embodiment of the first embodiment, schematically showing a case in which a plurality of predetermined non-contact operations are performed in positions outside the detection reference but in its neighborhood, and FIG. 16(b) is a figure for the seventh variant embodiment of the first embodiment, schematically showing a case in which the width of the detection reference is not constant;

FIG. 19 shows schematic figures for explanation of the timing at which a detection reference is initially set, in a second variant embodiment of a second embodiment: (a) is a figure schematically showing the positional relationship between a midair image that is initially set and a predetermined non-contact operation that is performed upon that midair image, and (b) is a figure schematically showing a case in which a detection reference is initially set on the basis of a predetermined non-contact operation performed upon a midair image that is initially set.

DESCRIPTION OF EMBODIMENTS

First Embodiment

Figure 1:
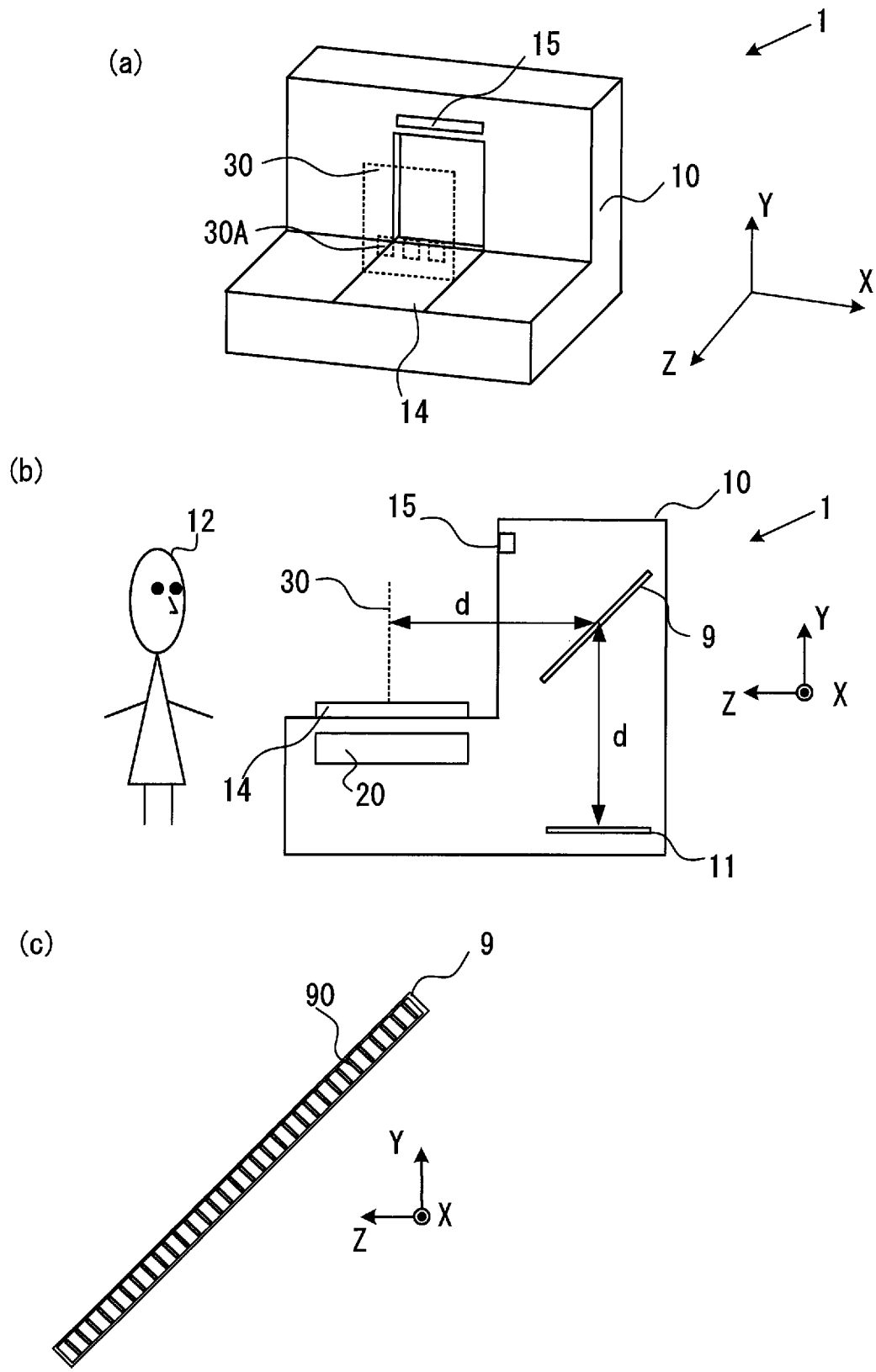
FIG. 1 shows figures for explanation of the structure of a display device according to a first embodiment: (a) is an external perspective view, (b) is a sectional view, and (c) is a sectional view showing the structure of an image forming optical system.

In reference to drawings, the display device in the first embodiment will be described. The first embodiment will be described in reference to an example in which the display device in the embodiment is mounted in an operation panel. It is to be noted that the display device in the embodiment may be mounted in an electronic apparatus other than an operation panel. It may be mounted in, for instance, a portable telephone, a television set, a tablet terminal, a portable information terminal device such as a wristwatch-type terminal, a personal computer, a music player, a landline telephone unit or a wearable device. In addition, the display device in the embodiment may be integrated into an electronic system such as a digital signage system. Examples of such digital signage systems include a compact display unit built into, for instance, an automatic vending machine or the like or a large display unit, assuming a size greater than a typical adult person, which may be installed at a wall surface in a building. Furthermore, the display device in the embodiment may be built into, for instance, a panel of an automatic cash machine (ATM) at which the user enters a PIN number, an amount of money and the like on, a panel of an automatic ticket vending machine that dispenses railway tickets, bus tickets, commuter passes and the like, or a panel on any of various types of information search terminal systems installed in libraries, art galleries and the like. Moreover, the display device in the embodiment may be installed in any of various types of robots (including, for instance, mobile robots and electronic devices such as self-propelled vacuum machines).

FIG. 1(a) is a perspective view of a display device 1, FIG. 1(b) is a sectional view showing part of the display device 1 in an enlargement and FIG. 1(c) is a side elevation providing an enlarged view of part of the display device 1. It is to be noted that for purposes of better clarity, the explanation will be given in reference to a coordinate system assuming an X axis, a Y axis and a Z axis, set relative to the display device 1 as indicated in the figures. It is to be also noted that the coordinate system set for these purposes does not need to be an orthogonal coordinate system assuming the X axis, the Y axis and the Z axis, and it may instead be a polar coordinate system or a cylindrical coordinate system. In other words, any of these coordinate systems may be set relative to the display device 1, as long as the X axis is set to extend along the shorter sides of the rectangular display area of the display device 1, the Y axis is set to extend along the longer sides of the rectangular display area of the display device 1 and the Z axis is set to extend along a direction perpendicular to the display area.

The display device 1 comprises a main body 10 that internally houses a control unit 20, an image forming optical system 9, a display unit 11, a stage 14, and an image capturing device 15. The image forming optical system 9, the display unit 11, the stage 14, and the image capturing device 15 are contained in the main body 10. The display unit 11, for example, may be constituted with a liquid crystal display unit or an organic EL display unit or the like, and includes an array in which a plurality of display pixels are arranged two dimensionally. The display unit 11 is controlled by the control unit 20, and displays an image corresponding to display image data.

As FIG. 1(c) shows, the image-forming optical system 9, having a plurality of micromirror elements 90 disposed in a two-dimensional pattern therein, is set with a predetermined angle relative to the ZX plane, e.g., with a 45° tilt. The image-forming optical system 9 reflects light departing a display image brought up at the display unit 11 and advancing toward the + side along the Y direction, and thus forms a real image of the displayed image in the space above the stage 14 as a midair image or floating image 30. At this time, the midair image 30 is formed at a position that is symmetry with the display surface of the display unit 11 in relation to the image-forming optical system 9. This means that a distance d between the display surface at the display unit 11 and the image-forming optical system 9 and a distance d between the image-forming optical system 9 and the midair image 30 are equal to each other. As a result, a person operating the display device 1 (hereafter will be referred to as a user 12) is able to view the display image displayed at the display surface of the display unit 11 as the midair image 30 floating in the space above the stage 14. It is to be noted that a structure that may be adopted in such an image forming optical system 9 is described, for instance, in Japanese Laid Open Patent Publication No. 2016-14777 in specific terms.

Furthermore, it would also be acceptable for the display device 1 to display the midair image 30 by employing a per se known light field method, as explained hereinafter in an eighth variant embodiment of the first embodiment.

In addition, the position at which the midair image 30 is displayed can be moved along the Z direction by allowing the distance d between the display unit 11 and the image forming optical system 9 measured along the Y direction, to be variable. For instance, as the distance between the display unit 11 and the image forming optical system 9 is reduced, i.e., as the display unit 11 is moved along a direction running toward the image forming optical system 9, the midair image 30 is displayed at a position further away from the user 12 (toward the − side along the Z direction). If, on the other hand, the distance between the display unit 11 and the image forming optical system 9 is increased, i.e., if the display unit 11 is moved along a direction running away from the image forming optical system 9, the midair image 30 is displayed at a position closer to the user 12 (toward the + side along the Z direction). The display unit 11 can be moved along the Y direction via a drive device such as a motor, another type of actuator or the like (not shown).

The midair image 30 includes a plurality of icons 30A (operation buttons) that serve as operation buttons for commanding various settings of the display device 1 and the execution of various functions.

The stage 14 is provided as a surface parallel to the ZX plane, and the midair image 30 is displayed above this stage 14. In the following explanation, it will be supposed that the stage 14 is rectangular in shape, but it is not limited to being rectangular; it could be circular or polygonal or the like, and indeed any of various shapes could be applied.

The image capturing device 15 is disposed at the front surface of the main body 10 of the display device 1 and comprises an image capturing unit that captures an image of an object positioned on the +Z side and a range finding unit that detects the distance to that object, and detects the position of an operating object on the basis of operation performed by the user 12 upon the midair image 30, as will be described hereinafter. The image capturing unit comprises a per se known imaging element, and, as will be described hereinafter, captures an image of the body of the user 12 who is operating the midair image 30 and of an operating object which is a portion of his body such as his finger or hand or the like, and outputs that captured image. R, and B color filters are provided in the imaging element, and R, and B color information is included in the captured image. Due to this, as will be described hereinafter, it is possible to distinguish the shape of the fingertip of the user 12 who is operating the midair image 30 or the shape of its nail or markings, or the shape of an object or the like that the user 12 is holding on his fingers. For example, the range finding unit emits infrared radiation, and, by receiving infrared radiation reflected back from an object, calculates the distance to the object on the basis of the phase change between the emitted radiation and the received radiation, and outputs this distance as distance information. Accordingly, when the subject of this measurement is the operating object described above, the range finding unit is able to obtain the distance from the display device 1 to the finger or the hand of the user 12 who is operating the midair image 30. The image capturing device 15 outputs the image captured by the image capturing unit and the distance information from the range finding unit as its detection output.

As will be explained in detail hereinafter, the image capturing device 15 has a predetermined detection range for detecting operation of the operating object such as the finger or hand or the like of the user 12 in a predetermined image capturing range in the Z direction from its own surface. When the user 12 operates the midair image 30 within this predetermined detection range, the image capturing device 15 detects the distance to the operating object. Of course, the midair image 30 is formed by the image forming optical system 9 so as to be positioned within this detection range, preferably positioned near the central position of the predetermined detection range in the Z direction. Since the image capturing device 15 detects the fact that the user 12 has operated upon the display position of the midair image 30 with his finger or hand or with a stylus, accordingly it is possible to perform operation of the midair image 30 without any operation member such as a touch panel or the like being actually touched. It should be understood that while, in the following explanation, an example will be described in which operation of a display position on the midair image 30 is performed with the finger or the hand of the user 12 serving as an operating object, the situation would be basically the same if an object such as a stylus or the like were to be employed as the operating object.

Figure 2:
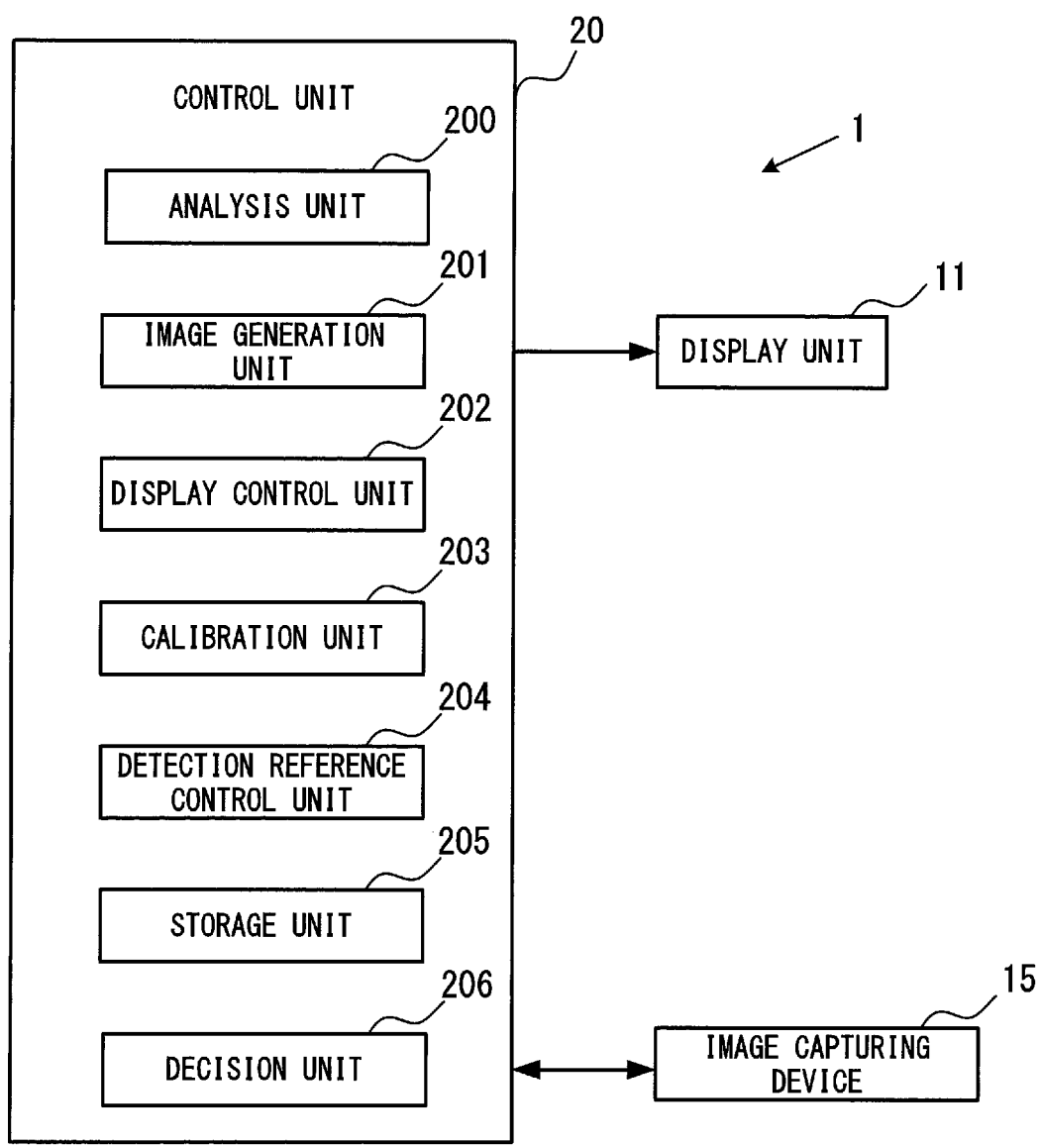
FIG. 2 is a block diagram for explanation of the structure of main portions of the display device according to the first embodiment.

FIG. 2 is a block diagram of a portion of the structure of the display device 1, showing the control unit 20, and the display unit 11 and the image capturing device 15 which are controlled by the control unit 20. The control unit 20 comprises a CPU, ROM, RAM and so on, and includes a calculation circuit that controls various structural elements including the display unit 11 in the display device 1 on the basis of a control program and performs data processing of various types and so on. The control unit 20 includes an analysis unit 200, an image generation unit 201, a display control unit 202, a calibration unit 203, a detection reference control unit 204, a storage unit 205, and a decision unit 206. The storage unit 205 includes a non-volatile memory that stores the control program and a storage medium or the like that stores image data displayed upon the display unit 11 and so on.

On the basis of the detection output from the image capturing device 15, in other words on the basis of the captured image from the image capturing unit and the distance information from the range finding unit, the analysis unit 200 acquires information about the operational state of the operating object with which operation is being performed upon the midair image 30, in other words information related to the operating object, and information related to the user 12 who is performing this operation. For example, if the user 12 operates the midair image 30 with his finger, then the analysis unit 200 may detect the shoulder of the user 12 on the basis of the captured image from the image capturing unit of the image capturing device 15. And the analysis unit 200 may detect the arm of the user 12 moving from his shoulder as a base point on the basis of the captured image from the image capturing unit of the image capturing device 15 and the distance information from the range finding unit, or on the basis of one of the captured image and the distance information. The analysis unit 200 analyzes what type of operation the user 12 is performing from his detected arm movements, and also by detecting movement of his wrist or fingertip. For example, if the user 12 performs tapping down or tapping up upon the midair image 30 as will be described hereinafter, or if he performs hand waving operation, flicking operation, swiping operation or the like, then his arm and/or wrist and so on execute particular specific movements. For example, in the case of tapping down operation, the movement of his wrist is great but the movement of his arm is small. Moreover, in the case of flicking operation or swiping operation, although the movement of his wrist is small, there is some movement of his arm from his elbow as a base point. These types of operation by the user 12 and the operational states of his arm, his wrist, and so on are stored in advance in the storage unit 205 in mutual association.

Based upon image data stored in the storage medium, the image generation unit 201 generates display image data corresponding to a display image to be brought up on display at the display unit 11. The display control unit 202 brings up the image corresponding to the display image data generated by the image generation unit 201 at the display unit 11. In addition, as the user 12 performs an operation at the display position of an icon 30A in the midair image 30, the display control unit 202 executes display image switchover control for the display unit 11 in correspondence to the type of the icon 30A that has been operated. It is to be noted that in response to an operation of user 12 performed at the display position of the icon 30A in the midair image 30, the display control unit 202 may execute control other than the display image switchover control for the display unit 11. For instance, assuming that the user 12 performs an operation at the display position of an icon 30A in the midair image 30 while a movie image is on display as the display image at the display unit 11, the display control unit 202 may execute control for playing the movie image currently displayed at the display unit 11 or for stopping the movie playback.

The calibration unit 203 performs calibration processing that will be described in detail hereinafter. The detection reference control unit 204 sets a detection surface or plane, in other words a detection reference, in the space above the stage 14. In concrete terms, the detection reference control unit 204 sets the detection reference at a position (or a predetermined range) of the midair image 30 that is within the predetermined detection range of the image capturing device 15. Furthermore, the detection reference control unit 204 determines that the finger of the user 12 has reached the detection reference on the basis of the detection output from the image capturing device 15. In other words, the detection reference control unit 204 determines that the user 12 has operated the display position of the icon 30A when the position of his finger (i.e. its position along each of the X axis, the Y axis, and the Z axis) as detected by the image capturing device 15 is positioned within the detection reference that has been set. The detection reference control unit 204 sets the detection reference at a predetermined initial position that is determined in advance. This initial position for the detection reference is stored in advance in the storage unit 205. It should be understood that it would be acceptable, for example, to set the same initial position of the detection reference for every user 12; or, alternatively, it would also be acceptable to set a different position for each user 12 on the basis of the usage history of the display device 1 by that user 12 or the like. Moreover, it should be understood that it would also be possible for the detection reference control unit 204 to change or to correct the position of the detection reference on the basis of the result of calibration processing that will be described hereinafter.

Moreover, it would be acceptable for the position of the detection reference (its initial position or its changed or corrected position) to be set over the entire plane of the stage 14 (i.e. along the X axis and the Y axis); or, alternatively, it could be set over a portion of that plane. Even further, it would also be acceptable to store in the storage unit 205 the detection reference that was set the previous time that the display device 1 was used, and to read out and employ this previous detection reference as the initial position of the detection reference.

The decision unit 206 makes a decision as to whether or not an operation by the user 12 that has been detected by the image capturing device 15 was an operation that was performed with the intention of performing operation upon the icon 30A. It should be understood that the decision processing by the decision unit 206 will be explained in detail hereinafter.

Figure 3:
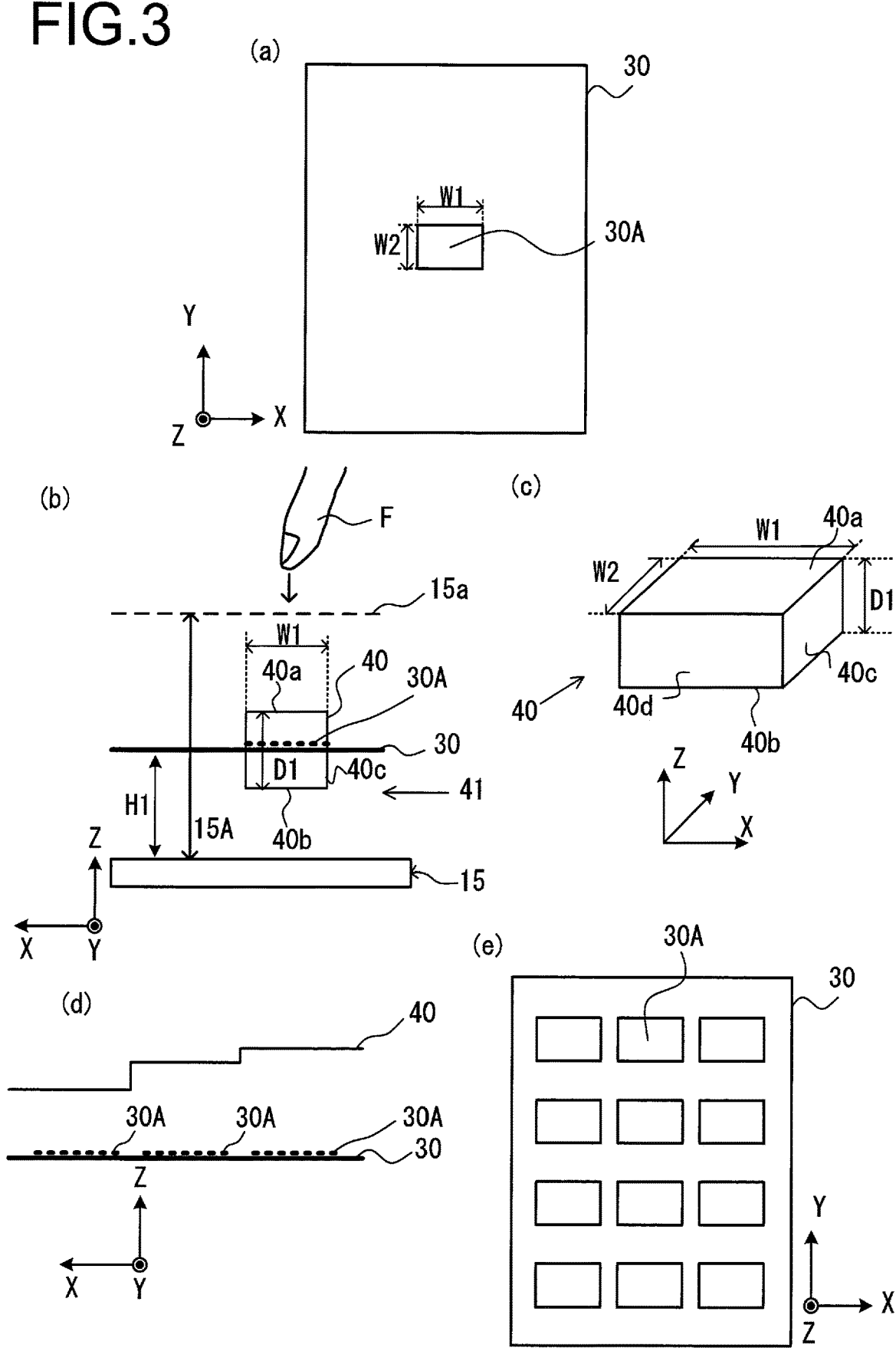
FIG. 3 shows figures schematically showing a midair image displayed by the first embodiment: (a) and (e) are plan views, while (b), (c), and (d) are sectional views showing the relationship between an image capturing device, the midair image, and a detection reference.

FIG. 3(a) shows an example of a midair image 30 displayed by the display device 1, and FIGS. 3(b) and 3(c) schematically show the detection reference 40 that is set. In FIG. 3(b), an icon in the midair image 30 is shown by a thick dotted line 30A. It should be understood that, although the icon 30A is positioned at the same position as the position of the midair image 30 since it is a portion of the midair image 30, in FIG. 3(b), in order to distinguish the thick dotted line that represents the icon 30A from the solid line that represents the midair image 30, the position of the thick dotted line is drawn a little displaced from the position of the solid line.

In FIG. 3(a), an example is shown of a case in which the midair image 30 includes a single icon 30A. For the midair image 30 that is displayed in this manner, the image capturing device 15 has a detection range 15A above the stage 14 (in the +Y direction), as shown in FIG. 3(b). In FIG. 3(b), a detection limit along the Z direction in front of the image capturing device 15 (toward the +Z direction) is shown by a dashed line 15a, and the interval between this detection limit 15a and the image capturing device 15 is shown as the detection range 15A.

In the example of FIG. 3(b), a case is shown in which the detection limit 15a is set above the end portion of the stage 14 toward the +Z direction. In other words, the detection range 15A and the length of the stage 14 in the Z direction are equal. In this case, since the stage 14 and the detection range 15A match one another in the ZX plane, accordingly operations performed by the user 12 in the space above the stage 14 are detected by the image capturing device 15. It should be understood that it would also be acceptable for the size of the stage 14 and the detection range 15a not to match one another in the ZX plane: the detection range 15A may be set to be smaller than the stage 14, or the detection range 15A may be set to be broader than the stage 14.

The midair image 30 is formed above the stage 14 at a position that is separated by a distance H1 in the +Z direction from the image capturing device 15. For this icon 30A, the detection reference control unit 204 initially sets a detection reference 40 that is shaped as a rectangular parallelepiped, as shown in FIGS. 3(b) and 3(c). As shown in FIG. 3(b), the size of the horizontal cross section of the detection reference 40 corresponding to the icon 30A corresponds to the size of the icon 30A. And the size of the detection reference 40 along the Z direction is D1. In other words, the length W1 in horizontal cross section of the detection reference 40, which is shaped as a rectangular parallelepiped, is determined to be equal to the length W1 of one side of the icon 30A, and the length W2 in horizontal cross section of its other side is determined to be equal to the length W2 of the other side of the icon 30A.

On the rectangular parallelepiped shaped detection reference 40, its side surface toward the +Z direction is referred to as a first reference surface 40a, its side surface toward the −Z direction is referred to as a second reference surface 40b, its side surface defined by its length W2 and D1 is referred to as a third reference surface 40c, and its side surface defined by its length W1 and D1 is referred to as a fourth reference surface 40d. The space external to the detection reference 40 will be termed the "space 41 outside the detection reference". In other words, in FIG. 3(c), the space 41 outside the detection reference is the external space outside the detection reference 40, i.e. the space other than the space surrounded by the first reference surface 40a, the second reference surface 40b, the third reference surface 40c, and the fourth reference surface 40d.

It should be understood that although, in the present embodiment, the detection reference 40 has been explained as having the shape of a rectangular parallelepiped, this should not be construed as being limitative; it could have the shape of a sphere or a circular cylinder or a prism, or it could have some other shape. Moreover, the detection reference 40 is not to be considered as being limited to be set for an icon 30A; it would also be acceptable for a detection reference 40 to be set for the entire region of the midair image 30, or for a predetermined range that includes an icon 30A.

The detection reference control unit 204 sets the detection reference 40 so that the midair image 30 is positioned at the middle between the first reference surface 40a and the second reference surface 40b of the detection reference 40. In other words, the detection reference control unit 204 sets the detection reference 40 so that the distance along the Z direction between the midair image 30 and the first reference surface 40a is equal to the distance along the Z direction between the midair image 30 and the second reference surface 40b. It should be understood that the midair image 30 should not be considered as being limited to be positioned at the middle between the first reference surface 40a and the second reference surface 40b. It would also be acceptable for the distance between the midair image 30 and the first reference surface 40a not to be equal to the distance between the midair image 30 and the second reference surface 40b, or for the midair image 30 to be positioned more toward the +Z direction than the first reference surface 40a, or for the midair image 30 to be positioned more toward the −Z direction than the second reference surface 40b. In other words any situation will be acceptable in which, as viewed from the Z axis direction, the midair image 30 (i.e. the icon 30A) and the first reference 40a, the second reference 40b of the detection reference 40 are overlapped with one another.

It should be understood that it would be acceptable for the detection reference control unit 204 to change the position of the detection reference 40 described above by moving it along the Z direction, within the detection range 15A. For example, the detection reference control unit 204 may move the detection reference 40 that has been set as in FIG. 3(b) in the +Z direction or in the −Z direction on the basis of the result of calibration processing that will be described hereinafter. While, in FIGS. 3(b) and 3(c), the midair image 30 and the first reference surface 40a and the second reference surface 40b of the detection reference 40 are represented as being planes parallel to the XY plane, neither of these is limited to being a plane; it would also be acceptable for either or both of them to be shaped as a curved surface.

Furthermore, as shown in FIG. 3(d), the detection reference 40 may not be planar, but may have differences in level for each of several icons 30A. To put it in another manner, if a plurality of icons 30A are included in the midair image 30, it will be acceptable for the gap between one of the icons 30A and the detection reference 40 corresponding to that icon to be different from the gap between another icon 30A and the detection reference 40 corresponding to the another icon. Providing differences in level between the detection references 40 in this manner is particularly effective when the midair image 30 is the image of a solid object, and the positions of the plurality of icons 30A along the Z direction are different from one another. For example, by displacing the positions in the Z direction of the detection references 40 that correspond to a plurality of icons 30A of a midair image 30 that is a solid object on the basis of the differences between the positions in the Z direction of those icons 30A, the distances between the icons 30A and their corresponding detection references 40 may be set to be equal to each other. Moreover, it will be acceptable to change the positions of the respective detection references 40 that have been set for the plurality of icons 30A shown in FIG. 3(d) by moving the detection references 40 independently. In other words, if calibration processing has been performed on the basis of operation upon the left most icon 30A on the drawing paper in FIG. 3(d), then the detection reference control unit 204 may move the position in the Z direction of the decision reference 40 that is set to correspond to the left most icon 30A on the drawing paper. At this time, the detection reference control unit 204 need not move the positions in the Z direction of the detection references 40 that are set to correspond to the other icons 30A (i.e. to the icons 30A at the central portion and at the right most of the drawing paper in FIG. 3(d)).

By the user 12 performing a predetermined non-contact operation upon an icon 30A of the midair image 30 or upon its detection reference 40 that has been set as described above, the display device 1 executes a function that has been allocated to that icon 30A.

FIGS. 4(a) through 4(c) show examples of predetermined non-contact operations 600A through 600C in the present embodiment (when referred to generically, these will be termed "a predetermined non-contact operation 600"). In FIG. 4, the predetermined non-contact operations 600A through 600C are schematically shown by employing arrow signs to show tracks along which the finger F of the user 12 moves. The predetermined non-contact operation 600A shown in FIG. 4(a) is an operation in which, after the user 12 has moved his finger F away from him (i.e. in the −Z direction) by a distance L1, he makes a U-turn and then moves his finger closer to him by the distance L1 (i.e. in the +Z direction). In other words, this predetermined non-contact operation 600A is a U-turn track in which the movement distance away from the user and the movement distance closer to the user are equal to one another. Moreover, it would also be acceptable for this predetermined non-contact operation 600A not to be an operation that traces out a U-turn, i.e. a letter-U shaped track, but rather to trace out a letter-V shaped track; and, moreover, an operation would also be acceptable in which, after the user has moved his finger F away from him by the distance L1, he moves it back along this track towards himself by the distance L1. Furthermore, in this predetermined non-contact operation 600A, it would also be acceptable for the movement distance L1 away from the user and the movement distance L1 closer to the user not to be equal, but to be different from one another. The predetermined non-contact operation 600A of the present embodiment may be any operation in which the user's finger is moved away from the user and subsequently his finger is moved towards him.

The predetermined non-contact operation 600B of FIG. 4(b) is one in which, after the user 12 has moved his finger F away from himself by a distance L1, he then stops moving his finger F for a predetermined time period. And the predetermined non-contact operation 600C of FIG. 4(c) is an operation in which, after the user 12 has moved his finger F away from him by a distance L1, he then moves his finger F in the lateral direction (i.e. in the X direction or in the Y direction) by at least a predetermined distance L2.

The predetermined non-contact operation 600 is not to be considered as being limited to those defined by the various movement tracks for the finger F described above; they could be operations in which other different movement tracks (i.e. movement tracks of a finger F or of a hand) are traced out, provided that it is possible for these movement tracks to be detected by the image capturing device 15.

The movement tracks of the various types of predetermined non-contact operation 600 described above are stored in advance in the storage unit 205.

When, on the basis of the detection output of the image capturing device 15, the analysis unit 200 detects a predetermined non-contact operation 600 in the detection reference 40, then it determines that a finger F has operated the display position of an icon.

Figure 5:
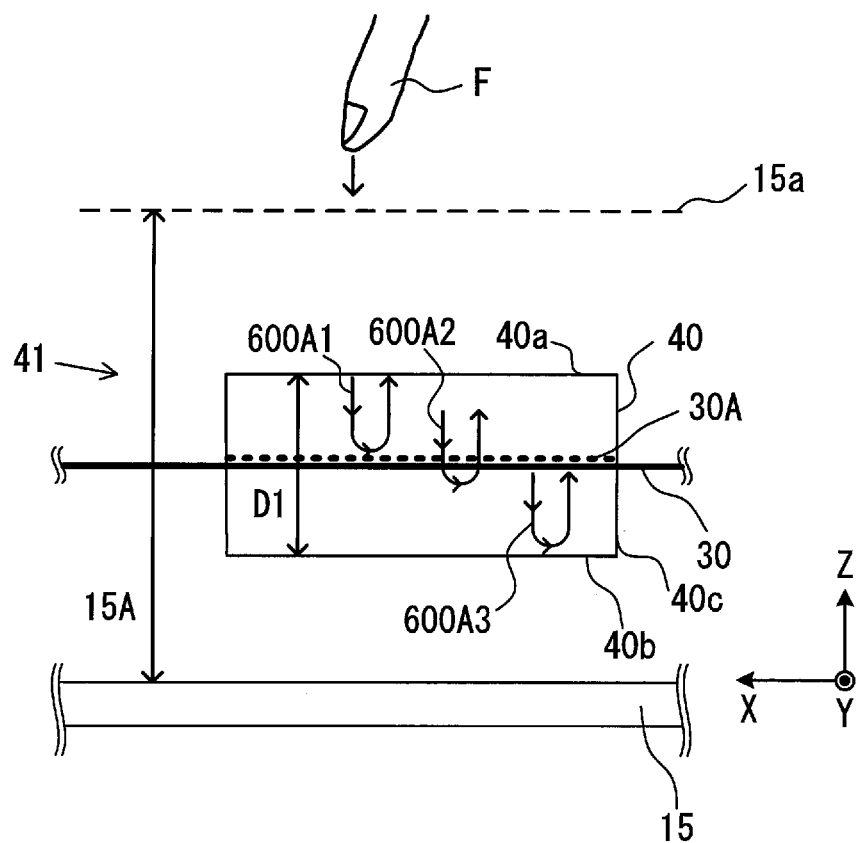
FIG. 5 is a figure schematically showing cases, for the first embodiment, in which predetermined non-contact operations are detected within the detection reference.

FIG. 5 shows an example of a case in which it is determined by the analysis unit 200 that, among the previously described predetermined non-contact operations 600, the non-contact operation 600A has been performed in the detection reference 40. A predetermined non-contact operation 600A1 shows a case in which a finger F moves in the −Z direction by a distance L1 from the first reference surface 40a and subsequently, makes a U-turn and moves in the +Z direction by the distance L1, so that the finger F arrives back at the first reference surface 40a again. On the other hand, a predetermined non-contact operation 600A2 shows a case in which a finger F moves in the −Z direction by a distance L1 from a point intermediate between the first reference surface 40a and the second reference surface 40b and then, makes a U-turn and moves in the +Z direction by the distance L1. Moreover, a predetermined non-contact operation 600A3 shows a case in which a finger F moves in the −Z direction by a distance L1 and then, at the second reference surface 40b, makes a U-turn and moves in the +Z direction by the distance L1. In this case, the analysis unit 200 determines that the predetermined non-contact operation 600A has been performed if the operation that has been performed by the user 12 can be regarded as having the same track as the predetermined non-contact operation 600A that is stored in the storage unit 205. The predetermined non-contact operation 600 by the user 12 detected by the analysis unit 200 is stored in the storage unit 205.

As described above, as shown in FIG. 5, the analysis unit 200 determines that the predetermined non-contact operation 600A has been performed within the detection reference 40 when all of the movement by a distance L1 in the −Z direction, the U-turn, and the movement by the distance L1 in the +Z direction of the predetermined non-contact operation 600A have been performed within the detection reference 40. In other words, the analysis unit 200 detects the predetermined non-contact operation 600A at the detection reference 40.

While, in the above description, the example of the predetermined non-contact operation 600A has been cited for explanation of a method for the analysis unit 200 to determine whether or not a predetermined non-contact operation 600 has been performed within the detection reference 40, the same applies to the cases for the other predetermined non-contact operations 600B and 600C and so on. If all of a predetermined non-contact operation 600 has been performed within the detection reference 40, then the analysis unit 200 determines that the predetermined non-contact operation 600 has been performed at the detection reference 40. However, if even a portion of the predetermined non-contact operation 600 has been performed in the space 41 outside the detection reference, then the analysis unit 200 does not determine that the predetermined non-contact operation 600 has been performed within the detection reference 40. If the predetermined non-contact operation 600 is an operation that involves a movement by a distance L1 in the ±Z direction, then the width D1 of the detection reference 40, in other words the gap between its first reference surface 40a and its second reference surface 40b (i.e. its length in the Z direction) needs to be at least the distance L1 or greater, and for example may be determined to be around 1.5 to 3 times the distance L1.

The following explanation of the present embodiment and variant embodiments cites the predetermined non-contact operation 600A as a representative, but naturally a similar technique can be applied for the other non-contact operations 600B and 600C and so on as well.

The above has been an explanation of a case in which the predetermined non-contact operation 600A is detected within the detection reference 40. However, the icon 30A is positioned at a distance H1 from the image capturing device 15. Since this icon 30A is displayed as a midair image 30, accordingly one user 12 and a different user 12 may visually feel the display position of the icon 30A in the midair image 30, in other words its distance H1 differently. Moreover, even for the same user 12, the display position of the icon 30A may be observed differently, due to the environment in which an operation is performed on this display device 1. For example, in order to perform operation upon the display position of the icon 30A, an user 12 may try to perform the predetermined non-contact operation 600 upon the icon 30A of the midair image 30 with his finger. However, although this user 12 thinks that his finger has arrived at the icon 30A so that he is operating the display position of the icon 30A, it may happen that actually his finger is at a position that is more toward the +Z direction than the icon 30A, in other words than the first reference surface 40a of the detection reference 40. Conversely, although a different user 12 may feel that his finger is still away from the icon 30A (i.e. is still on the side thereof in the +Z direction), actually his finger may have arrived at the icon 30A, and is now at a position that is more toward the −Z direction than the second reference surface 40b of the detection reference 40. Examples in these cases will now be shown with reference to positional relationships between a predetermined non-contact operation 600A that is detected and the detection reference 40.

FIG. 6 is a figure schematically showing examples of cases in which the predetermined non-contact operation 600A is detected in the space 41 outside the detection reference. In FIG. 6(a), the whole of the predetermined non-contact operation 600A by the finger F is performed at a position more toward the +Z direction than the first reference surface 40a of the detection reference 40. In this case, on the basis of the detection output of the image capturing device 15, the analysis unit 200 detects that the entire predetermined non-contact operation 600A has been performed in the space 41 outside the detection reference.

On the other hand, in FIG. 6(b), the whole of the predetermined non-contact operation 600A by the finger F is performed at a position more toward the −Z direction than the second reference surface 40b of the detection reference 40. In this case as well, on the basis of the detection output of the image capturing device 15, the analysis unit 200 detects that the entire predetermined non-contact operation 600A has been performed in the space 41 outside the detection reference. A method will now be explained for detecting by means of the image capturing device 15 and the analysis unit 200 to that a predetermined non-contact operation 600A is performed in the space 41 outside the detection reference. First, the image capturing device 15 repeatedly detects movement of the finger F. Next, on the basis of the detection output of the image capturing device 15, the analysis unit 200 determines whether or not the movement track of the finger F corresponds to the predetermined non-contact operation 600A that is stored in the storage unit 205, and also determines the position of the movement track of the finger F (in the detection reference 40, or in the space 41 outside the detection reference, or in both the detection reference 40 and the space 41 outside the detection reference). And, on the basis of this determination result, the predetermined non-contact operation 600A may be detected to be in the space 41 outside the detection reference.

FIG. 7 shows examples of cases in which a portion of the predetermined non-contact operation 600A is detected in the space 41 outside the detection reference. In FIG. 7(a), a portion of the predetermined non-contact operation 600A by the finger F, in other words a portion corresponding to the distance ΔH10, is performed at a position that is more toward the +Z direction than the first reference surface 40a of the detection reference 40, while the remainder thereof is performed within the detection reference 40. To put it in another manner, when the portion of the predetermined non-contact operation 600A that is detected within the detection reference 40 and the portion of the predetermined non-contact operation 600A that is detected in the space 41 outside the detection reference are combined together, the result is the entire predetermined non-contact operation 600A.

In this case, on the basis of the detection output of the image capturing device 15, the analysis unit 200 detects that a portion of the predetermined non-contact operation 600A is in the space 41 outside the detection reference.

On the other hand, in FIG. 7(b), a portion of a predetermined non-contact operation 600Aa by the finger F, in other words a portion corresponding to a distance ΔH10, is performed at a position that is more toward the −Z direction than the second reference surface 40b of the detection reference 40, while the remainder thereof is performed within the detection reference 40. To put it in another manner, when the portion of the predetermined non-contact operation 600Aa that is detected within the detection reference 40 and the portion of the predetermined non-contact operation 600Aa that is detected in the space 41 outside the detection reference are combined together, the result is the entire predetermined non-contact operation 600Aa.

Furthermore, a portion of a predetermined non-contact operation 600Ab by the finger F, in other words the portion corresponding to the distance ΔH10, is performed outside the third reference surface 40c of the detection reference 40, while the remainder thereof is performed within the detection reference 40. To put it in another manner, when the portion of the predetermined non-contact operation 600Ab that is detected within the detection reference 40 and the portion of the predetermined non-contact operation 600Ab that is detected in the space 41 outside the detection reference are combined together, the result is the entire predetermined non-contact operation 600Ab.

In these cases as well, on the basis of the detection output of the image capturing device 15, the analysis unit 200 detects a portion of the predetermined non-contact operation 600Aa or a portion of Ab in the space 41 outside the detection reference.

Detection of the predetermined non-contact operation 600 as shown in FIG. 6 or FIG. 7 means that operation of the icon is not executed, which is contrary to the intention of the user 12. In any of these cases, the user 12 will come to experience a sense of discomfort with regard to operation of the icon. Furthermore, apart from the cases described above, for example, in a situation in which a plurality of icons 30A are being displayed as a midair image 30, if the user 12 indicates with his finger each of the icons 30A while deciding which icon is to be operated, operation of an icon may be executed due to by chance the movement of the fingertip of the user 12 agreeing with the predetermined non-contact operation 600. In other words, operation of the icon 30A may undesirably be performed irrespective of whether or not the user 12 actually has the intention of operating the icon, so that the user 12 may experience a sense of discomfort. Moreover, when the user 12 tries to operate the icon 30A by performing non-contact operation, if the non-contact operation performed by the user 12 is different from the predetermined non-contact operation 600, then operation of the icon is not performed, which is contrary to the intention of the user 12. In this type of case as well, the user 12 will come to experience a sense of strangeness.

With the display device 1 of this embodiment, when a non-contact operation is performed by the user 12, a decision is made as to whether or not the user 12 has actually intended to operate the icon 30A.

The decision as to whether or not the user 12 has intended to operate the icon 30A is made by the decision unit 206 of the control unit 20.

When the predetermined non-contact operation 600 has been performed by the user 12 as in the cases shown in FIG. 5 through FIG. 7, the decision unit 206 decides that the user 12 has intended to operate the icon 30A. Moreover, even if the non-contact operation that has been performed by the user 12 is different from the predetermined non-contact operation 600, still, provided that a predetermined condition is satisfied, it is decided that the user 12 has intended to operate the icon 30A. In other words if the analysis unit 200 has detected, on the basis of the detection output of the image capturing device 15, the entire movement track of the predetermined non-contact operation 600 in the detection range 15A, or if it has determined that the non-contact operation satisfies the predetermined condition, then the decision unit 206 decides that the user 12 intended to operate the icon 30A. This predetermined condition will be described in detail hereinafter.

The decision unit 206 decides that the user 12 did not have the intention of operating the icon 30A if the operation performed by the user 12 is not the predetermined non-contact operation 600, and moreover the predetermined condition is not satisfied. In other words if, on the basis of the detection output of the image capturing device 15, the analysis unit 200 has determined that the detected non-contact operation is not the predetermined non-contact operation 600, or if the detected non-contact operation does not satisfy the predetermined condition, then the decision unit 206 decides that the user 12 did not have the intention of operating the icon 30A.

The predetermined condition will now be explained. A non-contact operation performed by the user 12 that satisfies the predetermined condition is an operation that can be considered as being the predetermined non-contact operation 600 on the basis of the movement track or the position of the non-contact operation.

It should be understood that, in the following explanation, the predetermined non-contact operation 600A shown in FIG. 4(a) will be cited as an example of the predetermined non-contact operation 600. As described above, this predetermined non-contact operation 600A consists of the user 12 operating his finger F along a movement track according to which, after having moved his finger F away from him through a distance L1 (toward the −Z direction), he makes a U-turn, and then moves his finger through the distance L1 towards him (toward the +Z direction).

The image capturing unit of the image capturing device 15 captures an image of the finger of the user 12 and outputs the captured image, and the range finding unit of the image capturing device 15 detects a distance to the finger of the user 12, and outputs its range finding information, in other words its distance information. The analysis unit 200 detects a distance of the movement track of the non-contact operation by the user 12 on the basis of the captured image and distance information related to his finger by the image capturing device 15. In order to detect the distance of the movement track of this non-contact operation, the analysis unit 200 may use both the captured image and the distance information, or may only use one or the other thereof.

On the basis of the shape of the movement track of operation by the user 12 as detected by the analysis unit 200 and the shape of the movement track of the predetermined non-contact operation 600A, the decision unit 206 makes a decision as to whether or not the user 12 actually intended to perform that operation.

It will be supposed that, on the basis of the detection output from the image capturing device 15, the analysis unit 200 has detected a movement track of operation by the user 12 consisting of motion by a distance L0 toward the −Z direction, then a U-turn, and then motion by the distance L0 toward the +Z direction. If the difference between the distance L0 of the non-contact operation by the user 12 detected by the analysis unit 200 and the distance L1 of the predetermined non-contact operation 600A is less than or equal to a predetermined threshold value, then it is determined that the user 12 intended to operate the icon 30A, while if this differential is greater than the predetermined threshold value, then it is determined that the user 12 did not have any such intention. For example, suppose that the distance L1 of operation toward the ±Z direction of the predetermined non-contact operation 600A is 10 cm, and that the predetermined threshold value is 3 cm. If the distance L0 of operation toward the ±Z direction of the non-contact operation by the user 12 is 9 cm, then there is a possibility that the user 12 does himself intend to perform the predetermined non-contact operation 600A upon the icon 30A. Accordingly, the decision unit 206 decides that the user 12 does have the intention of operating the icon 30A. Moreover, if the distance L0 of operation toward the ±Z direction of the non-contact operation by the user 12 is 2 cm, then it is considered that the user 12 does not intend to operate the icon 30A, and that the user 12 is currently investigating which of the icons 30A to select. Accordingly, the decision unit 206 decides that the user 12 does not have any intention of operating the icon 30A.

Let it be supposed that, on the basis of the detection output from the image capturing device 15, the analysis unit 200 has detected the movement track of the operation by the user 12 being motion by a distance L1 toward the −Z direction, in other words that the analysis unit has detected a movement track like that shown in FIG. 4(b). Even if an operation along a different movement track from the movement track of the predetermined non-contact operation 600A has been performed by the user 12, still, on the basis of the position of the operation by the user 12, the decision unit 206 makes a decision as to whether or not the operation by the user 12 was intentional. In this case, the analysis unit 200 detects whether or not the direction of operation performed by the user 12 is toward the −Z direction, in other words whether or not the vector of the operation by the user 12 is toward the display position of the icon 30A.

The image capturing unit of the image capturing device 15 captures an image of the finger of the user 12 and outputs the captured image, and the range finding unit of the image capturing device 15 detects a distance to the finger of the user 12 and outputs the resulting range finding information, in other words the resulting distance information. And the analysis unit 200 calculates the position of the finger on the basis of the captured image and the distance information relating to the finger from the image capturing device 15. In this case, it would be acceptable for the analysis unit 200 to calculate the position of the finger by employing both the captured image and also the distance information from the image capturing device 15, or to calculate the position of the finger by employing only one of the captured image and the distance information from the image capturing device 15.

Figure 8:
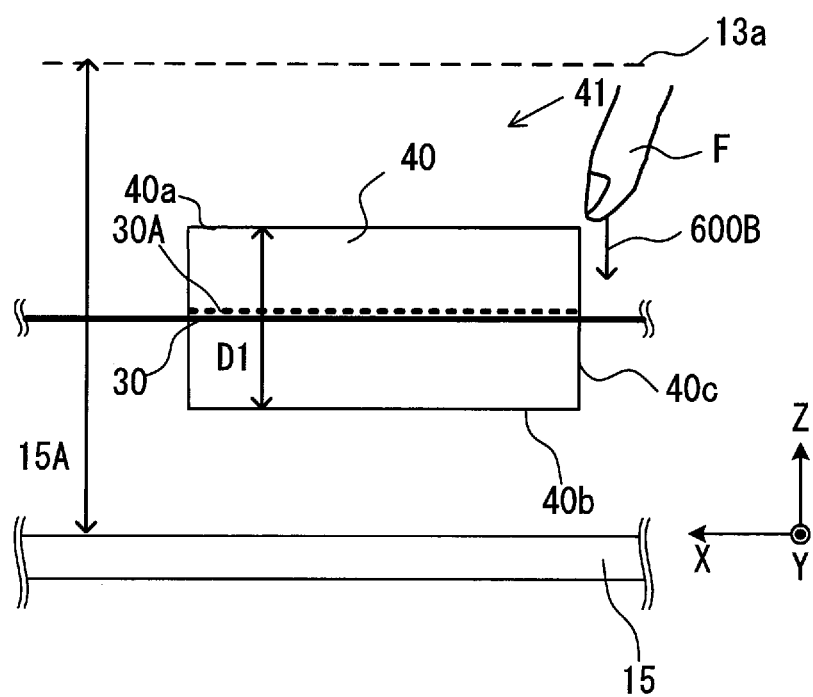
FIG. 8 is a figure schematically showing a case in which a predetermined non-contact operation is not performed in a direction toward an icon.

The analysis unit 200 calculates the direction of the movement track of the non-contact operation by the user 12, in other words its vector, on the basis of the position of the finger acquired in successive cycles of image capture by the image capturing device 15. And the analysis unit 200 makes a decision as to whether or not any icon 30A is present in the direction of the vector that has thus been calculated. If an icon 30A is present in the direction of the calculated vector, then, there is a possibility that the user 12 has moved his finger F along a wrong movement track while moving his finger F toward the icon 30A. Accordingly, the decision unit 206 decides that the user 12 had the intention of operating the icon 30A. But if, as shown in FIG. 8, no icon 30A is present in the direction of the calculated vector, then since the shape of the movement track is different and the finger F has not been moved in the direction of any icon 30A, accordingly the possibility is low that the user 12 has moved his finger in order to operate any icon 30A. Therefore, the decision unit 206 decides that the user 12 had no intention of operating any icon 30A.

It should be understood that the analysis unit 200 is not limited to calculating the vector. For example, it will be acceptable for the analysis unit 200 to determine whether or not the position where the user 12 has performed the non-contact operation (for example, the end point of the movement track, in other words, in the case of the movement track of the predetermined non-contact operation 600B shown in FIG. 4(b), the X coordinate and the Y coordinate of its end point toward the −Z direction) is within the range of the display position of the icon 30A in the X coordinate and the Y coordinate. In other words, the analysis unit 200 may determine whether the operation by the user 12 is at the display position of the icon 30A or is greatly deviated therefrom. If the X coordinate and the Y coordinate of the predetermined non-contact operation 600A that has been performed by the user 12 are within the range of the display position of the icon 30A in the X coordinate and the Y coordinate, then, there is a possibility that the user 12 has moved his finger toward the icon 30A but he has simply traced out a wrong movement track by the finger F. Accordingly, the decision unit 206 decides that the user 12 had the intention of operating the icon 30A. But if the X coordinate and the Y coordinate of the predetermined non-contact operation 600A performed by the user 12 are not within the range of the display position of the icon 30A in the X coordinate and the Y coordinate, then the operation by the user 12 cannot be considered to have been performed upon the icon 30A. Accordingly, the decision unit 206 decides from the result of decision by the analysis unit 200 that the user 12 did not have any intention of operating the icon 30A.

Furthermore it would also be acceptable to decide that the user 12 has the intention of operating the icon 30A, if the Z coordinate at which the user 12 has performed the non-contact operation and the Z coordinate of the display position of the icon 30A are within a predetermined range. In other words, if the distance between a point on the track of the non-contact operation and the detection reference 40 is smaller than a predetermined distance, then it is decided that the user 12 has the intention of operating the icon 30A. But if that distance is greater than the predetermined distance, then it is decided that the user 12 has no intention of operating the icon 30A. If the user 12 has performed a non-contact operation at a position that is greatly separated from the midair image 30, then it is difficult to consider that the user 12 has any intention to perform operation upon the midair image 30. In this type of case, it can be decided that the user 12 has no intention to perform operation upon the midair image 30.

It should be understood that even in a case in which the user 12 performs the predetermined non-contact operation 600 within the detection reference 40 as shown in FIG. 5 or the predetermined condition is satisfied, still the decision unit 206 may decide that the user 12 has no intention of operating the icon 30A. For example, this is the case when user operation is performed while the system is transitioning to a dedicated mode for performing calibration processing (i.e. the calibration processing mode) that will be described hereinafter. Here, the calibration processing mode is a mode in which only calibration is performed while normal operation of the icon 30A is not accepted. Since at this time normal operation of the icon 30A is not accepted, accordingly, even if the predetermined non-contact operation 600 or a non-contact operation that satisfies the predetermined condition within the detection reference 40 is detected by the analysis unit 200, still the decision unit 206 determines that the user 12 has no intention of operating the icon 30A.

Furthermore, for example, the decision unit 206 may decide that the user 12 has no intention of operating the icon 30A even if a non-contact operation that is performed by the user 12 in a mode different from the mode in which the icon 30A in the midair image 30 is operated is the predetermined non-contact operation 600 or a non-contact operation that satisfies the predetermined condition. Modes that are different from the mode in which the icon 30A in the midair image 30 is operated are those in which operation of icons by the user 12 is not supposed to be performed, and may include a video replay mode in which a video is reproduced, a slide show replay mode in which a plurality of still images are displayed in sequence as a slide show without a midair image of icon being displayed, and the like. In this case even if, on the basis of the detection output of the image capturing device 15, the analysis unit 200 analyzes that an operation has been performed by a finger of the user 12, it may still be determined that the user 12 has no intention of performing any operation, since no icon is being displayed.

The control unit 20 performs the function of the icon 30A on the basis of the result of analysis by the analysis unit 200 performed as described above, and/or on the basis of the decision processing by the decision unit 206. Moreover, the calibration unit 203 performs calibration processing on the basis of the result of analysis by the analysis unit 200 performed as described above, and/or the result of the decision processing by the decision unit 206. In the following, explanation will be given separately of the processing for performing the function of the icon 30A and of the calibration processing.

The operation will now be explained of the display device 1 when a non-contact operation performed by the user 12 within the detection reference 40 is detected by the analysis unit 200, and it has been decided by the decision unit 206 that the user 12 has the intention of operating the icon 30A. In this type of case, the control unit 20 performs the function associated with the icon 30A. For example, the display control unit 202 may change over the display from the midair image 30 as shown in FIG. 3(a) to the midair image 30 including twelve icons 30A in four rows by three columns, as shown in FIG. 3(e). For example, it is assumed that the icon 30A of FIG. 3(a) is a start button for causing the operation of the display device 1 to start, or a lock cancellation button for enabling operation of the display device 1 from the locked state. In this case, for example, as the midair image shown in FIG. 3(e), the display control unit 202 may change over to displaying icons for performing applications of various types (such as music replay, video replay, email, and so on).

The operation of the display device 1 will now be explained when a non-contact operation performed by the user 12 has been detected by the analysis unit 200 in the space 41 outside the detection reference, and it has been decided by the decision unit 206 that the user 12 has the intention of operating the icon 30A. In this type of case, the control unit 20 performs the function of the icon 30A, and the calibration unit 203 performs calibration processing. It should be understood that the details of this calibration processing will be explained in detail hereinafter. Moreover, it should be understood that it would also be acceptable for the calibration processing not to be performed in some cases, even if a non-contact operation performed by the user 12 in the space 41 outside the detection reference has been detected and it has been decided that the user 12 does have the intention of operating the icon 30A. For example, a case may be considered in which no further operation by the user 12 is required in the function executed by the control unit 20 after a non-contact operation has been performed by the user 12 upon the icon 30A. As one example, the icon 30A that is operated by the user 12 may be an end button for terminating the operation of the display device 1, or the like. If, in this manner, no operation by the user 12 is required in the state the control unit 20 has performed the function of the icon 30A, then it will be acceptable for calibration processing not to be performed.

Next, the operation will be explained of the display device 1 when a non-contact operation performed by the user 12 in the detection reference 40 has been detected by the analysis unit 200, but it has been decided by the decision unit 206 that the user 12 has no intention of operating the icon 30A. In this case, since it has been decided by the decision unit 206 that the user 12 has no intention of operating the icon 30A, accordingly the control unit 20 does not perform the function of the icon 30A. For example, the display control unit 202 does not perform changing over of the display from the midair image 30 shown in FIG. 3(a) to the midair image shown in FIG. 3(e). Moreover, the calibration unit 203 does not perform calibration processing.

However, in this type of case as well, if a non-contact operation performed by the user 12 is an operation for issuing a command to transition to calibration processing, then the calibration unit 203 does perform calibration processing.

Finally, the operation of the display device 1 will be explained when a non-contact operation performed by the user 12 in the space 41 outside the detection reference has been detected by the analysis unit 200, and it has been decided by the decision unit 206 that the user 12 has no intention of operating the icon 30A. In this case, since it has been decided by the decision unit 206 that the user 12 has no intention of operating the icon 30A, accordingly the control unit 20 does not perform the function of the icon 30A. Moreover, calibration processing is also not performed.

In the following, the calibration processing performed by the calibration unit 203 will be explained. It should be understood that although, in the following explanation, an example is explained of a case in which the predetermined non-contact operation 600A is performed, it would also be acceptable for the calibration processing to be performed in response to a non-contact operation that satisfies the predetermined condition, in other words in response to a non-contact operation that is performed when the user 12 intends to perform operation.

When the predetermined non-contact operation 600A has been performed as shown in FIG. 6(*a*), the detection reference control unit 204 calculates the gap ΔH10 between the operation starting position of the predetermined non-contact operation 600A and the first reference surface 40*a* on the basis of the detection output from the image capturing device 15 stored in the storage unit 205. This gap ΔH10 can be calculated, as described above, from the operation starting position of the predetermined non-contact operation 600A and the position of the first reference surface 40*a*, but it can also be calculated by the following method. That is, the detection reference control unit 204 obtains the position of the predetermined non-contact operation 600A most toward the −Z direction, in other words the arrival position of the predetermined non-contact operation 600A, on the basis of the detection output from the image capturing device 15 stored in the storage unit 205. And the detection reference control unit 204 calculates the gap between the arrival position of the predetermined non-contact operation 600A and the position of the first reference surface 40*a*, and calculates the gap ΔH10 by adding the distance L1 of the predetermined non-contact operation 600A to this gap that has thus been calculated.

Upon calculating the gap ΔH10, the detection reference control unit 204 moves the entire detection reference 40 upward in the figure on the basis of the distance ΔH10, in other words in the +Z direction, as shown in FIG. 9(*a*). In FIG. 9(*a*), the detection reference 40 that has thus been moved is shown by a single dotted chain line. The amount by which the detection reference 40 is moved along the +Z direction could be roughly equal to the distance ΔH10 as shown in FIG. 9(*a*), or could be greater than or less than the distance ΔH10. As described above, if the predetermined non-contact operation 600A intentionally performed by the user 12 has been detected at a position in the space 41 outside the detection reference that is more toward the +Z direction than the detection reference 40, then the detection reference control unit 204 changes the detection reference 40 by moving the entire detection reference 40 in the +Z direction so as to bring it closer to the position where this predetermined non-contact operation 600A has been performed.

FIG. 9(*b*) is a figure for explanation of the calibration processing when the predetermined non-contact operation 600A has been detected in the space 41 outside the detection reference, and moreover has been detected at a position that is more toward the −Z direction than the second reference surface 40*b* of the detection reference 40 (refer to FIG. 6(*b*)). In FIG. 9(*b*), the analysis unit 200 decides on the basis of the detection output of the image capturing device 15 that the predetermined non-contact operation 600A has been performed, and moreover decides that this predetermined non-contact operation 600A has been performed in the space 41 outside the detection reference. The detection reference control unit 204 calculates the gap ΔH10 between the position on the movement track of the predetermined non-contact operation 600A most toward the −Z direction, in other words the arrival position of the predetermined non-contact operation 600A, and the second reference surface 40*b* of the detection reference 40. And, when this gap ΔH10 has been calculated, the detection reference control unit 204 moves the entire detection reference 40 in the downward direction in the figure (i.e. toward the −Z direction) on the basis of the distance ΔH10 as shown in FIG. 9(*b*). In FIG. 9(*b*), the detection reference 40 that has thus been moved is shown by a single dotted chain line. The amount by which the detection reference 40 is moved along the −Z direction could be roughly equal to the distance ΔH10 as shown in FIG. 9(*b*), or could be greater than or less than the distance ΔH10. Thus, if the predetermined non-contact operation 600A intentionally performed by the user 12 has been detected at a position in the space 41 outside the detection reference that is more toward the −Z direction than the detection reference 40, then the detection reference control unit 204 changes the detection reference 40 by moving the entire detection reference 40 in the −Z direction so as to bring it closer to the position where this predetermined non-contact operation 600A has been performed.

It should be understood that although, in FIG. 9, it was arranged for the detection reference control unit 204 to change the detection reference 40 by the amount of change ΔH10 that was calculated, it would also be acceptable to change the detection reference 40 by employing, as the amount of change, a value obtained by adding a predetermined amount h to the gap ΔH10. For this predetermined amount h, there may be suggested a value obtained by averaging differences of the arrival positions of the predetermined non-contact operations 600A (i.e. differences from the arrival positions of the predetermined non-contact operation 600A to the closest reference surface of the detection reference 40), or a value obtained by averaging differences of the starting positions of the predetermined non-contact operations 60A0 (i.e. differences from the starting positions of the predetermined non-contact operations 600A to the closest reference surface of the detection reference 40), or the like. Furthermore, the predetermined amount h could also be a fixed value that is set in advance. In that case, the detection reference 40 will be moved by an amount obtained by simply adding the predetermined amount h to the gap ΔH10 as a margin. Due to these, when the user 12 performs subsequent operations, even if it is not possible to perform the predetermined non-contact operation 600A in precisely the same position, it is still possible to detect the predetermined non-contact operation 600A by the user 12 within the detection reference 40 as long as the error is within the range of the predetermined amount h. Even if the starting position or the arrival position of the predetermined non-contact operation 600A by the user 12 fluctuates for each operation, it is still possible to detect the predetermined non-contact operation by the user 12 within the detection reference 40. Accordingly, if the value obtained by adding the predetermined amount h to the gap ΔH10 is taken as being the amount of change, then it is possible to increase the rate of detection of the predetermined non-contact operation 600A within the detection reference 40, over the rate if the value of the gap ΔH10 is taken as being the amount of change.

Next the calibration processing when, as shown in FIG. 7, a portion of the predetermined non-contact operation 600A is detected in the space 41 outside the detection reference will be explained.

The calibration processing related to a case in which a portion of the predetermined non-contact operation 600A is performed within the detection reference 40 while the remainder thereof is performed at a position higher than the first reference surface 40a as in the case of the predetermined non-contact operation 600A shown in FIG. 7(a) is the same as in the case of FIG. 9(a). In other words, the detection reference control unit 204 moves the entire detection reference 40 upward in the figure (i.e. toward the +Z direction) on the basis of the distance ΔH10.

The calibration processing related to a case in which a portion of the predetermined non-contact operation 600Aa is performed within the detection reference 40 while the remainder thereof is performed at a position more toward the −Z direction than the second reference surface 40b as in the case of the predetermined non-contact operation 600Aa shown in FIG. 7(b) is the same as in the case of FIG. 9(b). In other words, the entire detection reference 40 is moved downward in the figure (i.e. toward the −Z direction) on the basis of the distance ΔH10.

In the calibration processing related to a case in which a portion of the predetermined non-contact operation 600Ab is performed within the detection reference 40 while the remainder thereof is performed at a position outside the third reference surface 40c as in the case of the predetermined non-contact operation 600Ab shown in FIG. 7(b), the detection reference control unit 204 moves the entire detection reference 40 in the X direction on the basis of the distance ΔH10. In this case, the detection reference control unit 204 calculates the distance ΔH10 between the third reference surface 40c of the detection reference 40 and the farthest portion from the third reference surface 40c of the movement track of the predetermined non-contact operation 600A. Upon calculating this distance ΔH10, the detection reference control unit 204 moves the entire detection reference 40 in the X direction in the figure, in other words in the direction to approach the predetermined non-contact operation 600A on the basis of the distance ΔH10.

If it is decided by the decision unit 206 that the user 12 has the intention of operating the icon 30A, then, as the calibration processing, the detection reference control unit 204 moves the position of the detection reference 40 as shown in FIG. 9. As a result it becomes possible to detect the predetermined non-contact operation 600 by the user 12 within the detection reference 40, since the detection reference 40 has been changed to match the position of operation by the user 12 upon the midair image 30 for which display changeover has been performed. Moreover it is possible for the user 12 to continue operating with no sense of discomfort, since processing to perform operations such as changing over the display and so on and also calibration processing are performed in response to a single operation.

As the calibration processing, the detection reference control unit 204 moves the position of the detection reference 40 toward the +Z direction, as in the case shown in FIG. 9(a). However, it would also be acceptable, for example, for the detection reference control unit 204 to move the detection reference 40 by a predetermined amount that is set in advance. It should be understood that this predetermined amount of motion may be set by the user 12. Moreover while, in the above explanation, an example has been cited of a case in which both the start point and the end point of the predetermined non-contact operation 600A1 matched the first reference surface 40a, this should not be considered as being limitative; it would also be acceptable for the calibration processing to be performed for a case in which the start point and the end point of the predetermined non-contact operation 600A1 are included within a predetermined range in the −Z direction from the first reference surface 40a.

By performing processing as described above, it is possible, by a non-contact operation by the user 12, to perform operation processing such as changing over the display of the midair image 30 or the like, and also the calibration processing to change the position of the detection reference 40. In this manner, subsequently, it becomes possible to detect the predetermined non-contact operation 600 performed by the user 12 within the detection reference 40.

Figure 11:
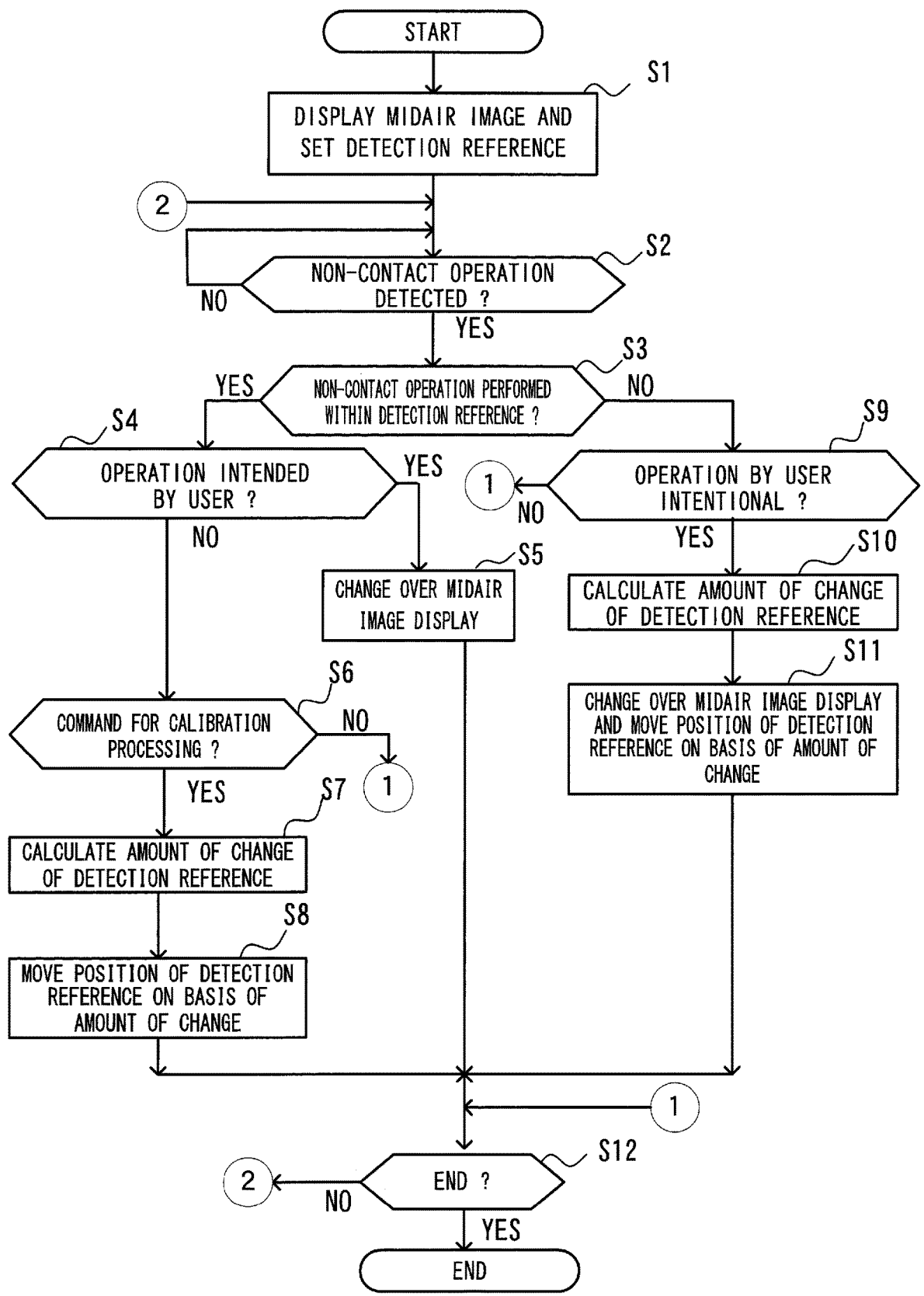
FIG. 11 is a flow chart for explanation of processing performed by the display device according to the first embodiment.

The operation of the display device 1 of the first embodiment will now be explained with reference to the flow chart of FIG. 11. This processing shown in FIG. 11 is performed by the control unit 20 executing a program. This program is stored in the storage unit 205, and is started and executed by the control unit 20.

In step S1, the image generation unit 201 generates display image data for the midair image 30, and the display control unit 202 displays a display image upon the display unit 11 on the basis of this display image data. And the detection reference control unit 204 sets the detection reference 40 at the initial position. The display image that is displayed upon the display unit 11 is an image corresponding to a midair image that includes an icon 30A, as for example shown in FIG. 3(a).

In step S2, on the basis of the detection output of the image capturing device 15, the analysis unit 200 makes a decision as to whether or not a non-contact operation has been performed by the user 12. If it has been detected that a non-contact operation has been performed by the user 12, then an affirmative decision is reached in step S2 and the flow of control proceeds to step S3, whereas if it is not detected that a non-contact operation has been performed, then a negative decision is reached in step S2 and the system waits until the affirmative decision is reached. In step S3, a decision is made as to whether or not the non-contact operation by the user 12 has been performed within the detection reference 40. If the non-contact operation within the detection reference 40 has been detected by the analysis unit 200 (refer to FIG. 5), then an affirmative decision is reached in step S3 and the flow of control proceeds to step S4. But if the non-contact operation within the detection reference 40 has not been detected (refer to FIGS. 6 and 7), then a negative decision is reached in step S3 and the flow of control is transferred to step S9 that will be described hereinafter.

In step S4, the decision unit 206 makes a decision as to whether or not the non-contact operation performed by the user 12 was intended by the user 12. For example, if the predetermined non-contact operation as shown in FIG. 5 or the non-contact operation that satisfies the predetermined condition has been performed, and it is decided by the decision unit 206 that the operation was intended by the user 12, then an affirmative decision is reached in step S4 and the flow of control proceeds to step S5. In step S5, the control unit 20 performs the function of the icon 30A included in the midair image 30 that was displayed in step S1, and the flow of control is transferred to step S12 that will be described hereinafter. For example, the image generation unit 201 may generate the display image data for the midair image 30 of FIG. 3(e), and the display control unit 202 may display a display image based upon this display image data upon the display unit 11. In other words, the display control unit 202 changes over the display to the midair image 30 shown in FIG. 3(e).

If it is decided by the decision unit 206 that the non-contact operation performed by the user 12 is not the predetermined non-contact operation 600 and also is not the non-contact operation that satisfies the predetermined condition, and the operation was performed unintentionally by the user 12, then a negative decision is reached in step S4 and the flow of control is transferred to step S6. In step S6, a decision is made as to whether or not the non-contact operation that has been performed by the user 12 is an operation that commands a transition to the calibration processing. If it is the operation that commands a transition to the calibration processing, then an affirmative decision is reached in step S6 and the flow of control proceeds to step S7. But if the operation was not performed for transition to the calibration processing, then a negative decision is reached in step S6 and the flow of control is transferred to step S12 that will be described hereinafter.

In step S7, the detection reference control unit 204 calculates the amount of change of the detection reference 40. It would be acceptable for this amount of change of the detection reference 40 to be a predetermined amount that is determined in advance, or alternatively it could be calculated on the basis of the position of the non-contact operation performed by the user 12. Then in step S8 the detection reference control unit 204 changes the position of the detection reference 40 on the basis of the amount of change that has been calculated in step S7, and then the flow of control is transferred to step S12 that will be described hereinafter.

If a negative decision is reached in step S3, then in step S9 a decision is made as to whether or not the operation was performed intentionally by the user 12, in a similar manner to the case in step S4. If it is decided that the operation by the user 12 was intentional, then an affirmative decision is reached in step S9 and the flow of control continues to step S10. But if it is decided that the operation was not performed intentionally by the user 12, then a negative decision is reached in step S9 and the flow of control is transferred to step S12 that will be described hereinafter. In step S10 processing similar to that of step S7 is performed, and then the flow of control proceeds to step S11. In step S11 processing similar to that of step S5 and that of step S8 is performed, and then the flow of control proceeds to step S12. In other words, along with the calibration unit 203 performing the calibration processing, the display control unit 202 performs operation processing such as changing over the display of the midair image 30 and so on. In step S12, a decision is made as to whether or not operation to stop the display device 1 has been performed. If operation to stop the display device 1 has been performed, then an affirmative decision is reached in step S12 and the flow of processing terminates, and the operation of the display device 1 is stopped. On the other hand, if operation to stop the display device 1 has not been performed, then a negative decision is reached in step S12 and the flow of processing returns to step S2.

Furthermore, it would also be acceptable for the calibration processing to be performed in the following cases. For example, it may be necessary for the user to operate the same midair image 30 several times. As one example, the midair image 30 may be a password input screen or the like, via which a plurality of digits or letters are to be inputted. Let it be supposed that upon this type of midair image 30, operations by the user are detected until partway, but subsequent operations by the user are not detected. In other words, suppose that operation by the user 12 for inputting the first character has been performed, but no predetermined non-contact operation 600 or non-contact operation that satisfies the predetermined condition in order to input the second character has been detected by the analysis unit 200 within a predetermined time period on the basis of the detection output of the image capturing device 15. In this case, it will be acceptable for the calibration unit 203 to perform the calibration processing. For example, the detection reference control unit 204 may calculate an amount of change of the detection reference 40 so as to widen the range of the detection reference 40 by a predetermined amount. Then the position of the detection reference 40 may be moved on the basis of this amount of change that has thus been calculated.

Moreover, it would also be acceptable for the calibration processing to be performed in cases such as the following. For example, the calibration processing may be performed if it is predicted with high probability that operation upon the midair image 30 is to be performed by the user 12. In concrete terms, there may be a case that, although a password input screen has been displayed as described above, and although a person who is trying to input a personal identification number is detected by the image capturing device 15, no predetermined non-contact operation 600 by the user 12 or non-contact operation that satisfies the predetermined condition is detected even after a predetermined time period has elapsed. In such a case that the analysis unit 200 has not detected either the predetermined non-contact operation 600 or the non-contact operation that satisfies the predetermined condition within a predetermined time period even though the user 12 has been detected on the basis of the detection output of the image capturing device 15, then the calibration unit 203 may perform the calibration processing. The detection reference control unit 204 calculates an amount of change for the detection reference 40 so as to widen the range of the detection reference 40 by a predetermined amount. The position of the detection reference 40 may be moved on the basis of this amount of change that has thus been calculated.

And suppose that, although actually neither the predetermined non-contact operation 600 nor the non-contact operation that satisfies the predetermined condition is performed by the user 12, some foreign object other than the user 12 such as an insect or a piece of debris flies into the detection range 15A of the image capturing device 15, and suppose that its movement, by chance, resembles the track of the predetermined non-contact operation. In this case, there is a possibility that it may be decided that the predetermined non-contact operation 600 has been performed by the user 12. In such a case, on the basis of the detection output of the image capturing device 15, the analysis unit 200 may conclude that the object that has traced the track resembling the predetermined non-contact operation was a foreign object. For example, a case may occur in which the predetermined non-contact operation 600 or the non-contact operation that satisfies the predetermined condition has been detected, even though no image corresponding to a person has been captured in the detection output of the image capturing device 15, or the like.

It should be understood that the calibration processing may be performed by the calibration unit 203, even if the predetermined non-contact operation 600 or the non-contact operation that satisfies the predetermined condition has been detected within the detection reference 40. For example, there may be a case that a non-contact operation by the user 12 is performed at an end portion of the detection reference 40. As one example, the case may be cited in which the predetermined non-contact operation 600A1 shown in FIG. 5 has been performed. In FIG. 5, in the predetermined non-contact operation 600A1, its start point and its end point coincide with the first reference surface 40a of the detection reference 40. In this sort of case, subsequent operation by the user 12 may be performed more toward the +Z direction than the first reference surface 40a, so that the predetermined non-contact operation 600A1 will not be performed within the detection reference 40. In consideration of this, the calibration unit 203 may be arranged to perform the calibration processing.

Moreover it would also be acceptable for the calibration processing to be performed if the arrival position of the non-contact operation coincides with the second reference surface 40b of the detection reference 40, or it is within a predetermined range of the second reference surface 40b toward the +Z direction. As the calibration processing in this case, the detection reference control unit 204 may move the position of the detection reference 40 in the −Z direction by the above described predetermined movement amount, as shown in FIG. 9(b).

Furthermore, although in the above explanation it was described that the calibration processing was performed on the basis of a single non-contact operation by the user 12, it would also be acceptable for the calibration processing to be performed on the basis of a tendency exhibited by the operational positions of a plurality of non-contact operations. This concept will now be explained with reference to FIG. 10.

Figure 10:
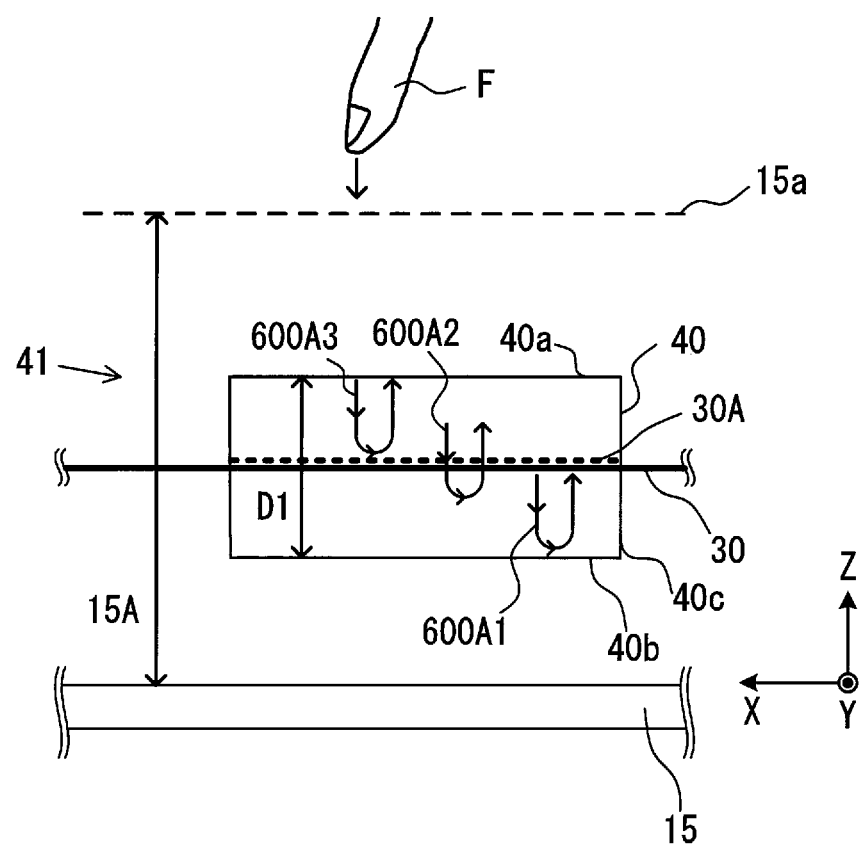
FIG. 10 is a figure schematically showing a case, for the first embodiment, in which each of a plurality of predetermined non-contact operations is performed at a different position within the detection reference.

FIG. 10 shows a case in which three predetermined non-contact operations 600 are performed by the user 12. It will be supposed that the predetermined non-contact operation performed first is 600A1, the predetermined non-contact operation performed second is 600A2, and the predetermined non-contact operation performed third is 600A3. The second predetermined non-contact operation 600A2 is performed more toward the +Z direction within the detection reference 40 than the first predetermined non-contact operation 600A1. Moreover, the third predetermined non-contact operation 600A3 is performed more toward the +Z direction within the detection reference 40 than the second predetermined non-contact operation 600A2. In other words, the position where the predetermined non-contact operation 600A is performed is progressively shifted toward the +Z direction in accordance with repeated operation by the user 12. In this type of case, there is a possibility that subsequent operations by the user 12 will be performed more toward the +Z direction than the first reference surface 40a, and that the predetermined non-contact operation 600A will not be performed within the detection reference 40. Because of this, the calibration unit 203 performs the calibration processing. As the calibration processing in this case, the detection reference control unit 204 may move the position of the detection reference 40 by a predetermined movement amount toward the +Z direction.

Moreover, in FIG. 10, if the predetermined non-contact operation 600A3 is performed first, the predetermined non-contact operation 600A2 is performed second, and the predetermined non-contact operation 600A1 is performed third, then there is a possibility that subsequent operations by the user 12 will be performed more toward the −Z direction than the second reference surface 40a, and that the predetermined non-contact operation 600A will not be performed within the detection reference 40. As the calibration processing in this case, the detection reference control unit 204 may move the position of the detection reference 40 by a predetermined movement amount toward the −Z direction.

In the first embodiment, the control unit 20 controls the display device 1 and the detection reference control unit 204 sets the detection reference 40, on the basis of the position of the operating object based upon the non-contact operation detected by the image capturing device 15, and on the basis of information related to the operating object acquired by the analysis unit 200 based upon the detection output of the image capturing device 15. In this manner, it is possible to perform operation of the display device 1 and also the calibration processing for the detection reference 40 with a single non-contact operation being performed by the operating object, and accordingly it is possible to perform smooth operation without the user 12 experiencing any sense of discomfort.

Furthermore, in the first embodiment, the analysis unit 200 acquires information related to the movement of the operating object. Due to this, it is possible to perform both operation of the display device 1 and also the calibration processing of the detection reference 40 on the basis of the movement of the operating object in the non-contact operation.

Moreover, in the first embodiment, if the analysis unit 200 has detected that the position of the operating object is in the space 41 outside the detection reference, and that the track of the movement of the operating object is a predetermined track, then the control unit 20 controls the display device 1 and the detection reference control unit 204 sets the detection reference 40. Due to this, if it can be considered that the user 12 has intended to perform an operation, it is possible to operate the display device 1 and to perform the calibration processing of the detection reference 40.

Yet further, in the first embodiment, if the analysis unit 200 has detected that the distance between one point upon the track of the operating object and the detection reference 40 is less than a predetermined distance, then the control unit 20 operates the display device 1, and the detection reference control unit 204 sets the detection reference 40. If the user 12 has performed a non-contact operation at a position far away from the midair image 30, then it is difficult to consider that the user has any intention of performing an operation upon the midair image 30. Accordingly, it is possible to operate the display device 1 while preventing the calibration processing of the detection reference 40 from being performed.

Even further, in the first embodiment, if the analysis unit 200 has detected that the position of the operating object is in the space 41 outside the detection reference, and that the direction of the movement of the operating object is a predetermined direction, then the control unit 20 operates the display device 1, and the detection reference control unit 204 sets the detection reference 40. In this case, if the operation by the user is toward the icon 30A, then it is considered that the user 12 does intend to perform an operation, even if the operation is not detected within the detection reference 40. In this manner, if it can be considered that the user 12 has the intention of performing the operation, even though he has no accurate visual confirmation of the position of the midair image 30 in the Z direction, it is possible to operate the display device 1 and to perform the calibration processing of the detection reference 40.

Variation 1 of First Embodiment

The display device 1 of the first embodiment shown in FIG. 1 and FIG. 2 decides whether or not the user 12 intended to operate the icon 30A on the basis of the track and the position of the non-contact operation performed by the user 12. With the display device 1 of Variation 1, the speed or the acceleration of the fingertip of the user 12 while the user 12 performs the non-contact operation are calculated, and it is decided whether or not the user intends to operate the icon 30A on the basis of the speed or the acceleration that have thus been calculated.

Figure 12:
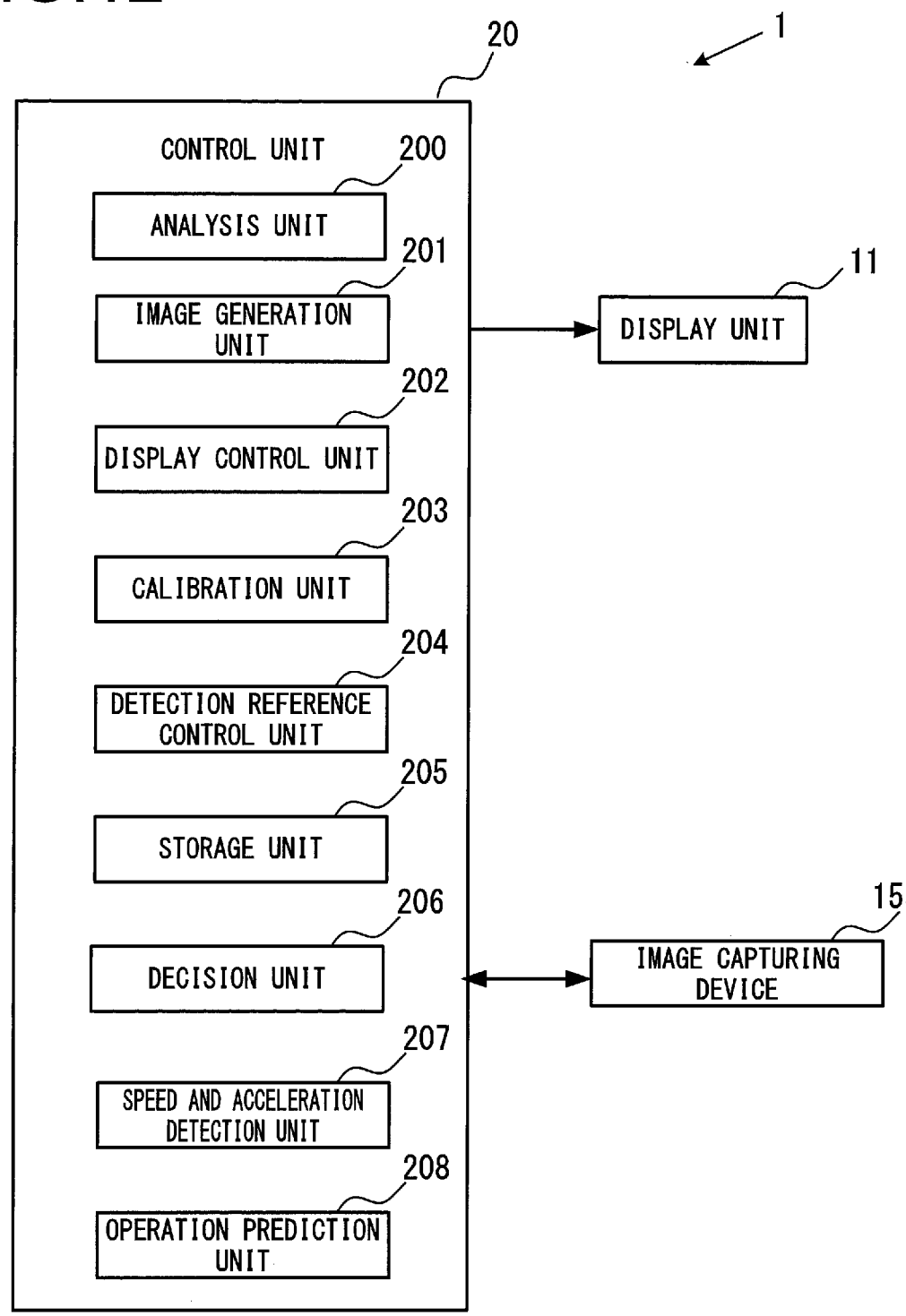
FIG. 12 is a block diagram for explanation of the structure of main portions of a display device according to a first variant embodiment of the first embodiment.

The structure of main portions of the display device 1 of Variation 1 is shown in the block diagram of FIG. 12. In the structure of the display device 1 of Variation 1, FIG. 12 shows the control unit 20, and the display unit 11 and the image capturing device 15 controlled by the control unit 20. In addition to the structures included in the control unit 20 of the display device 1 of the first embodiment shown in FIG. 2, the control unit 20 in FIG. 12 further comprises a speed and acceleration detection unit 207 and an operation prediction unit 208. It should be understood that it would be possible to apply each of the structures that can be applied as the display device 1 of the first embodiment described above to this display device 1 of Variation 1.

The speed and acceleration detection unit 207 acquires the detection output from the image capturing device 15 at predetermined time intervals, and, along with calculating the movement speed of the position of the finger over the image in a predetermined time period, also calculates the acceleration of the movement of the finger from its calculated speed. And, if the movement speed and/or the movement acceleration calculated by the speed and acceleration detection unit 207 is less than or equal to a predetermined value, then the operation prediction unit 208 calculates, in other words predicts, the movement track of the finger F on the basis of the movement speed or the movement acceleration of the finger outputted from the speed and acceleration detection unit 207. And, on the basis of the movement track of the finger F that has been predicted by the operation prediction unit 208, the analysis unit 200 compares this track with the track of the predetermined non-contact operation 600, in a similar manner to the case with the first embodiment. Alternatively, the analysis unit 200 may calculate the direction and/or the position of the movement track predicted by the operation prediction unit 208. Then, on the basis of the result of comparison by the analysis unit 200 with the movement track of the non-contact operation by the user, and/or on the basis of the direction and/or the position of the movement track, the decision unit 206 determines whether or not the user 12 intended to perform the operation, in a similar manner to the case with the first embodiment.

It should be understood that it would also be acceptable for the decision unit 206 to determine whether or not the user 12 intended to perform operation, on the basis of the movement speed and/or the movement acceleration calculated by the speed and acceleration detection unit 207. Alternatively, it would also be acceptable for the decision unit 206 to determine whether or not the user 12 intended to perform operation, by combining the movement track and/or the position of the non-contact operation by the user 12 detected by the analysis unit 200 in a similar manner to the case with the first embodiment, and the movement speed and/or the movement acceleration calculated by the acceleration detection unit 207. For example, if the movement speed and/or the movement acceleration calculated by the speed and acceleration detection unit 207 is greater than a predetermined value, then the possibility is high that abrupt operation by the user is being performed, for example an operation such as whipping his finger downward at high speed from the +Y direction toward the −Y direction. In this type of case, the possibility that the user 12 is performing the predetermined non-contact operation 600 is low. Accordingly, the decision unit 206 determines that the user 12 does not intend to operate the icon 30A, even if the movement track of the non-contact operation by the user 12 is that of the predetermined non-contact operation or even if it is the non-contact operation that satisfies the predetermined condition.

Furthermore, the case has been cited as an example in which, if abrupt operation is performed by the user 12 in which the movement speed or the movement acceleration exceeds a predetermined value, then the decision unit 206 decides that the user 12 did not intend to perform the operation; but this is not to be considered as being limitative. It will also be acceptable for the decision unit 206 to decide that the user has not intended to perform the operation if the movement speed or the movement acceleration is smaller than a predetermined value, in other words if the user 12 is performing operation slowly. In this case as well, the decision unit 206 may decide that the user 12 does not intend to operate the icon 30A, even if the movement track of the non-contact operation by the user 12 is that of the predetermined non-contact operation, or even if it is the non-contact operation that satisfies the predetermined condition.

The display device 1 according to Variation 1 may perform processing that is similar to the processing performed by the display device 1 of the first embodiment shown in the flow chart of FIG. 11. However, in the processing of steps S4 and S9, in addition to the method explained in connection with the first embodiment, the decision unit 206 may also decide that the user 12 does not intend to perform the operation, if the movement speed and/or the movement acceleration calculated by the speed and acceleration detection unit 207 is greater than a predetermined value, or is smaller than a predetermined value. Alternatively, it would also be acceptable to decide that the user 12 intends to perform the operation, if the track of the non-contact operation predicted by the operation prediction unit 208 and the track of the predetermined non-contact operation 600 agree with one another. If they do not match one another, then it may be decided that the user 12 has not intended to perform the operation.

It should be understood that if, due to the influence of disturbance or the like, information about the operating object such as the finger of the user 12 or the like is not included in some of the detection output data among the plurality of detection output data of the image capturing device 15, then there is a possibility that the movement speed or the movement acceleration of the non-contact operation by the user 12 may not be detected in an accurate manner. In other words, the shape of the non-contact operation by the user based upon the detection output may be detected as deformed, or the movement speed and/or the movement acceleration may be detected as being a larger value as compared with the actual movement speed and/or the actual movement acceleration. In such a case, the operation prediction unit 208 may be arranged to calculate the movement speed and/or the movement acceleration after additional processing, such as for performing averaging of the plurality of detection output data of the image capturing device 15.

In Variation 1 of the first embodiment, even if for example the position of the operating object is detected to be in the space 41 outside the detection reference, the control unit 20 may be arranged to operate the display device 1 and the detection reference control unit 204 may set the detection reference, if the movement speed of the operating object is a predetermined speed. Or it may be arranged for operation of the display device 1 and setting of the detection reference to be performed on the basis of the predicted track of non-contact operation. Due to this, it is possible to decide whether or not the user intends to perform the operation in a more accurate manner, and it is possible to perform operation of the display device 1 and calibration processing of the detection reference 40 rapidly.

Variation 2 of First Embodiment

The display device 1 of the first embodiment shown in FIG. 1 and FIG. 2 and the display device 1 of Variation 1 decided whether or not the operation of the midair image 30 by the user 12 was intentional on the basis of the movement track and/or the position of the non-contact operation by the user 12. However, in the display device 1 of Variation 2, when the user 12 performs predefined gestures upon the midair image 30, the display device 1 may perform respective functions. In other words, the decision unit 206 may decide whether or not the user 12 has intended to perform the operation on the basis of a gesture (i.e. the shape of the non-contact operation by the user 12) detected by the analysis unit 200. Moreover, it would also be acceptable for the decision unit 206 to decide whether or not the user 12 has intended to perform the operation, by combining the movement track and/or the position of the non-contact operation by the user 12 detected by the analysis unit 200 in a similar manner to the case with the first embodiment, and the shape of the non-contact operation. One example of such a gesture is the operation of, when operating an icon 30A, performing tapping down and tapping up with one finger so as to trace a track, as shown in FIG. 4. Moreover, examples, such as for sliding over the entire midair image 30 so as to turn a page, may include: an operation of the user 12 waving his hand or arm in the +X direction; an operation of the user 12 performing flicking operation in which he moves his finger or hand in one direction (the +X direction) with a flick after extending it in the direction toward the display device 1; swiping operation in which his finger or hand is moved as if tracing in one direction (the +X direction) and the like. It should be understood that, as aspects of gestures, what type of operation is performed, or whether the operation is performed with the entire hand, or whether the operation is performed with a single finger, or whether the operation is performed with a plurality of fingers, or whether the operation is performed with the hand clenched, are set in advance on the basis of the contents of the display of the midair image 30, and are stored in the storage unit 205.

The structure of the display device 1 of the first embodiment shown in FIG. 2 can be applied as the structure of the display device 1 of this Variation 2. It should be understood that it would also be acceptable to apply a structure similar to that of the display device 1 of Variation 1 shown in FIG. 12 as the structure of the display device 1 of this Variation 2. With the display device 1 of this Variation 2, the analysis unit 200 detects a gesture performed by the user 12 on the basis of the detection output from the image capturing device 15. If the gesture by the user 12 that has thus been detected is different from the gestures stored in the storage unit 205, then the decision unit 206 decides that this gesture is not the operation that is intentionally performed by the user 12. For example, suppose that it has been detected that the user 12 has performed the operation of tapping down and tapping up upon the icon 30A by using his entire hand. As described above, one of the gestures upon the icon 30A is the operation of performing tapping down and tapping up by using a single finger. In this case, the operating object for the gesture which the user 12 has performed (i.e. his entire hand) and the operating object for the gesture that is stored in the storage unit 205 (i.e. his single finger) are different from one another in size, in other words the shapes of their external appearances are different. Accordingly, the decision unit 206 decides that this is not the operation that is intentionally performed by the user 12, even if the movement track of the non-contact operation by the user is that of the predetermined non-contact operation, or if it is the non-contact operation that satisfies the predetermined condition. Moreover, if the user 12 has performed a gesture of swishing his hand over the icon 30A, since this is different from the gestures that are stored in the storage unit 205, accordingly the decision unit 206 decides that this is not the operation that is intentionally performed by the user 12.

It should be understood that, as in the case of Variation 1 described above, it will also be acceptable for the decision unit 206 to decide whether or not the user 12 intended to perform the operation by combining the movement speed and the movement acceleration of the non-contact operation performed by the user 12.

The display device 1 of Variation 2 may perform processing similar to the processing performed by the display device 1 of the first embodiment as shown in the flow chart of FIG. 11. However, in step S2, the analysis unit 200 detects a gesture performed by the user 12 on the basis of the detection output of the image capturing device 15. And, in the processing of step S4 and step S9, the gesture that has been detected and a gesture that is stored in the storage unit 205 are compared together by the analysis unit 200, and, if it is decided that the size of the operating object, i.e. the shape of its external appearance, and/or the pattern of a gesture are the same or resemble one another sufficiently to be considered as being the same, then the decision unit 206 decides that the user 12 had the intention of performing the operation.

In Variation 2 of the first embodiment, even if the position of the operating object has been detected to be in the space 41 outside the detection reference, if the external appearance of the operating object is a predetermined external appearance, then it is decided that the user 12 intended to perform the operation, and the control unit 20 can operate the display device 1 and the detection reference control unit 204 can set the detection reference 40. In this manner, if an operation is performed on the basis of a predetermined gesture that is set in advance, then it is possible to perform both control of the display device 1 and also the calibration processing for the detection reference 40.

Furthermore, in Variation 2 of the first embodiment, the external appearance of the operating object may correspond to the shape of the operating object. Due to this, if a predetermined gesture for an operation is performed with the shape of a hand or a finger that is set in advance, then it is possible to consider that the user 12 had the intention of performing that operation.

Variation 3 of First Embodiment

With the display device 1 of Variation 3, when an operating object bears a predetermined color and/or pattern and displays it as its external appearance, the decision unit 206 decides that the user 12 has the intention of performing the operation. In other words, the decision unit 206 may decide whether or not the user 12 has the intention of performing the operation, on the basis of a predetermined color that is borne upon the operating object as detected by the analysis unit 200. Moreover, in a similar manner to the case with the first embodiment, it would also be acceptable for the decision unit 206 to decide whether or not the user 12 intends to perform the operation by combining the movement track and/or the position of the non-contact operation by the user 12 detected by the analysis unit 200 in a similar manner to the first embodiment with a color borne by the operating object. In this case, for example, the user 12 may perform an operation upon the midair image 30 by attaching to his finger a tape, a seal, a cap or the like that is colored red, which serves as a predetermined color. Alternatively, the user 12 may perform the operation upon the midair image 30 while wearing a red colored glove. It should be understood that the tape, seal, cap, or glove described above is not limited to being red in color; for example, it would also be acceptable for it to bear a predetermined pattern such as stripes, polka dots, or the like.

The structure of the display device 1 of the first embodiment shown in FIG. 2 or the structure of Variation 2 can be applied as the structure of the display device 1 of this Variation 3. It should be understood that it would also be acceptable to apply a similar structure to that of the display device 1 of Variation 1 shown in FIG. 12 as the structure of the display device 1 of this Variation 3. With the display device 1 of this Variation 3, the analysis unit 200 detects a non-contact operation and/or a gesture by the user 12 on the basis of the detection output of the image capturing device 15. If, on the basis of the detection output of the image capturing device 15, the analysis unit 200 has detected that a predetermined color and/or pattern is borne upon an operating object, in other words is borne upon a finger or a hand, that has performed the predetermined non-contact operation 600 or a gesture operation, then the decision unit 206 decides that the user 12 intended to perform the operation. But if the operation object such as the finger or hand does not bear the predetermined color and/or pattern, then the decision unit 206 decides that the user 12 did not intend to perform the operation, even if the movement track of the non-contact operation performed by the user 12 agrees with that of the predetermined non-contact operation, or the non-contact operation is one that satisfies the predetermined condition.

The display device 1 of Variation 3 may perform processing similar to the processing performed by the display device 1 of the first embodiment as shown in the flow chart of FIG. 11. However, in step S2, the analysis unit 200 detects operation by the user 12 on the basis of the detection output of the image capturing device 15, and detects whether the predetermined color or pattern is borne by the operating object. And in step S4 and step S9 the decision unit 206 decides that the user 12 intended to perform the operation, if it has been detected that the predetermined color or pattern is borne by the operating object.

It should be understood that, in the above explanation, an example has been cited in which, as an external appearance, a predetermined color or pattern is borne by the finger or the hand of the user 12, but this should not be considered as being limitative. For example, it would also be acceptable for the decision unit 206 to decide that the user 12 has intended to perform the operation, if, as an operating object, the user 12 is using a pen or a pointer or the like that bears the predetermined color and/or pattern. In other words, if it has been decided by the analysis unit 200 that the user 12 has performed tan operation by employing a pen or the like that bears a color or a pattern that is different from the predetermined color or pattern, then the decision unit 206 decides that the user 12 does not intend to perform the operation.

Furthermore, it would also be acceptable for the decision unit 206 to decide that the user 12 has intended to perform the operation, if the user 12 has employed a dedicated pen to emit a predetermined color. For example, a button may be provided upon a dedicated pen, and, when this button is operated by being pressed, light of a predetermined color (for example red color) is emitted from a light emitting portion such as a LED or the like that is provided at the tip of the pen. For performing an operation upon the icon 30A, the user 12 presses the button on the dedicated pen to operate it, and light of the predetermined color is emitted. When, on the basis of the detection output of the image capturing device 15, the analysis unit 200 has detected that light of the predetermined color is being emitted from the tip of the dedicated pen, then the decision unit 206 may decide that the user 12 has intended to perform the operation. But if the analysis unit 200 has not detected that light of the predetermined color is being emitted from the tip of the dedicated pen, then the decision unit 206 decides that the operation in this time is not intentionally performed by the user 12.

It should be understood that the decision unit 206 is not limited to deciding that the user 12 is intending to perform the operation when the dedicated pen is emitting light of the predetermined color. For example, it would also be acceptable for the decision unit 206 to decide that the user 12 is intending to perform the operation, if the analysis unit 200 has detected that the dedicated pen is blinking on a predetermined cycle, or that its intensity is greater than a predetermined value, or that its color has changed from a first color (for example red color) to a second color (for example blue color).

Moreover it should be understood that, if a dedicated pen or the like of the type described above is employed, it would also be acceptable for this dedicated pen to output both ultrasound and infrared light. In this case, the display device 1 would further comprise a reception unit that receives the ultrasound and the infrared light outputted from the dedicated pen. The reception unit would detect the movement of the dedicated pen by employing a per se known technique, on the basis of the time difference between the moment of receiving the infrared light and the moment of receiving the ultrasound. It would be acceptable for the decision unit 206 to decide that the user 12 intends to perform the operation if the operation is performed upon the midair image 30 by using the dedicated pen, in other words if the reception unit has received infrared light.

Furthermore, it should be understood that the decision unit 206 may be arranged to decide whether or not the user 12 has intended to perform the operation, by also combining the movement speed and/or the movement acceleration of the non-contact operation performed by the user 12, as in the case of Variation 1 described above. Moreover, it may be arranged for the decision unit 206 to decide whether or not the user 12 has intended to perform the operation, by also combining the shape (in other words, the gesture pattern) of the non-contact operation performed by the user 12, as in the case of Variation 2 described above.

In Variation 3 of the first embodiment, the color or pattern or light emitted by the operating object was taken as being the external appearance of the operating object. Due to this, for example, it is possible to consider that the user 12 intends to perform the operation when the operation is performed by employing an operating object that bears a predetermined color or pattern or the like that is set in advance.

Variation 4 of First Embodiment

With the display devices 1 of the first embodiment and Variations 1 through 3, a decision as to whether or not the user 12 intended to perform the operation was made on the basis of operation that employed a finger or a hand or a pen or the like as an operating object. However, with the display device 1 according to Variation 4, a decision as to whether or not the user 12 intends to perform the operation is made on the basis of the state of the user 12 who is operating the display device 1. In other words, the decision unit 206 may decide whether or not the user 12 intends to perform the operation, on the basis of the state of the user 12 as detected by the analysis unit 200. Furthermore, in a similar manner to the case with the first embodiment, it would also be acceptable for the decision unit 206 to decide whether or not the user 12 intends to perform the operation, by combining the movement track and/or the position of the non-contact operation by the user 12 as detected by the analysis unit 200 in a similar manner to the first embodiment with the state of the user 12.

The structure of the display device 1 of the first embodiment or the structure of any of Variations 1 through 3 can be applied as the structure of the display device 1 of Variation 4. As the state of the user 12, for example, the line of sight of the user 12 may be employed. When the user 12 has performed an operation upon the icon 30A, the analysis unit 200 analyzes, on the basis of the detection output of the image capturing device 15, whether the line of sight of the user 12 is oriented toward the icon 30A. And the decision unit 206 decides, on the basis of the result of this analysis, that the user 12 intends to perform the operation if the line of sight of the user 12 is oriented toward the icon 30A. But if the line of sight of the user 12 is oriented toward a position that is different from that of the icon 30A, then the decision unit 206 decides that the user 12 is not intentionally performing the operation, even if the movement track of the non-contact operation that has been detected is that of the predetermined non-contact operation or the non-contact operation is one that satisfies the predetermined condition.

The display device 1 of this Variation 4 may perform processing similar to the processing performed by the display device 1 of the first embodiment as shown in the flow chart of FIG. 11. However, in step S2, the analysis unit 200 detects the line of sight of the user 12 on the basis of the detection output of the image capturing device 15. And, in step S4 and step S9, if it is detected that the line of sight of the user 12 is oriented toward the icon 30A, then the decision unit 206 may determine in step S4 and step S9 that the user 12 intends to perform the operation.

It should be understood that the feature that the decision unit 206 decides that the operation by the user 12 is intentional if the line of sight of the user 12 is oriented toward the icon 30A, is not to be considered as necessarily being limitative. For example, if the line of sight of the user 12 deviates greatly upward, downward, leftward, and rightward, then there is a possibility that the user 12 is wondering which icon 30A to operate, among the plurality of icons 30A. Accordingly, when a non-contact operation is detected, if the analysis unit 200 detects that the amount of movement of the line of sight of the user 12 was large, in other words that it has exceeded a predetermined movement amount, then the decision unit 206 is able to decide that this operation by the user 12 was not intentional. On the other hand, if the amount of movement of the line of sight of the user 12 was small, then the possibility is high that the user 12 decided which of the icons 30A to operate, and operated the icon 30A at the end of his line of sight. Accordingly, when a non-contact operation is detected, if the analysis unit 200 detects that the amount of movement of the line of sight of the user 12 was small, in other words that it was less than the predetermined movement amount, then the decision unit 206 is able to decide that this operation by the user 12 was intentional.

Furthermore, it would also be acceptable for the decision unit 206 to decide whether or not the user 12 has intended to perform the operation, on the basis of the orientation of the face of the user 12, instead of the orientation or the movement amount of his line of sight. In this case, the analysis unit 200 may detect the face of the user 12 by performing per se known face detection on the basis of the detection output of the image capturing device 15, and may thereby detect whether or not his face is oriented toward the icon 30A. And if, as a result of this analysis, the face of the user 12 is oriented toward the icon 30A, then the decision unit 206 may decide that the user 12 intends to perform the operation; whereas, if the face of the user 12 is not oriented toward the icon 30A, then the decision unit 206 may decide that the user 12 does not intend to perform the operation. Furthermore, if the amount of movement of the face of the user 12 is large, then there is a possibility that the user 12 is wondering which icon 30A to operate, among the plurality of icons 30A. Accordingly, when the user 12 operates the midair image 30, if the analysis unit 200 detects that the amount of movement of the face of the user 12 was larger than a predetermined movement amount, then the decision unit 206 is able to decide that this operation by the user was not intentional, even if the movement track of the non-contact operation by the user 12 is that of the predetermined non-contact operation or the non-contact operation is one that satisfies the predetermined condition. Moreover, the analysis unit 200 may detect some aspect of the behavior of the user 12, such as that he is tilting his head. If this type of detection result has been obtained, then the decision unit 206 may decide that the operation by the user 12 was not intentional. On the other hand, if the amount of movement of the face of the user 12 is small, then the possibility is high that the user 12 decided which of the icons 30A to operate, and that he operates the icon 30A to which the face of the user 12 was oriented. Accordingly, when the user 12 operates the midair image 30, if the analysis unit 200 detects that the amount of movement of the face of the user 12 was smaller than a predetermined movement amount, then the decision unit 206 is able to decide that this operation by the user 12 was intentional.

It should be understood that the decision unit 206 may be arranged to decide whether or not the operation by the user 12 is intentional, by combining the line of sight of the user 12 described above with the orientation and/or the movement of the face of the user. In this case, as one example, in a case such as when the user 12 is tilting his head, the decision unit 206 may decide that the user 12 does not intend to perform the operation, even though the line of sight of the user 12 is oriented toward the icon 30A.

Furthermore, it would also be acceptable for the decision unit 206 to decide whether or not the operation by the user 12 was intentional by employing the facial expression of the user 12, instead of the orientation or the movement of the line of sight or of the face of the user 12, or in addition thereto. For example, it will be acceptable for the decision unit 206 to decide that the user 12 has intentionally performed the operation, if the analysis unit 200 has detected that the user 12 has performed the operation upon the icon 30A with a serious facial expression, rather than with a smiling face.

In the above explanation, examples have been cited in which the line of sight of the user 12 or movement of his head, or his facial expression or the like, have been considered as being states of the user 12, but these should not be considered as being limitative. For example, it would also be acceptable to decide whether or not the user 12 has intended to perform the operation, on the basis of sound uttered by the user 12. When the user 12 operates the midair image 30, if it is detected that he has uttered the words, for example, "the device is not working" or "I want to operate the device" or the like, then the decision unit 206 may decide that the user 12 intended to perform the operation.

Figure 13:
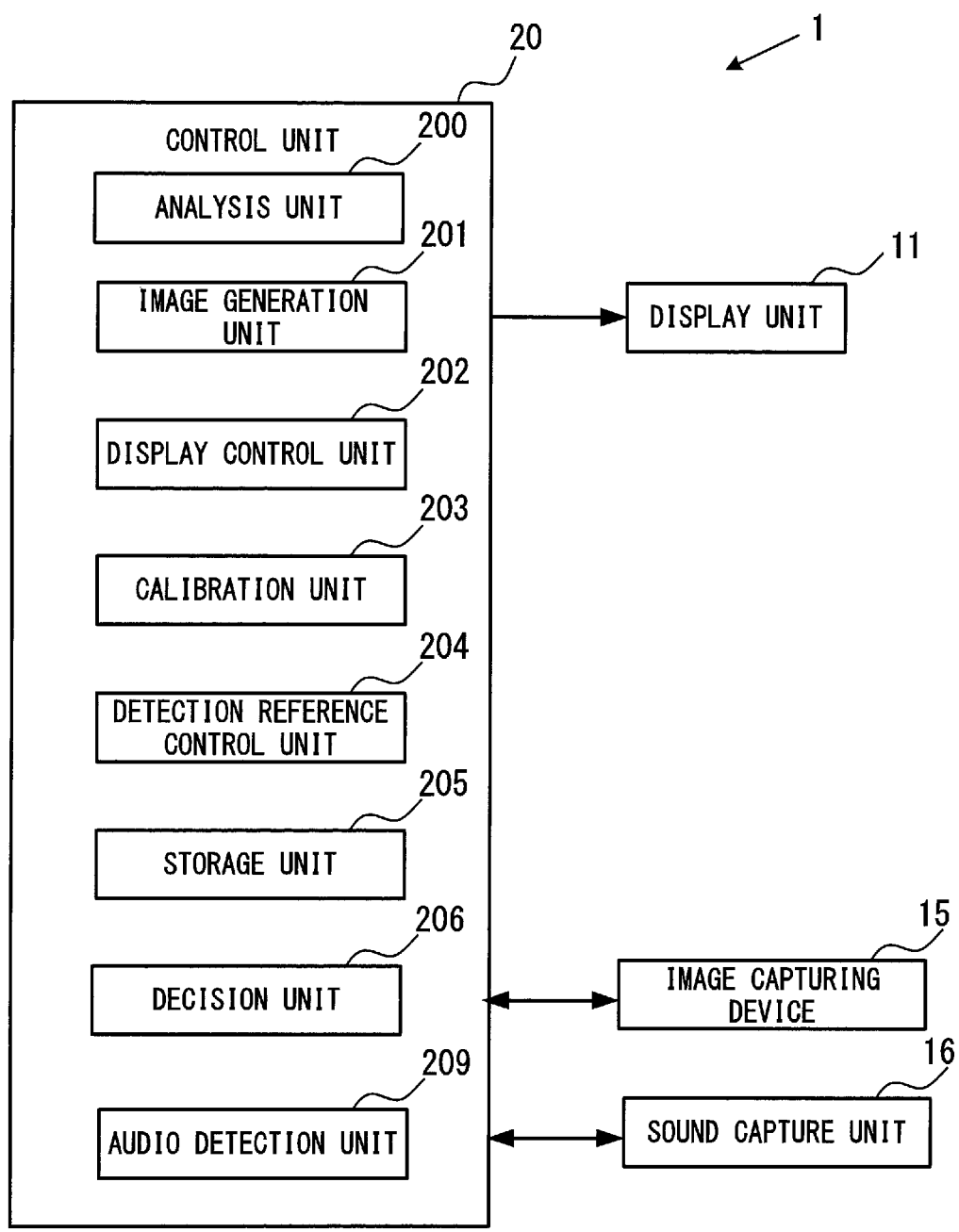
FIG. 13 is a block diagram for explanation of the structure of main portions of a display device according to a fourth variant embodiment of the first embodiment.

The structure of main portions of the display device 1 in this case is shown in the block diagram of FIG. 13. This display device 1 comprises a sound capture unit 16 in addition to the structures of the display device 1 of the first embodiment, and an audio detection unit 209 is provided to the control unit 20. The sound capture unit 16 captures sounds around the display device 1, and outputs the result as audio data to the audio detection unit 209. A commercially available microphone may be used as the sound capture unit 16. The audio detection unit 209 identifies the audio data from the sound capture unit 16, and detects sound uttered by the user 12 when he operates the midair image 30. And the decision unit 206 may decide that the user 12 intentionally performs the operation, if sound saying "the device is not working" or "I want to operate the device" has been detected by the audio detection unit 209.

With the display device 1 in this case, if, in step S3 of the flow chart of FIG. 11 as performed by the display device of the first embodiment, the audio detection unit 209 has detected that the user 12 has uttered the words "the device is not working" or "I want to operate the device" or the like, then the decision unit 206 decides in step S4 or step S9 that the user 12 intends to perform the operation.

It should be understood that the decision unit 206 may be arranged to determine whether or not the user 12 intends to perform the operation, by combining the line of sight of the user 12, his face or head, and his facial expression as described above.

It should be understood that the decision unit 206 may be arranged to decide whether or not the user 12 has intended to perform the operation, by also combining the movement speed or the movement acceleration of the non-contact operation performed by the user 12, as in Variation 1 described above. Moreover, it would also be acceptable for the decision unit 206 to decide whether or not the user 12 has intended to perform the operation, by also combining the shape (i.e. the gesture pattern) of the non-contact operation performed by the user 12, as in Variation 2 described above. Yet further, it would also be acceptable for the decision unit 206 to decide whether or not the user 12 has intended to perform the operation by also combining the color of the operating object, as in Variation 3 described above.

In this Variation 4 of the first embodiment, even if the position of the operating object has been detected in the space 41 outside the detection reference, if the orientation of the line of sight of the user 12 or the orientation of his face is a predetermined orientation, in other words if it is in the direction of the icon 30A, then the control unit 20 may operate the display device 1, and the detection reference control unit 204 may set the detection reference 40. Due to this, it is possible to determine whether or not the user 12 intends to perform the operation in an accurate manner, and to perform both execution processing such as changing the icon display or the like and also calibration processing.

Furthermore, in this Variation 4 of the first embodiment, even if the position of the operating object has been detected in the space 41 outside the detection reference, if the movement of the line of sight of the user 12 or the movement of his face is smaller than a predetermined movement amount, then the control unit 20 may operate the display device 1, and the detection reference control unit 204 may set the detection reference 40. Since the possibility is high that the user 12 has decided which type of operation to perform if the movement of the line of sight of the user 12 or the movement of his face is small, accordingly it is possible to decide in an accurate manner whether or not the user 12 intended to perform the operation.

With this Variation 4 of the first embodiment, the control unit 20 is able to operate the display device 1 and the detection reference control unit 204 is able to set the detection reference 40, on the basis of the position of the operating object and the words or the facial expression of the user 12. Due to this, it is possible to decide in an accurate manner whether or not the user intends to perform the operation, on the basis of the words uttered or the facial expression shown by the user 12.

Variation 5 of First Embodiment

In the display device 1 of Variation 5, the decision unit 206 makes a decision as to whether or not the latest operation performed by the user 12 was intentional, on the basis of the history of a plurality of operations performed by the user 12 in the past.

The structure of the display device 1 of the first embodiment and of any of Variation 1 through 4 of the first embodiment described above can be applied as the structure of the display device 1 of Variation 5. If the user 12 has performed the operation in a different operational mode from the operational mode of a plurality of user operations, then the decision unit 206 of the display device 1 of Variation 5 decides that this operation was not intentional, even if the movement track of this non-contact operation by the user is that of the predetermined non-contact operation or that of a non-contact operation that satisfies the predetermined condition.

For example it is supposed that, when the user 12 operates an icon 30A, he performs tapping down and tapping up with a single finger. These operational modes by the user 12 are stored in the storage unit 205 as history. And suppose that, irrespective of the fact that, up until now, the user 12 has performed operation a plurality of times with a single finger, now he operates the icon 30A with his hand in the clenched state. If, in this way, the user 12 performs operation in a different operational mode from the mode which he normally employs, then there is a possibility that the user 12 is hesitating whether or not to operate the icon 30A. Accordingly, the decision unit 206 decides that this operation by the user was not performed intentionally.

In this case, on the basis of the detection output of the image capturing device 15, the decision unit 206 compares together the mode of the user operation that has been detected this time by the analysis unit 200 (which is the operation with his hand clenched), and the mode of the user operation in the history stored in the storage unit 205 (which is the operation with a single finger). And, since the mode of the user operation this time is different from the mode of the user operation stored in the history, accordingly the decision unit 206 decides that this user operation performed with the hand clenched was not intentional operation.

Furthermore suppose that for example, even though the user 12 has usually operated the icon 30A with tapping down and tapping up, he has now performed a gesture of swishing or waving his hand. Also in this case, the decision unit 206 decides that this operation by the user was not intentional, since the mode of the user operation that has been detected by the analysis unit 200 this time (i.e. hand-swishing operation) is different from the mode of the user operation stored in the history (i.e. tapping down and tapping up).

Moreover, even though, for example, the user 12 previously performed the user operations at a certain movement speed to operate the icon 30A, if this time he has performed the user operation at a slower movement speed than the certain movement speed, then there is a possibility that the user 12 may not have had confidence in performing this operation. In this case, the decision unit 206 decides that the operation that the user has performed at the slower movement speed is not intentional. In other words, the decision unit 206 determines whether or not the user has intended to perform the operation, on the basis of the result of comparison between the operation that the user 12 has performed this time, and the history of the personal operational mode of this user 12.

In this case, in this display device 1, in step S4 and step S9 of the flow chart of FIG. 11 performed by the display device of the first embodiment, the decision unit 206 makes a comparison with the history of operation by the user in the past, and makes a decision as to whether or not the operational mode employed by the user this time is the same as the operational mode that he has used historically. If the operational mode employed by the user this time and his historical operational mode are the same, then affirmative decisions are reached in step S4 and step S9, whereas if they are different then negative decisions are reached in step S4 and step S9.

In this Variation 5 of the first embodiment, the decision unit 206 makes a decision as to whether or not the latest operation by the user 12 was intentional, on the basis of the history of a plurality of operations. Due to this it is possible, on the basis of the tendency of operations performed by the user 12 in the past, to make a decision as to whether the operation on the icon 30A by the user 12 was performed with the user in a decisive mental state or in a hesitant mental state.

Variation 6 of First Embodiment

With the display devices 1 of the first embodiment and of Variations 1 through 5, if it has been decided that the operation by the user 12 in the space 41 outside the detection reference has been performed intentionally, then the function of the icon 30A that has been operated by the user 12 is performed, and calibration processing is also performed. In other words, every time that the operation by the user 12 satisfies the condition described above, the function of the icon is performed and also calibration processing is performed. However, with the display device 1 of this Variation 6, when the operation by the user 12 satisfies the condition described above, whether or not to perform the calibration processing is determined on the basis of a predetermined condition.

The structure of the display device 1 of the first embodiment and of any of the Variations 1 through 5 can be applied as the structure of the display device 1 of this Variation 6. And the decision as to whether or not the operation by the user was performed intentionally is performed in a similar manner to the cases of the first embodiment and Variations 1 through 5 in the case of this display device 1 of Variation 6 as well. If the predetermined non-contact operation 600 by the user 12 or the non-contact operation that satisfies the predetermined condition is detected in the space 41 outside the detection reference and it has been decided that this operation by the user was intentional, then, in a similar manner to the cases of the first embodiment and Variations 1 through 5, the function of the icon 30A is performed and also the calibration processing is performed. However, the control unit 20 counts the number of times that the calibration processing is performed, and, if the calibration processing has been performed a predetermined number of times (for example five times), then the calibration unit 203 is prohibited from performing the calibration processing. In other words, even if the calibration processing is required on the basis of the user operation, the calibration processing is only actually performed for the initial predetermined number of times.

The operation of the display device 1 of this Variation 6 of the first embodiment will now be explained with reference to the flow chart of FIG. 14. The processing of steps S21 through S29 is the same as the processing of steps S1 through S9 shown in the flow chart of FIG. 11. In step S30, a decision is made as to whether or not the number of times k that the calibration processing has been performed is less than or equal to a predetermined number of times. If the number of times k that the calibration processing has been performed is less than or equal to the predetermined number of times, then an affirmative decision is reached in step S30 and the flow of control proceeds to step S31. But if the number of times k that the calibration processing has been performed is greater than the predetermined number of times, then a negative decision is reached in step S30 and the flow of control is transferred to step S25.

The processing of step S31 and S32 is the same as the processing of steps S10 and S11 of FIG. 11. And in step S33, the number of times k that the calibration processing has been performed is incremented by one, and the flow of control proceeds to step S34. The processing of step S34 is the same as the processing of step S12 of FIG. 11.

It should be understood that, in the above explanation, if it is decided that intentional operation performed by the user has been detected in the space 41 outside the detection reference, the calibration processing is performed up to a predetermined number of times; but this should not be considered as being limitative. For example, it would also be acceptable to perform the calibration processing each time that the number of times that user operation detected in the space 41 outside the detection reference has been determined to be intentional reaches a predetermined number of times (for example, three times).

Figure 14:
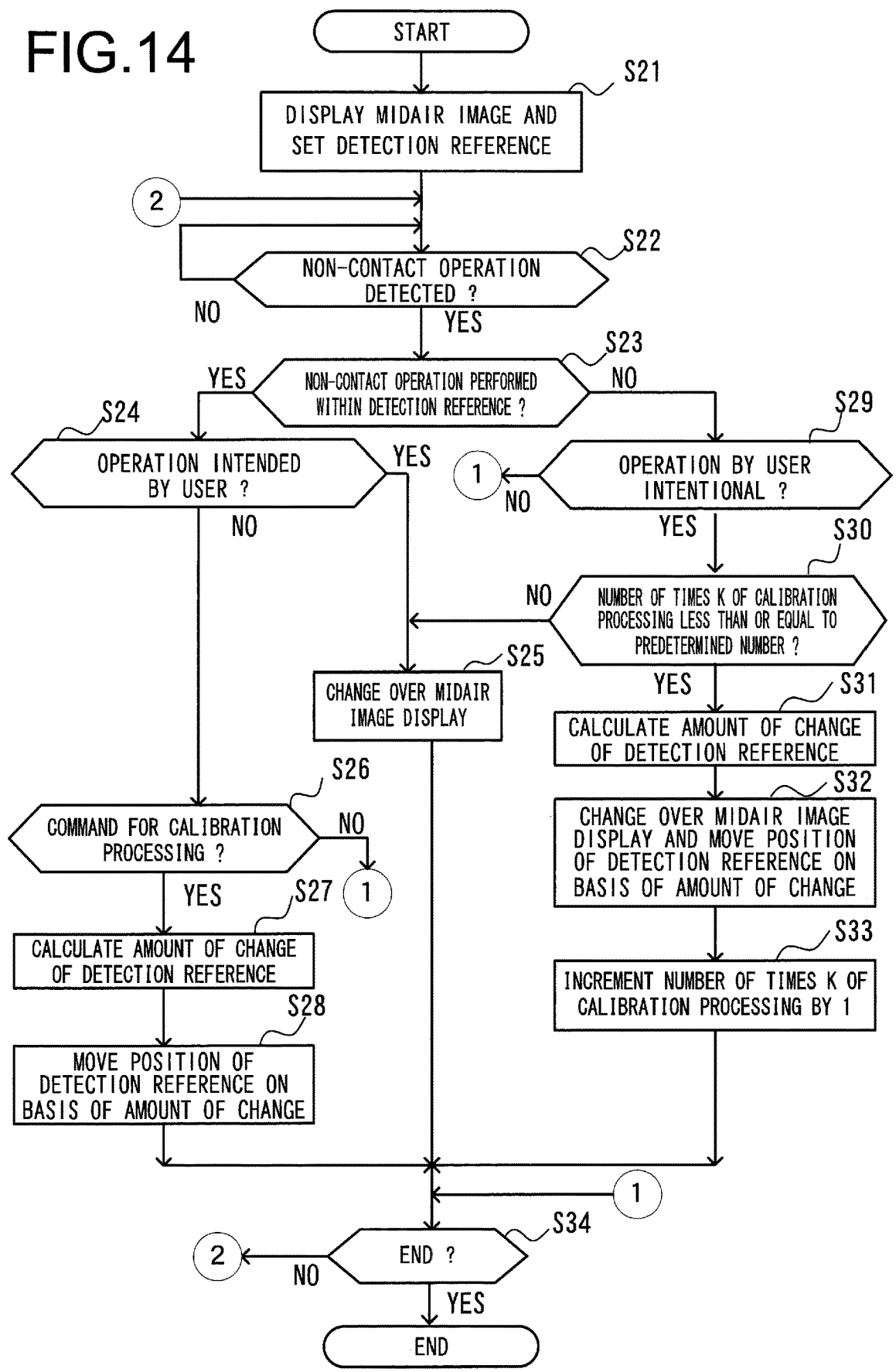
FIG. 14 is a flow chart for explanation of processing performed by a display device according to a sixth variant embodiment of the first embodiment.

In this case, in step S30 of the flow chart shown in FIG. 14, the control unit 20 of the display device 1 decides whether or not the number of times that user operation detected in the space 41 outside the detection reference has been determined to be intentional has reached a predetermined number of times. If this number has reached the predetermined number of times, then an affirmative decision is reached in step S30, while if it has not reached the predetermined number of times, then a negative decision is reached in step S30 and the counter that counts the number of times described above is incremented by 1. And, after an affirmative decision is reached in step S30, and step S31 and step S32 have been performed, in step S33 the counter that counts the number of times described above is reset to 0.

It should be understood that it would also be acceptable to determine whether or not to perform the calibration processing on the basis of the history of user operation in the past, if it has been decided that intentional operation performed by the user has been detected in the space 41 outside the detection reference. For example suppose that, in the history of the past five user operations, one user operation detected in the space 41 outside the detection reference 40 was decided to have been intentionally performed, while the remaining four user operations were detected within the detection reference 40. And if, the sixth time, it is decided that the user operation detected in the space 41 outside the detection reference has been intentional, then the calibration unit 203 does not perform the calibration processing, since the possibility is low that the user 12 performs operation in the space 41 outside the detection reference.

Furthermore it would also be acceptable to determine the position of the detection reference 40 that is set by the calibration processing on the basis of the history of user operations in the past if it has been decided that intentional operation by the user has been detected in the space 41 outside the detection reference. For example, suppose that, as the history of the past five user operations, the user operation was performed on the −Z direction side of the detection reference 40 once, while the user operation was performed on the +Z direction side of the detection reference 40 the other four times. In such a case, since the possibility is high that the user 12 performs the operation on the +Z direction side of the detection reference 40, accordingly, in the calibration processing, the detection reference control unit 204 moves the detection reference 40 toward the +Z direction.

Furthermore, if the calibration processing is performed and the position of the detection reference 40 is changed each time that it is decided that the user operation detected in the space 41 outside the detection reference is intentional, then the user 12 may not be able to ascertain the position of the detection reference 40. In such a case, the position of the user operation along the Z direction becomes unstable, and there is a possibility that, each time the user performs operation, the position along the Z direction may fluctuate irregularly. Accordingly, if the amount of fluctuation of the position along the Z direction of the user operations performed a predetermined number of times is large, then, even if it is decided that intentional operation by the user has been detected in the space 41 outside the detection reference, still the calibration unit 203 does not perform the calibration processing.

In this Variation 6 of the first embodiment, it is arranged to determine whether or not it is necessary to perform the calibration processing on the basis of the history of operation performed by the user 12 in the past. Due to this, it is possible to reduce the prevalence of a situation in which it becomes difficult for the user 12 to ascertain the position to perform the operation, due to excessive calibration processing has been performed.

Variation 7 of First Embodiment

In the display devices 1 of the first embodiment and Variations 1 through 6, the calibration processing was performed to change the detection reference 40 in the Z direction by the detection reference control unit 204. In the display device 1 of this Variation 7, in the calibration processing, the detection reference control unit 204 changes the magnitude of the width D1 of the detection reference 40.

The structure of the display device 1 of the first embodiment or of any of the Variations 1 through 6 can be applied as the structure of the display device 1 of this Variation 7.

For example, a case will now be explained in which the predetermined non-contact operation 600A has been detected in the space 41 outside the detection reference toward the +Z direction of the detection reference 40 as shown in FIG. 6(a) for the first embodiment. In this case, it will be acceptable for the detection reference control unit 204 not to change the position of the second reference surface 40b, but to change only the first reference surface 40a by an amount of change ΔH10 toward the +Z direction. In other words, it will be acceptable to change the center position of the detection reference 40 in the Z direction by changing the width D1 of the detection reference 40. Alternatively, it would also be acceptable for the detection reference control unit 204 to change the first reference surface 40a by the amount of change ΔH10 in the +Z direction, and to change the second reference surface 40b by the amount of change ΔH10 in the −Z direction. In other words, it would be acceptable to change the detection reference 40 without changing the center position of the detection reference 40 in the Z direction, by changing the width D1 of the detection reference 40 by the same amounts of change ΔH10 in the Z directions.

It should be understood that FIG. 6(b) shows a case in which the predetermined non-contact operation 600A has been detected toward the −Z direction of the detection reference 40. In this case, the detection reference control unit 204 may be arranged to change the position of the second reference surface 40b by an amount of change ΔH10 toward the −Z direction, or along with changing the position of the second reference surface 40b by an amount of change ΔH10 toward the −Z direction, also to change the position of the first reference surface 40a by an amount of change ΔH10 toward the +Z direction.

There are cases of the following types in which, as the calibration processing, the magnitude of the width D1 of the detection reference 40 should be changed as described above. For example, as explained in one example in connection with the first embodiment, supposing that user operation needs to be performed a plurality of times upon the same midair image 30, if user operations up to partway through have been detected but further user operation is not detected, then such calibration processing will be applicable. In other words, the midair image 30 may be, for example, a PIN number input screen or the like for input of a plurality of digits or letters. Suppose that, with this type of midair image 30, user operation for inputting the first digit has been performed, but the predetermined non-contact operation 600A by the user 12 for inputting the second digit is not detected within a predetermined time period. In this case, the detection reference control unit 204 changes the magnitude of the width D1 of the detection reference 40 so as to increase it so that the predetermined non-contact operation 600 by the user 12 for inputting the second digit can be detected in the detection reference 40.

It should be understood that the detection reference control unit 204 may be arranged to change the magnitude D1 of the detection reference 40 as described above if the predetermined non-contact operation 600 by the user 12 has been performed in the neighborhood of the detection reference 40 which is in the space 41 outside the detection reference. In other words, if a predetermined detection reference 600A has been detected more toward the +Z direction than the first reference surface 40a of the detection reference as shown in FIG. 6(a), then the detection reference control unit 204 makes a decision as to whether or not the gap ΔH10 is less than or equal to a predetermined value. If the gap ΔH10 is less than or equal to the predetermined value, then the detection reference control unit 204 decides that the predetermined non-contact operation 600A was performed in the neighborhood of the detection reference 40, and changes the magnitude of the width D1 of the detection reference 40. But if the gap ΔH10 is greater than the predetermined value, then the detection reference control unit 204 decides that the predetermined non-contact operation 600A was performed in a position far away from the detection reference 40, and does not change the magnitude of the width D1 of the detection reference 40.

Furthermore, as shown in FIG. 7, if a portion of the predetermined non-contact operation 600A is detected in the space 41 outside the detection reference, then it will be acceptable for the detection reference control unit 204 to change the detection reference 40 on the basis of the distance between the detection reference 40 and a spatial position of the portion of the predetermined non-contact operation 600A that has been detected in the space 41 outside the detection reference. For example, the detection reference control unit 204 may make a decision as to whether or not the portion of the predetermined non-contact operation 600 that has been detected to be more toward the +Z direction than the first reference surface 40a of the detection reference 40, i.e. by the distance ΔH10 as shown in FIG. 7(a), is less than or equal to a predetermined threshold value. If the distance ΔH10 is less than or equal to the predetermined threshold value, then, as shown in FIG. 15(a), although the entire predetermined non-contact operation 600A by the finger F has not been performed within the detection reference 40, still the greater portion of the predetermined non-contact operation 600A has been performed within the detection reference 40. In this case, it will be acceptable for the detection reference control unit 204 to change the magnitude of the width D1 of the detection reference 40. In other words, the detection reference control unit 204 may set the first reference surface 40a of the detection reference 40 to a position that is shifted in the +Z direction by at least the distance ΔH10. If the distance ΔH10 is greater than the predetermined threshold value, then, as shown in FIG. 15(b), the greater portion of the predetermined non-contact operation 600A has been performed in the space 41 outside the detection reference. In this case, the detection reference control unit 204 may move the position of the detection reference 40, in a similar manner to the case with the first embodiment.

Moreover it would also be acceptable for the detection reference control unit 204, when performing the calibration processing, to change the position of the detection reference 40 as explained in connection with the first embodiment, and also to change the size of the width D1 of the detection reference 40 as described above, in combination. For example, if the predetermined non-contact operation 600 by the user 12 has been detected in the neighborhood of the first reference surface 40a of the detection reference 40 in the space 41 outside the detection reference, then the detection reference control unit 204 may reduce the width D1 of the detection reference 40 and change the position of the detection reference 40. Suppose that, as shown in FIG. 6(a), the gap between the predetermined non-contact operation 600A performed by the user 12 and the first reference surface 40a of the detection reference 40 is ΔH10. If this gap ΔH10 is less than or equal to a predetermined value, then the detection reference control unit 204 reduces the width D1 of the detection reference 40. In this case, the detection reference control unit 204 sets, for example, 80% or 70% of the magnitude of the width D1 of the detection reference 40 shown in FIG. 6(a) as the new width D1 of the new detection reference 40. And in this case, the magnitude of the width D1 of the new detection reference 40 is set to, for example, preferably around 1.5 to 2 times the distance L1 of the predetermined non-contact operation 600A, so as to ensure that it is greater than the distance L1.

The detection reference control unit 204 moves the position of the detection reference 40, whose width D1 has been changed as described above, by a method similar to that in the case of the first embodiment.

Furthermore, for example, if the analysis unit 200 has detected that a plurality of the predetermined non-contact operations 600 by the user 12 have been performed in the vicinity of one another in the Z direction, then the detection reference control unit 204 may reduce the width D1 of the detection reference 40 and change the position of the detection reference 40.

For example suppose that, as shown in FIG. 16(a), three predetermined non-contact operations 600A1, 600A2, and 600A3 have been performed by the user 12. And suppose that the gaps of these predetermined non-contact operations 600A1, 600A2, and 600A3 from the first reference surface 40a of the detection reference 40 are respectively ΔH10-1, ΔH10-2, and ΔH10-3 (where ΔH10-2<ΔH10-1<ΔH10-3). If each of the difference between the gap ΔH10-1 and the gap ΔH10-2, the difference between the gap ΔH10-2 and the gap ΔH10-3, and the difference between the gap ΔH10-1 and the gap ΔH10-3 is within a predetermined range, then the analysis unit 200 decides that the predetermined non-contact operations 600A1, 600A2, and 600A3 have been performed in the neighborhood of one another in the Z direction.

In this case, the detection reference control unit 204 changes the width D1 of the detection reference 40 to be smaller, so that the predetermined non-contact operation 600A3 which has been performed at the position farthest from the first reference surface 40a and the predetermined non-contact operation 600A2 which has been performed at the position closest thereto are included therein. In other words, the detection reference control unit 204 sets a value that is greater than or equal to the value obtained by adding the difference between the gap ΔH10-3 and the gap ΔH10-2 to the distance L1, as the new width D1 of the new detection reference 40. And the detection reference control unit 204 moves the position of the detection reference 40, whose width D1 has been changed as described above, in a similar manner to the case with the first embodiment.

It should be understood that, if the difference between the gap ΔH10-1 and the gap ΔH10-2, the difference between the gap ΔH10-2 and the gap ΔH10-3, the difference between the gap ΔH10-1 and the gap ΔH10-3 exceeds the predetermined range, then the detection reference control unit 204 does not change the position of the detection reference 40, but rather, as described above, increases the magnitude of the width D1 of the detection reference 40. In this case, the detection reference control unit 204 moves the first reference surface 40a through ΔH10-3 toward the +Z direction, so that the predetermined non-contact operation 600A which was performed at the position farthest from the first reference surface 40a (i.e., in the example of FIG. 16(a), the predetermined non-contact operation 600A3) is included therein.

It should be understood that, in the above explanation, an example was cited in which the detection reference control unit 204 changed the magnitude of the width D1 of the detection reference 40 on the basis of the predetermined non-contact operation 600 performed by the user 12, but this should not be considered as being limitative. For example, it would also be acceptable for the detection reference control unit 204 to change the magnitude of the width D1 of the detection reference 40 along with the passage of time. Let it be assumed that, as the user 12 repeats operations and gets accustomed to performing the operations upon the midair image 30, the amounts of deviation of the positions in the Z direction where he performs the predetermined non-contact operations 600 will become smaller. On the basis of this assumption, after the display device 1 has been started, the detection reference control unit 204 sets the magnitude of the width D1 of the detection reference 40 to be quite large, and then changes the magnitude of the width D1 of the detection reference 40 so that it becomes smaller as time elapses. In this case, the detection reference control unit 204 may be arranged to change the width D1 of the detection reference 40 to become smaller continuously as time passes, or to change the width D1 in steps, each time a predetermined time period elapses.

Furthermore, in the above explanation, the magnitude of the width D1 was set to be constant, irrespective of the positions on the detection reference 40 in the X direction or in the Y direction; but this should not be considered to be limitative. For example it would also be acceptable, when the midair image 30 is being operated by the user 12, to set the magnitude of the width D1 to different values on the basis of the position or the angle of the finger or the hand of the user entering into the detection reference 40. Thus, for example, for the user 12 who operates the midair image 30 with his right hand, his finger or hand approaches toward the midair image 30 from the right side (which, when seen from the midair image 30, is the left side, in other words the +X direction). In such a case, it becomes easier to detect operation by the user within the detection reference 40 if the magnitude of the width D1 is set to be greater on the side of the detection reference 40 towards the +X direction. Accordingly, as shown in FIG. 16(b), the detection reference control unit 204 sets the width on the side of the detection reference 40 towards the +X direction to a larger value than the width on the side towards the −X direction. Moreover, if the height of the user 12 is great, then his finger or hand will naturally approach toward the midair image 30 from above, in other words from the +Y direction. In this type of case, it becomes easier to detect user operation by setting the width of the detection reference 40 on the side towards the +Y direction to a greater value than its width on the side towards the −Y direction.

The detection reference control unit 204 may employ information about the user who is operating the display device 1 so as to set the width of the detection reference 40 as described above. For example, information such as the height or the age or the sex or the dominant arm or the like of the user 12 who is operating the display device 1 may be inputted, and this information may be stored in the storage unit 205 as user information. And, when performing the calibration processing, the detection reference control unit 204 is able to set the value of the width of the detection reference 40 by referring to this user information stored in the storage unit 205. Moreover, it would also be acceptable for the analysis unit 200 to determine whether operation has been performed by the user with his/her right hand or with his/her left hand, or to determine the height of the user, on the basis of the detection output of the image capturing device 15.

In this Variation 7 of the first embodiment, the width of the detection reference 40 is changed. Due to this, it becomes easy to detect operation by the user within the detection reference 40.

Variation 8 of First Embodiment

The display device 1 of Variation 8 is adapted to be capable of changing the position in midair at which the midair image 30 is displayed, and moves the midair image 30 according to the mode of display of the midair image 30, or moves the display position of the midair image 30 in the calibration processing.

Figure 17:
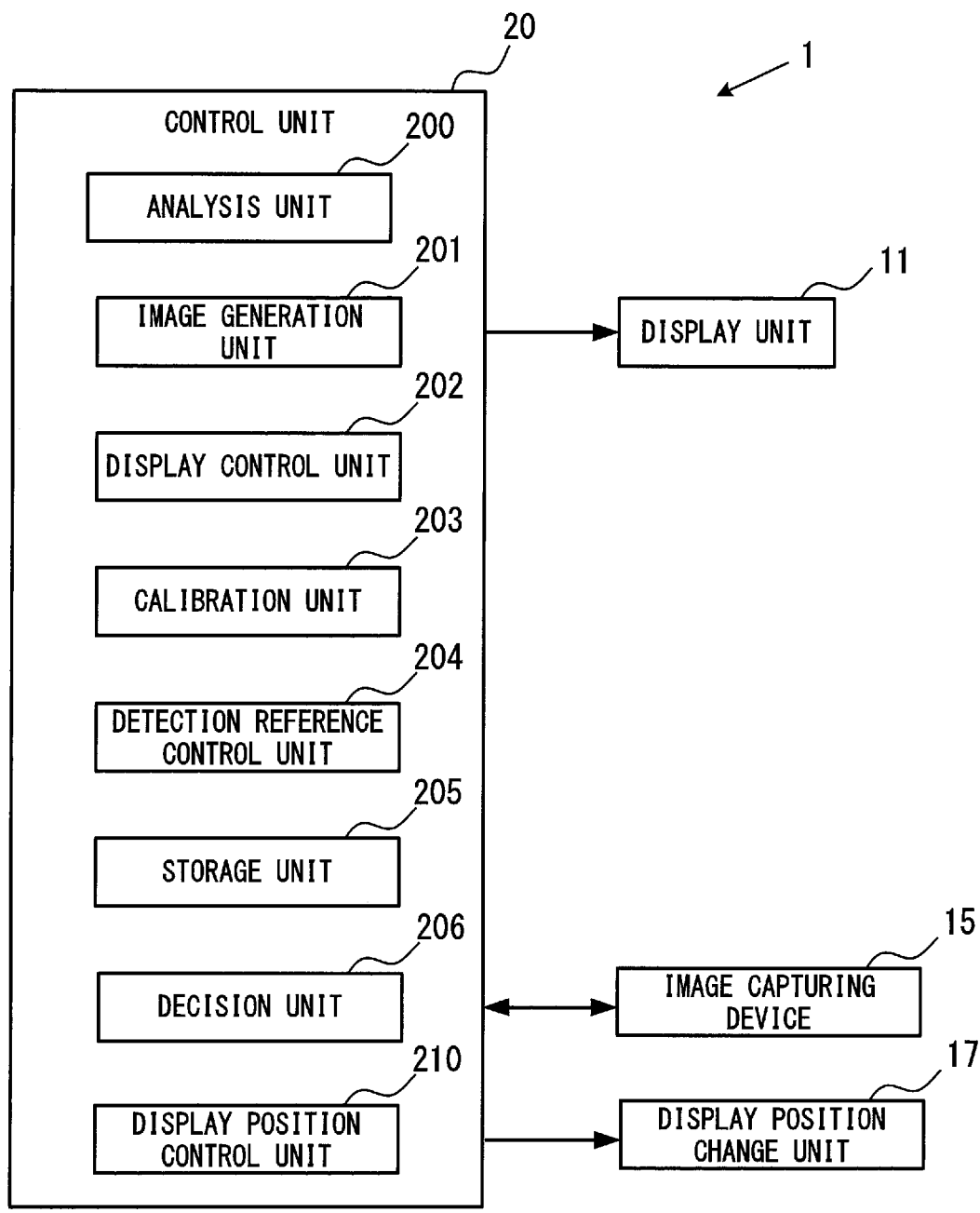
FIG. 17 is a block diagram for explanation of the structure of main portions of a display device according to an eighth variant embodiment of the first embodiment.

FIG. 17 is a block diagram for explanation of the structure of main portions of the display device 1 according to Variation 8.

In addition to the structure of the display device 1 of the first embodiment shown in FIG. 2, this display device 1 further comprises a display position change unit 17, and moreover a display position control unit 210 is provided to the control unit 20. It should be understood that the display position change unit 17 and the display position control unit 210 could also be applied to the structures of Variations 1 through 7 of the first embodiment.

The display position change unit 17 comprises a drive unit such as, for example, a motor or an actuator or the like, and moves the display unit 11 along the Y direction, so as to move and change the display position of the midair image 30 that is created along the Z direction. To move the midair image 30 in the direction to approach the user 12, in other words toward the +Z direction, the display position change unit 17 moves the display unit 11 toward the +Y direction, in other words moves it in the direction to approach the image forming optical system 9. And, to move the midair image 30 in the direction away from the user 12, in other words toward the −Z direction, the display position change unit 17 moves the display unit 11 toward the −Y direction, in other words moves it in the direction away from the image forming optical system 9.

The display position control unit 210 moves the midair image 30 in the following cases. For example, the cases may be, such as, the detection reference 40 which has been changed by the calibration processing is likely to get outside the detection range 15A of the image capturing device 15, or to be positioned in the vicinity of the end of the detection range 15A in the +Z direction or its end in the −Z direction. In these cases, the analysis unit 200 detects that the position where operation by the user 12 is being performed is outside the detection range 15A, or is at the end portion of the detection range 15A in the +Z direction or the −Z direction, or is within a predetermined range from one of those end portions. If the analysis unit 200 has detected such a situation, then the detection reference control unit 204 may not change the detection reference 40, but rather the display position control unit 210 may move the midair image 30. In a situation in which the detection reference 40 is likely to get outside the detection range 15A or to be positioned in the vicinity of the end in the +Z direction, it is necessary to prompt the user 12 to perform operation towards the −Z direction. Accordingly, the display position control unit 210 controls the display position change unit 17 to move the display unit 11 toward the −Y direction, so as to position the display position of the midair image 30 more toward the −Z direction. Furthermore, in a case such as when the detection reference 40 is likely to be positioned near the end of the detection range 15A in the −Z direction, it is necessary to urge the user 12 to perform operation toward the +Z direction. Accordingly, the display position control unit 210 controls the display position change unit 17 to move the display unit 11 toward the +Y direction, so as to position the display position of the midair image 30 more toward the +Z direction.

Moreover, the display position control unit 210 may be arranged to move the midair image 30 if, for example, the user 12 cannot reach the midair image 30 even with his arm being stretched. The analysis unit 200 detects that the arrival position of the predetermined non-contact operation 600A that has been performed by the user 12 is positioned more toward the +Z direction than the display position of the midair image 30. In this case, the display position control unit 210 controls the display position change unit 17 so as to move the display unit 11 toward the −Y direction, thereby moving the midair image 30 in the direction to approach toward the user 12, in other words toward the +Z direction.

It should be understood that, although the explanation was given above on the case in which the display unit 11 was moved along the Y direction, this should not be considered as being limitative. For example, it would also be acceptable for the display position control unit 210 to control the display unit 11 to display a display image that is adapted for being viewed with the right eye and also a display image that is adapted for being viewed with the left eye, having a parallax with respect to the image viewed with the right eye, so as to change the display position in depth of the midair image 30. In this case, for example, the display unit 11 may include a per se known lenticular lens. By controlling the image for the right eye and the image for the left eye, in other words by controlling the amount of parallax of the parallax image, the display position control unit 210 may change the position of the midair image 30.

Furthermore, the technique described in International Publication WO2011/158911 may be applied to the display unit 11. That is, the display unit 11 is configured to have a structure that is capable of a per se known light field display that displays a three dimensional stereoscopic image, and by displaying an image for two dimensional display upon the display unit 11, it is possible to form the midair image 30 at different positions in midair along the direction of the optical axis.

Figure 18:
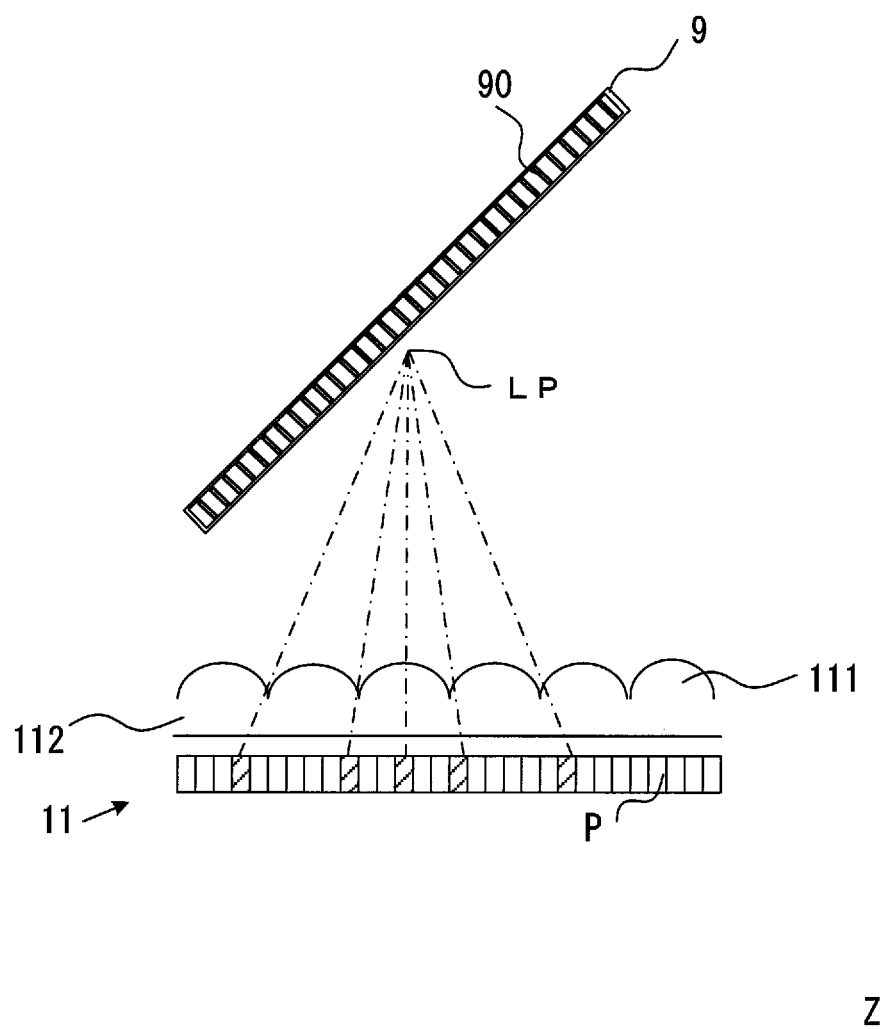
FIG. 18 is a sectional view schematically showing another example of an image forming optical system and a display unit of a display device according to the eighth variant embodiment of the first embodiment.

A cross section in the ZX plane of the display unit 11 and the image forming optical system 9 in this case is schematically shown in FIG. 18. At the display surface of the display unit 11, there is disposed a micro lens array 112 comprising a plurality of micro lenses 111 that are arranged two dimensionally. One of these micro lenses 111 is provided for each of a plurality of display pixels P of the display unit 11. It should be understood that although, in the example shown in FIG. 18, for the convenience of illustration, an example is shown in which a single micro lens 111 is provided for 5×5 display pixels P, this illustration shows fewer than the actual number of display pixels P. The micro lens array 112 is disposed at a position separated from the display surface of the display unit 11 in the +Z direction by the focal length f of the micro lenses 111. On the basis of the image that is displayed, each of the micro lenses 111 projects light from its display pixels P to a predetermined image surface in the Z direction. It should be understood that it would also be acceptable to employ a lenticular lens, instead of the micro lenses 111.

With this display unit 11, in order to form light points LP in midair to constitute the midair image 30, light to form these respective light points LP is emitted from some of the display pixels P, that are respectively covered by a plurality of different micro lenses 111. It should be understood that the light point LP is a midair image, since it is an image displayed in midair by the display unit 11 and the micro lenses 111. In the example shown in FIG. 18, the light that is emitted from the shaded display pixels P is projected by the micro lenses 111 to form a light point LP. In this case, the display pixels P corresponding to the plurality of different microlenses 111 are assigned in a number matching the number of display pixels P covered by a single microlens 111 (5×5 in the example presented in FIG. 18). Depending on this allocation, it is possible to adjust the position along the Z direction of the light point LP that is formed in midair. The midair image 30 is composed of images of the light points P formed in this manner. As described above, the position of the midair image 30 along the Z direction may be changed by changing the image that is displayed upon the display unit 11.

With this Variation 8 of the first embodiment, it is arranged to change the display position of the midair image 30 on the basis of the position of operation by the user 12 that has been detected. Due to this, it is possible to ensure that operation by the user 12 is performed within the detection range 15A.

Variation 9 of First Embodiment

The display devices 1 of the first embodiment and Variations 1 through 8 were designed to change the position and/or the width or the like of the detection reference 40 through the calibration processing. However, with the display device 1 of this Variation 9 the calibration processing is performed upon the detection output of the image capturing device 15, and thereby the accuracy of detection of operation by the user is enhanced.

The structure of the display device 1 of the first embodiment or of any of the Variations 1 through 8 can be applied as the structure of the display device 1 of this Variation 9.

The analysis unit 200 detects the operating object when the user 12 performs operation by employing the captured image from the image capturing unit, included in the detection output from the image capturing device 15. While the analysis unit 200 detects, for example, flesh colored regions in the captured image as being the finger or the arm of the user, the user operation cannot be detected correctly if the accuracy of this detection is low. Accordingly, when performing the calibration processing, in order to detect the flesh colored regions, the analysis unit 200 may adjust, for example, the threshold values for the R, and B color components and/or the threshold value for the luminance. For example, if the accuracy of detection of the operating object deteriorates due to a disturbance such as noise or the like being included in the range that is detected, then the analysis unit 200 may set one of the threshold values mentioned above to a larger value. Moreover in a case in which, for example, the fingertip or the like of the user 12 is not detected, the analysis unit 200 may set one of the threshold values mentioned above to a smaller value.

With this Variation 9 of the first embodiment, the calibration processing is performed upon the detection output of the image capturing device 15. Due to this, the accuracy of detection of operation by the user 12 is enhanced.

It should be understood that although, with the first embodiment and its Variations 1 through 9 described above, examples have been explained on the display device 1 including at least the control unit 20, the display unit 11, and the image capturing device 15, it would also be acceptable for the control device to consist only of the control unit 20, or only of the control unit 20 and the image capturing device 15. Moreover, the control unit 20 may comprise at least the calibration unit 203, the detection reference control unit 204, and the decision unit 206. It would also be acceptable to add any appropriate structure from the structures described above, according to requirements, in order to obtain the advantageous effects described in connection with the first embodiment or Variations 1 through 9 described above.

Second Embodiment

A display device 1 according to a second embodiment of the present invention will now be explained with reference to the drawings. Explanation of this second embodiment will be provided by citing an example in which the display device 1 of this second embodiment is installed into an operating panel. It should be understood that the display device 1 of this second embodiment is not limited to being installed into an operating panel; it would also be possible to incorporate it into any of the electronic apparatuses explained in connection with the first embodiment and its Variations described above.

With each of the display devices of the first embodiment and its Variations described above, the detection reference 40 was set to an initial position that was determined in advance. However, with the display device 1 of this second embodiment, the initial position of the detection reference 40 is set on the basis of the position of the midair image.

The structure of the first embodiment shown in FIG. 2 as a block diagram can also be applied as the structure of the display device 1 of the second embodiment. It should be understood that the structures of the first embodiment and of its Variations 1 through 9, as well as their various types of control and processing, may be appropriately applied to the display device 1 of this embodiment.

With the display device 1 of this embodiment, the detection reference 40 is set by taking the display position of the midair image 30 as a reference. First, in a similar manner to the case in the first embodiment, the midair image 30 is generated at a position that is separated from the image capturing device 15 by a distance H1 toward the +Z direction. Taking the position at the distance H1 at which this midair image 30 is displayed as a reference, the detection reference control unit 204 sets the initial detection reference 40 at a position that is based upon information about the user 12 who is using the display device 1 (subsequently this will be termed the "user information"). The user information may, for example, be at least one of the sex of the user 12, his/her age, his/her body characteristics (i.e. his/her height or arm length), or his/her visual acuity, or a combination of a plurality of these characteristics. A plurality of tables are stored in advance in the storage unit 205, related to the positions and/or the widths of the detection reference 40 for the midair image 30 to be taken as a reference, parameters for these tables being one of sex, age, body characteristics (height), and/or visual acuity, or a combination of a plurality of these characteristics. When the user 12 who is operating the display device 1 inputs such user information, the detection reference control unit 204 selects the corresponding table on the basis of the type and the details of the user information that has been inputted, and selects the corresponding position and the width D1 of the detection reference 40 from that table. And the detection reference control unit 204 sets the detection reference 40 on the basis of the position and the width that have thus been selected.

The positions of the detection reference 40 that are stored as tables may, for example, be set to positions that are closer to the user 12 (i.e. more toward the +Z direction) for women than for men, or for younger persons as compared to older persons, or for persons of low height than for persons of high height. Furthermore, the widths D1 of the detection reference 40 that are stored as tables may, for example, be set so as to be of smaller magnitude for women than for men, or for younger persons as compared to older persons, or for persons of low height than for persons of greater height. Moreover, it would also be acceptable for the detection reference control unit 204 to detect the length of the arm of the user 12 who is operating the display device 1 on the basis of the detection output of the image capturing device 15, and to determine the position or the width D1 of the detection reference 40 on the basis of the arm length that has thus been detected. In this case, the detection reference 40 would be set so as to be positioned more toward the user 12 (i.e. toward the +Z direction), and its width D1 would be set so as to be smaller in magnitude, for a person whose arm length is short than for a person whose arm length is long. Alternatively, it would also be acceptable for the detection reference control unit 204 to predict, on the basis of the arm length that has been detected, the expected position at which, when the user performs operation, his finger or hand will arrive, and to set the detection reference 40 to this position that has thus been predicted. In this case it may be arranged for the detection reference control unit 204 to predict that the finger or the hand of the user 12 will arrive at a position that is, for example, at a distance of 60% of the length of his arm in front from the position where the user 12 is standing.

In this second embodiment, the detection reference control unit 204 sets the initial detection reference 40 on the basis of the user information, by taking the display position of the midair image 30 as a reference. Due to this, it is possible to reduce the frequency of performing the calibration processing, since the detection reference 40 is set on the basis of the characteristics of each of the users 12.

Variation 1 of Second Embodiment

The structure of Variation 8 of the first embodiment shown in the block diagram of FIG. 17 can also be applied to the display device 1 of this Variation 1 of the second embodiment. It should be understood that the various types of control and processing of the first embodiment and of its Variations may be appropriately applied to the display device 1 of this Variation.

With the display device 1 of Variation 1 of the second embodiment, the display position control unit 210 controls the display position change unit 17 and initially sets the display position of the midair image 30 on the basis of user information. And the detection reference control unit 204 takes the midair image 30 that has thus been initially set as a reference, and sets the initial detection reference 40 in a similar manner to the case with the first embodiment shown in FIG. 3(*b*).

With this Variation 1 of the second embodiment, as the user information, for example, the sex of the user 12, or his/her age, or his/her body characteristics (i.e. his/her height or arm length), or his/her visual acuity, or a combination of a plurality of these characteristics may be employed. A plurality of tables are stored in advance in the storage unit 205, related to the positions of the detection reference 40, taking as parameters one or a combination of sex, age, body characteristics (height), and/or visual acuity. When the user 12 who is operating the display device 1 inputs such user information, the detection reference control unit 204 selects the corresponding table on the basis of the type and the details of the user information that has been inputted, and selects the corresponding position of the midair image 30 from that table. And, on the basis of the position that has thus been selected, the display position control unit 210 sets the initial display position of the midair image 30 by controlling the display position change unit 17 to move the display unit 11 in the Y direction.

The positions of the midair image 30 that are stored as tables may, for example, be set to positions that are closer to the user 12 (i.e. more toward the +Z direction) for women than for men, for younger persons as compared to older persons, or for persons of low height than for persons of great height. Furthermore, it would also be acceptable for the display position control unit 210 to detect the length of the arm of the user 12 who is operating the display device 1 on the basis of the detection output of the image capturing device 15, and to set the initial position of the midair image 30 on the basis of the arm length that has thus been detected.

In this case, the midair image 30 would be initially set so as to be positioned more toward the user 12 (i.e. toward the +Z direction) for a person whose arm length is short than for a person whose arm length is long. Alternatively, it would also be acceptable for the display position control unit 210 to predict, on the basis of the arm length that has been detected, the expected position at which, when the user performs operation, his finger or hand will arrive, and initially to set the midair image 30 to the position that has thus been predicted. In this case it may be arranged for the display position control unit 210 to predict that the finger or the hand of the user 12 will arrive at a position that is, for example, at a distance of 60% of the length of his arm in front from the position where the user 12 is standing.

It should be understood that the display position control unit 210 initially sets the display position of the midair image 30 to be on the side closer to the user 12 (i.e. toward the +Z direction), so as to obtain the effect of causing the user 12 to perceive as if the midair image 30 stands out. In particular, since the distance between the eyes of a child is small, the display position of the midair image 30 is initially set to be more toward the +Z direction, as compared to the case of an adult. Moreover, in order for the user 12 not to perceive as if the midair image 30 stands out, then the display position control unit 210 initially sets the display position of the midair image 30 to be on the side farther from the user 12 (i.e. toward the −Z direction). By doing this, it is possible to reduce the burden imposed upon the eyes of the user 12 when he views the midair image 30.

It should be understood that it would also be acceptable to combine the initial setting of the detection reference 40 by the display device 1 of the second embodiment described above and the initial setting of the display position of the midair image 30 by the display device 1 of Variation 1 of the second embodiment. In this case, the display position control unit 210 would initially set the display position of the midair image 30 in a similar manner to the case of Variation 1 of the second embodiment. And, taking the display position of the midair image 30 that has thus been initially set as a reference, the detection reference control unit 204 would initially set the position and the width of the detection reference 40, in a similar manner to the case of the second embodiment.

With this Variation 1 of the second embodiment, the initial display position for the midair image 30 is set on the basis of the user information. Due to this, the midair image 30 is displayed on the basis of the characteristics of each of the users 12, and thus, operation by each user 12 is performed at the display position of the midair image 30 and is detected at the detection reference 40.

Variation 2 of Second Embodiment

With the display device 1 of this Variation 2 of the second embodiment, the detection reference 40 is set on the basis of operation by the user 12 upon the midair image 30 that is displayed according to the initial setting.

The structure of the first embodiment shown in the block diagram of FIG. 2 may be applied to the display device 1 of Variation 2 of the second embodiment. It should be understood that the structure and the various types of control and processing of the first embodiment and of its Variations may be appropriately applied to the display device 1 of this Variation.

The display control unit 202 displays the midair image shown in FIG. 3(a) at a position at the distance H1 toward the +Z direction from the image capturing device 15, in a similar manner to the case with the first embodiment (refer to FIG. 3(b)). It should be understood that the midair image 30 that is displayed includes an icon 30A corresponding to, for example, a start button for starting the operation of the display device 1, a lock cancel button for enabling the operation of the display device 1 in the locked state, or the like. Moreover, the detection range 15A and the detection limit 15a are set by the image capturing device 15, in a similar manner to the case shown in FIG. 3(b). However, at this stage, the detection reference control unit 204 does not set the detection reference 40.

The user 12 performs the predetermined non-contact operation 600 upon the icon 30A of the midair image 30 that is displayed as shown in FIG. 3(a). And the detection reference control unit 204 detects the position of this predetermined non-contact operation 600 that has been performed within the detection range 15A on the basis of the detection output of the image capturing device 15.

FIG. 19(a) schematically shows the predetermined non-contact operation 600A that has been detected. In the example shown in FIG. 19(a), the starting position for the predetermined non-contact operation 600A is supposed to be a position at a distance H20 in the +Z direction from the image capturing device 15.

The detection reference control unit 204 determines the position and the width D1 of the detection reference 40 so as to include the predetermined non-contact operation 600A that has been detected. For this purpose, the detection reference control unit 204 sets the first reference surface 40a of the detection reference 40 to the starting position of the predetermined non-contact operation 600A, in other words to a position at the distance H20 toward the +Z direction from the image capturing device 15, or to a position that is a predetermined distance farther toward the +Z direction therefrom. And the detection reference control unit 204 sets the second reference surface 40b on the basis of the first reference surface 40a that has been set in this manner. In this case, the detection reference control unit 204 may set the second reference surface 40b to a position at a distance D1 toward the −Z direction from the first reference surface 40a. Moreover, the detection reference control unit 204 may be arranged to set the second reference surface 40b toward the −Z direction at a distance from the midair image 30 that is equal to a distance between the first reference surface 40a and the midair image 30, in other words to a distance (H2-H1). The detection reference control unit 204 sets the initial detection reference 40 in this manner.

With this Variation 2 of the second embodiment, the initial display position for the midair image 30 is set on the basis of the user information, and the detection reference 40 is initially set on the basis of the user information. Due to this, it is possible to lower the frequency at which the calibration processing is performed, since the display of the midair image 30 and the setting of the detection reference 40 are performed on the basis of the characteristics of each of the users 12.

Variation 3 of Second Embodiment

The display device 1 of this Variation 3 of the second embodiment is a system in which the display control unit 202 controls the timing at which the midair image 30 is displayed. The structure of the first embodiment shown in the block diagram of FIG. 2 may be applied to this Variation 3 of the second embodiment. It should be understood that the structure and the various types of control and processing of the first embodiment and of its Variations 1 through 9 and of the second embodiment and of its Variations 1 and 2 may be appropriately applied to the display device 1 of this Variation as well.

In this Variation 3 of the second embodiment, the display of the midair image 30 is started when a user 12 has been detected at a position at which he can visually check the midair image 30 that is displayed by the display device 1. It should be understood that, with the midair image 30, the viewing angle is narrow in order for the user 12 to be able to check the midair image 30 visually. Due to this, it is considered to be preferable for a mark or a sign to be set upon the floor, showing a position for the user at which he can visually check the midair image 30. If, on the basis of the detection output of the image capturing device 15, it is detected that the user is positioned in front of the display device 1 at a position where he can perform visual checking, then the display control unit 202 displays a display image upon the display unit 11 to show the midair image 30. In this case, the display control unit 202 does not display the midair image 30 when the user 12 merely passes in front of the display device 1, but only displays the midair image 30 when the user 12 stands still at a position from which he can perform visual checking. In other words, if the user 12 is not detected at a position from which he can perform visual checking, then the display control unit 202 does not display the midair image 30.

Moreover, the fact that the user 12 has stood still at a mark that shows a position at which visual checking is possible is not to be considered as being limited to being detected by the image capturing device 15. For example, it would also be acceptable to detect that the user 12 has stood still at a position where he can perform visual checking of the midair device 30 and is facing in the direction of the display device 1 by employing information from an azimuth sensor and from a GPS housed in a smartphone held by the user 12. In this case, the position where the user is standing may be detected on the basis of the information from the GPS, and the orientation of the user 12, in other words whether or not the user 12 is facing toward the display device 1, may be detected on the basis of the information from the azimuth sensor.

It should be understood that, if the midair image 30 can be checked visually from a wider range than the position corresponding to a narrow viewing angle where visual checking is possible as described above, then it would also be acceptable for the display device 1 to display the midair image 30 including, for example, the icon 30A that has the function of a start button, irrespective of whether or not the user 12 has stood still at the above described position at which he can perform visual checking.

With this Variation 3 of the second embodiment, display of the midair image 30 is performed when it has been detected that the user 12 is positioned at a position at which he is able to check the midair image 30 visually. Due to this it is possible to reduce the burden of processing, since the midair image 30 is not displayed when the user 12 does not perform visual checking, or when the user is at a position at which visual checking is not possible.

It should be understood that although, in the second embodiment and its Variations 1 through 3 described above, examples of the display devices 1 that include at least the control unit 20, the display unit 11, and the image capturing device 15 have been explained, a control device that only consists of the control unit 20, or a control device that consists only of the control unit 20 and the image capturing device 15, would also be acceptable. Moreover, it would also be possible for the control unit 20 to comprise at least the calibration unit 203, the detection reference control unit 204, and the decision unit 206. It would also be acceptable to add other structures from those described above in order to obtain the advantageous effects detailed with regard to the second embodiment or its Variations 1 through 3 described above, as appropriate and according to requirements.

It should be understood that while, in the display devices of all of the embodiments and of all the Variations explained above, the position at which the user operation is performed is detected by the image capturing device 15, this should not be considered as being limitative. For example, it would also be acceptable to employ a per se known transparent capacitive panel (hereinafter referred to as a "capacitive panel") disposed parallel to the XY plane and toward the −Z direction with respect to the stage 14. Such a capacitive panel generates an electric field with an electrode that is made of a substantially transparent member. When the user 12 moves his finger or a stylus over the midair image 30 for operating a display position of the midair image 30, this capacitive panel detects the position of the finger or stylus as a capacitance value. For example, the capacitive panel may compare together the capacitance values at its own four corners, and may detect the position of the finger of the user 12 along the X axis and the Z axis on the basis of the capacitance values detected at the four corners. It should be understood that it would also be acceptable to provide such a capacitive panel upon the stage 14 parallel to the ZX plane.

Furthermore, the relationship between the distance from the front surface of the capacitive panel to the fingertip of the user and the capacitance when the capacitive panel detects this fingertip is stored in advance in the storage unit 205. Accordingly, when the fingertip is positioned within a predetermined detection range, the capacitive panel is able to detect the capacitance at the fingertip, and is able to detect the position of the fingertip in the Z direction from this capacitance that has thus been detected and the correspondence relationship described above that is stored in the storage unit 205.

As the method by which the display devices 1 of all the embodiments and Variations explained above generate their midair images, it would also be acceptable to employ a method in which an image is formed in midair by condensing laser light in midair and converting air molecules into plasma to emit light in midair. In this case, a three dimensional image can be created as a real image in midair by freely controlling the position within three dimensional space at which the laser light is condensed. Moreover it would also be acceptable, as another method for creating a midair image, to form an image in midair by employing a display device that, in addition to functioning as a projector, also has a function of generating mist or vapour in the air so as to form a screen by generating mist in the air and to project an image upon this screen by the mist (fog display).

A program enabling the various types of processing to be executed at the display device 1 to move the position of a midair image 30 may be recorded into a computer-readable recording medium, and the calibration may be executed based upon the program read into a computer system. It is to be noted that the "computer system" in this context may include an OS (operating system) and hardware such as peripheral devices.

It is to be also noted that the "computer system" may include a homepage provider environment (or a display environment) in conjunction with the WWW system. In addition, the "computer-readable recording medium" may be a non-volatile writable memory such as a flexible disk, a magneto-optical disk, a ROM or a flash memory, a portable medium such as a CD-ROM, or a storage device such as a hard disk built into a computer system. Furthermore, the "computer-readable recording medium" may be a storage medium capable of holding a program over a specific length of time, such as a volatile memory (e.g., DRAM (dynamic random access memory)) in a computer system functioning as a server or a client when the program is transmitted via a communication network such as the Internet or via a communication line such as a telephone line.

The "program" stored in a storage device or the like in a computer system may be transmitted to another computer system via a transmission medium or on a transmission wave in a transmission medium. The "transmission medium" through which the program is transmitted in this context refers to a medium having a function of information transmission, examples of which include a network (communication network) such as the Internet and a communication line such as a telephone line. The program described above may enable only some of the functions described earlier. Furthermore, the program may be a differential file (differential program) that works in conjunction with a program already recorded in the computer system so as to enable the functions described earlier.

As long as the features characterizing the present invention remain intact, the present invention is in no way limited to the particulars of the embodiments described above and other modes or combinations that are conceivable within the technical teaching of the present invention are also within the scope of the invention.

The content of the disclosure of the following application, upon which priority is claimed, is hereby incorporated herein by reference:

Japanese Patent Application No. 2016-128156 (filed on 28 Jun. 2016).

REFERENCE SIGNS LIST

1: display device
9: image forming optical system
11: display unit
15: image capturing device
20: control unit
200: analysis unit
201: image generation unit
202: display control unit
203: calibration unit
204: detection reference control unit
206: decision unit
207: speed and acceleration detection unit
208: operation prediction unit
209: audio detection unit
210: display position control unit
10: main body
12: user
14: stage
40: detection reference
41: space outside detection reference
30: midair image
30A: icon
15A: detection range
15a: detection limit
600: predetermined non-contact operation
16: sound capture unit
17: display position change unit
111: micro lens
112: micro lens array
90: mirror element

The invention claimed is:

1. A control device comprising:
a display that displays an image in midair; and
a processor and associated memory configured to:
acquire first information related to an object that performs a non-contact operation and second information related to a user who performs the non-contact operation, the first information being a track of the object, and the second information being (i) personal information of the user stored in the memory and (ii) a direction of a line of sight of the user or a direction of a head of the user;
set a detection reference for the non-contact operation;
determine whether the non-contact operation is detected or not; and
if (a) a detected position of the object, which is based on the non-contact operation upon the image in midair, is outside the detection reference and (b) it is determined that the user has an intention to perform the non-contact operation based on the acquired track of the object, the direction of the line of sight of the user, or the direction of the head of the user, (i) determine that the non-contact operation is detected and also (ii) change, based on the second information, a position of the detection reference relative to a position of the image in midair so as to bring the detection reference closer to the position where the non-contact operation has been performed.

2. The control device according to claim 1, wherein the processor (i) determines that the non-contact operation is detected and (ii) changes the position of the detection reference if the detected position of the object is outside the detection reference and a distance between a point on the track of the object and the detection reference is less than a predetermined distance.

3. The control device according to claim 1, wherein:
the first information includes information related to a movement of the object; and
the processor (i) determines that the non-contact operation is detected and (ii) changes the position of the detection reference if the detected position of the object is outside the detection reference and a direction of the movement of the object is a predetermined direction.

4. The control device according to claim 1, wherein:
the first information includes a speed of the object; and
the processor (i) determines that the non-contact operation is detected and (ii) changes the position of the detection reference if the detected position of the object is outside the detection reference and the speed of the object is a predetermined speed.

5. The control device according to claim 1, wherein:
the first information includes information related to an external appearance of the object; and
the processor (i) determines that the non-contact operation is detected and (ii) changes the position of the detection reference if the detected position of the object is outside the detection reference and the external appearance of the object is a predetermined external appearance.

6. The control device according to claim 5, wherein the information related to the external appearance of the object is information related to a shape or a color or a pattern of the object.

7. The control device according to claim 1, wherein: the second information includes a movement of the line of sight of the user or a movement of the head of the user; and the processor (i) determines that the non-contact operation is detected and (ii) changes the position of the detection reference if the detected position of the object is outside the detection reference and an amount of the movement of the line of sight of the user or an amount of the movement of the head of the user is smaller than a predetermined value.

8. The control device according to claim 1, wherein:

the second information includes words spoken by the user or the display; and the processor (i) determines that the non-contact operation is detected and (ii) changes the position of the detection reference based on the detected position of the object and the words spoken by the user or a facial expression of the user.

9. The control device according to claim 1, wherein the personal information of the user is information regarding usage history of the user.

10. A detection method for detecting a non-contact operation upon an image displayed in midair by a display, the method comprising:

detecting a position of an object that performs the non-contact operation;

acquiring a track of the object as first information related to the object;

acquiring as second information related to a user who performs the non-contact operation (i) personal information of the user stored in a memory and (ii) a direction of a line of sight of the user or a direction of a head of the user;

setting a detection reference for the non-contact operation and determining whether the non-contact operation is detected or not; and if (a) the detected position of the object, which is based on the non-contact operation upon the image in midair, is outside the detection reference and (b) it is determined that the user has an intention to perform the non-contact operation based on the acquired track of the object, the direction of the line of sight of the user or the direction of the head of the user, (i) determining that the non-contact operation is detected and also (ii) changing, based on the second information, a position of the detection reference relative to a position of the image in midair so as to bring the detection reference closer to the position where the non-contact operation has been performed.

\* \* \* \* \*